(12) United States Patent
Lenz et al.

(10) Patent No.: US 8,273,269 B2
(45) Date of Patent: Sep. 25, 2012

(54) RED COLOUR FILTER COMPOSITION

(75) Inventors: Roman Lenz, Liestal (CH); Gerardus De Keyzer, Riehen (CH); Mathias Duggeli, Thurnen (CH); Patrick Christopher Holzhuter, Zell im Wiesental (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/993,095

(22) PCT Filed: May 5, 2009

(86) PCT No.: PCT/EP2009/055370
§ 371 (c)(1),
(2), (4) Date: Mar. 7, 2011

(87) PCT Pub. No.: WO2009/144115
PCT Pub. Date: Dec. 3, 2009

(65) Prior Publication Data
US 2011/0155973 A1    Jun. 30, 2011

(30) Foreign Application Priority Data

May 28, 2008 (EP) .................................. 08157088
Feb. 9, 2009 (EP) .................................. 09152366

(51) Int. Cl.
G02B 5/23 (2006.01)
C07D 487/02 (2006.01)
C07D 491/02 (2006.01)
C07D 495/02 (2006.01)
C07D 497/02 (2006.01)

(52) U.S. Cl. .......... 252/586; 106/498; 524/92; 524/104; 548/305.1; 548/311.7; 548/364.7; 548/452; 548/453

(58) Field of Classification Search .................. 106/498; 252/586; 428/480, 704; 524/92, 104; 540/177; 544/74, 341; 546/49, 56, 167, 256; 548/361.1, 548/362.5, 364.4, 364.7, 365.7, 373.1, 376.1, 548/377.1, 453, 305.1, 311.7, 452
See application file for complete search history.

(56) References Cited

U.S. PATENT DOCUMENTS

| | | | |
|---|---|---|---|
| 4,810,802 A | 3/1989 | Wallquist et al. | |
| 5,200,528 A | 4/1993 | Wooden et al. | |
| 5,334,727 A * | 8/1994 | Campbell | 548/373.1 |
| 6,066,204 A * | 5/2000 | Wallquist et al. | 106/494 |
| 2005/0261402 A1* | 11/2005 | Lenz et al. | 524/104 |
| 2007/0031358 A1 | 2/2007 | Wallquist | |

FOREIGN PATENT DOCUMENTS

| | | | |
|---|---|---|---|
| CH | 2238550 A * | 6/1991 | |
| DE | 4037556 A1 | 5/1991 | |
| DE | 102004014951 A1 | 10/2004 | |
| EP | 0232222 A | 8/1987 | |
| EP | 0485337 A | 5/1992 | |
| EP | 0511165 A | 10/1992 | |
| EP | 0790281 A | 8/1997 | |
| EP | 0877058 A | 11/1998 | |
| GB | 2 238 550 A | 6/1991 | |
| JP | 2055362 A | 2/1990 | |
| JP | 3026767 A | 2/1991 | |
| JP | 2000273346 A | 10/2000 | |
| JP | 2002-328215 | * 11/2002 | |
| JP | 2005345884 A | 12/2005 | |
| WO | 03080742 A | 10/2003 | |
| WO | 2004/007604 A | 1/2004 | |
| WO | 2005039515 A | 5/2005 | |

OTHER PUBLICATIONS

English Language Abstract of EP 0790281 Printed on Feb. 17, 2011.
English Language Abstract of DE102004014951 Printed on Feb. 17, 2011.
English Language Abstract of JP 2055362 Printed on Feb. 17, 2011.
English Language Abstract of JP 2005345884 Printed on Feb. 17, 2011.
English Language Abstract of JP 2000273346 Printed on Feb. 17, 2011.
English Language Abstract of JP3026767 Printed on Feb. 17, 2011.
Wallquist, High Performance Pigments, 2002, pp. 159-184.
Kirchmayr et al., Polymers Paint Colour Journal, Vol. 179, (1989) pp. 457-464.
Iqbal et al., Bull. Soc. Chim. Belg. vol. 97/No. 8-9(1988) pp. 615-643.

* cited by examiner

*Primary Examiner* — Bijan Ahvazi
(74) *Attorney, Agent, or Firm* — Shiela A. Loggins

(57) ABSTRACT

A composition, for producing dispersions, thermoplastic masses and/or color filters, comprising (a) a colorant of formula (1) wherein 20-100 mol % $R_1$ are Br and 80-100 mol % $R_3$ are H, especially of formula (Ib) and/or (Ic); (b) from 0 to 150% by weight, based on (a), of C. I. Pigment Red 144, 188, 190, 224, 242 or 2,4,6-trimethylphenylperylene diimide; (c) from 3 to 25% by weight, based on (a), of a di- or tri-azacyclopentylmethyl-substituted colorant (formulae given); (d) from 0 to 10% by weight, preferably from 0.01 to 8% by weight, based on the sum of (a) and (b), of an additionally sulfonated colorant of the same kernels as in (c); and (e) from 0 to 30% by weight, preferably from 3 to 25% by weight, especially from 5 to 20% by weight, based on (a), of a diketopyrrolopyrrole colorant substituted by at least one chain containing a plurality of nitrogen atoms (cf. formula (V)).

(I)

-continued
(Ib)
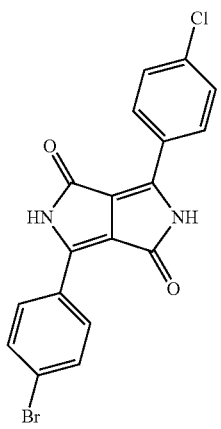
(Ic)
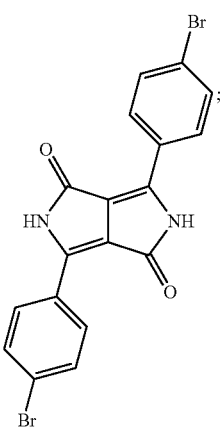
-continued
(Ig)
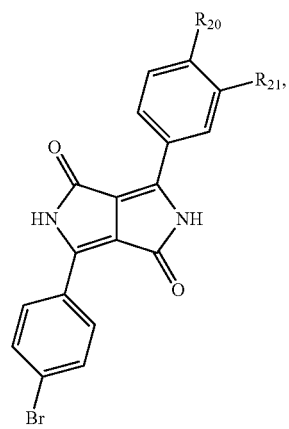
12 Claims, 1 Drawing Sheet

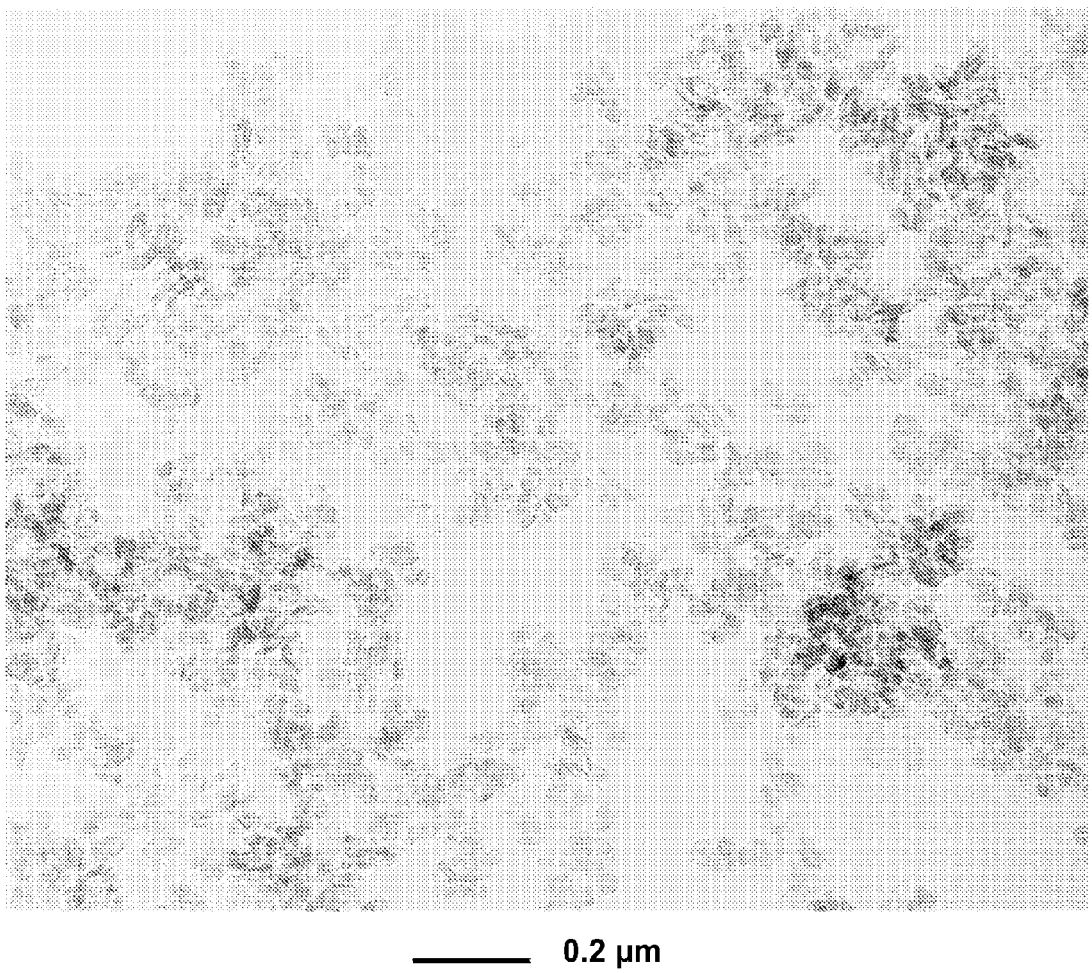
0.2 μm

RED COLOUR FILTER COMPOSITION

In the case of colour filters, a hue conforming to relevant standards and a high contrast ratio are essential. With many pigments, however, it is difficult to achieve the desired hue and a good contrast ratio, especially when the colour filter is to be cured at a temperature of 200° C. or above (for example, from 230 to 270° C. or even up to 300° C.). Although C. I. Pigment Red 254 is stable even up to 500° C., colour filter compositions comprising that pigment tend at a relatively high curing temperature to develop, inexplicably, a contrast ratio that is not entirely satisfactory.

In Example 17 of EP 0 224 445 A1, C. I. Pigment Red 254 is combined with the sodium salt of 3-(4'-chloro-phenyl)-6-(sulfo-phenyl)-2,5-dihydro-pyrrolo[3,4-c]pyrrole-1,4-dione, whereupon the rheological behaviour is improved.

JP-A-H03/26 767 and JP-A-2000/273 346 disclose other diketopyrrolopyrrole derivatives (more precisely 3,6-diphenyl-2,5-dihydro-pyrrolo[3,4-c]pyrrole-1,4-diones), which are used as dispersants.

WO 02/48 268 and WO 02/48 269 disclose compositions which can be used, for example, in colour filters and comprise pigments of the generic formula

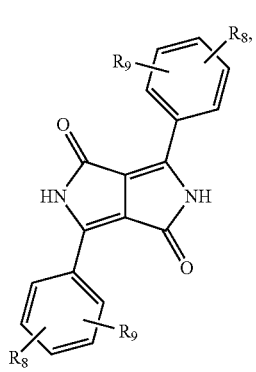

(IV)

wherein $R_8$ and $R_9$ are, each independently of the other, hydrogen, methyl, tert-butyl, chlorine, bromine, CN or phenyl, and also certain quaternary ammonium sulfonates of a pigment of the same class.

WO 2004/007 604 proposes phenyl-thio-, phenyl-sulfinyl- and phenyl-sulfonyl-substituted diketopyrrolopyrroles which in colour filters have high transparency and slightly bathochromically displaced absorption.

3,6-Di(4'-bromo-phenyl)-2,5-dihydro-pyrrolo[3,4-c]pyrrole-1,4-dione [84632-54-2] is known from EP 0 061 426 A1. DE 40 37 556 A1 discloses the combination of that pigment with a mixture of partially sulfonated and chlorinated diketopyrrolopyrroles, as a result of which the rheological behaviour and the saturation can be improved. EP 0 430 875 A2 furthermore discloses the use of that mixture in water-based coatings.

According to the disclosure of EP 0 232 222 A1, brominated diketopyrrolopyrroles are said to be distinguished especially by good thermal resilience and high fluorescence. According to Polymers Paint Colour Journal 179, 457 [1989] and Bull. Soc. Chim. Belg. 97/8-9, 615 [1988], 3,6-di(4'-chloro-phenyl)-2,5-dihydro-pyrrolo[3,4-c]pyrrole-1,4-dione also has thermal stability equal to that of 3,6-di(4'-bromo-phenyl)-2,5-dihydro-pyrrolo[3,4-c]pyrrole-1,4-dione: both decompose at about 500° C. JP H02/055 362A and JP H02/210 459A use 3,6-di(4'-bromo-phenyl)-2,5-dihydro-pyrrolo[3,4-c]pyrrole-1,4-dione as an electrophotographic charge carrier, for example as a toner.

EP 0 962 499 A2 discloses a process for the preparation of pigmentary diketopyrrolopyrroles which can also be substituted by bromine, with the addition of particle growth inhibitors.

JP 2000/160 084 A discloses red resist inks which comprise C. I. Pigment Red 254, a diketopyrrolopyrrole sulfonate and a cationic polymeric dispersant, the polymeric dispersant being a reaction product (amide or salt) of a poly(lower alkylene imine) with at least two carboxy groups of a polyester according to U.S. Pat. No. 4,224,212, or a reaction product of a polyisocyanate and an alcohol or amine according to EP 0 154 678 A1, or a mainly (meth)acrylic copolymer according to EP 0 311 157 A1 which contains basic heterocyclic groups connected by way of functional groups.

JP 2001/240 780 A is similar but discloses, as dispersants, graft copolymers of a polyamine with a polyamide, polyester amide or polyester having free carboxy groups.

JP 2000/089 024 A discloses colour filter compositions comprising preferably diketopyrrolopyrroles of formula

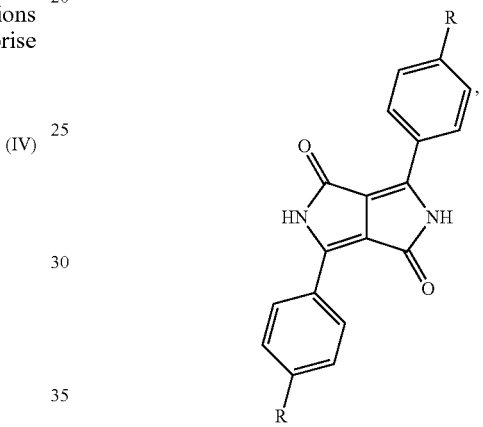

wherein R is hydrogen, methyl, ethyl, propyl, $N(CH_3)_2$, $N(C_2H_5)_2$, $CF_3$, Cl or Br, and also various resin components. The possibility of combination with other pigments is mentioned, amongst which C. I. Pigment Red 177 and C. I. Pigment Red 224 are also listed.

JP 2002/328 215 A discloses colour filter compositions comprising the same diketopyrrolopyrroles, but with a particle size of mainly from 20 to 80 nm, and also, optionally, a dispersant.

JP 2000/089 025 A discloses colour filter pigment compositions comprising C.I. Pigment Red 254 and another red or yellow pigment, for example C. I. Pigment Red 177, C. I. Pigment Red 224 or another diketopyrrolopyrrole, and also, optionally, a dispersant. Although dispersants are expressly not necessary, there may be added, for example, phthalocyanine derivatives or wetting agents. However, the pigments have usually been treated with a resin, which leads to problems in the production of colour filters. In the Examples, moreover, the x value in the standard colour chart reaches 0.601 at best (F10 light source; Yxy colour system, C.I.E. 1931).

JP H11/217 514 A discloses colour filter compositions comprising C. I. Pigment Red 254 and C. I. Pigment Orange 38 or C. I. Pigment Orange 71, a polyamide resin and also, optionally, a wetting agent, for example a cationic wetting agent.

JP 2001/229 520 A discloses colour filter compositions comprising a diketopyrrolopyrrole, kneaded with a salt, and a crystal growth inhibitor, for example C. I. Pigment Red 255 substituted by $SO_2NH(CH_2)_3N(CH_3)_2$.

JP 2001/264 528 A discloses colour filter compositions comprising a diketopyrrolopyrrole, reprecipitated and kneaded with a salt, and a crystal growth inhibitor, for example C. I. Pigment Red 255 substituted by $SO_2NH(CH_2)_3N(CH_3)_2$, and also, optionally, a dispersant.

JP 2005/345 884 A discloses pigment compositions for colour filters, comprising C. I. Pigment Red 177 and C. I. Pigment Red 254. JP 2006/307 149 A discloses pigment compositions for colour filters, comprising C. I. Pigment Red 177, C. I. Pigment Red 254 and additionally C. I. Pigment Yellow 139 and also sulfonated dispersants. However, in both cases the contrast ratio leaves something to be desired.

JP 2007/047 760 A describes red colour filters which are said to have a specified average amplitude transmittance ratio. Example IX discloses C. I. Pigment Red 254 having a specific surface area of 92 $m^2/g$ in combination with Pigment Red 177 having a specific surface area of 82 $m^2/g$ and a dispersant of formula

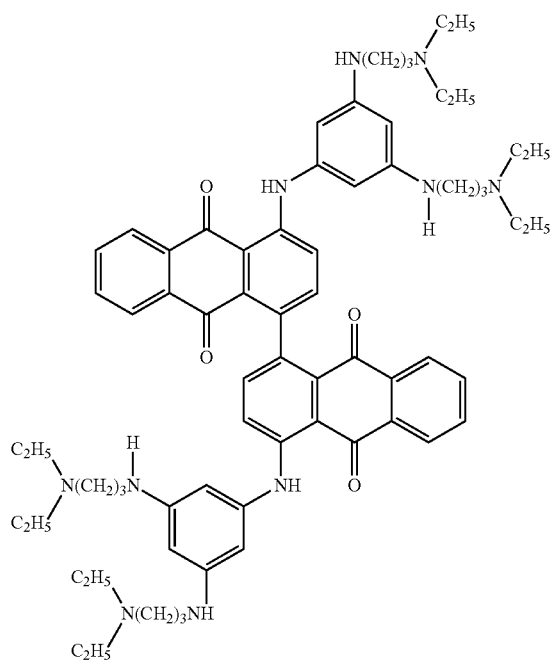

in a ratio of 86.52:8.93:4.55. In the case of that combination, however, the contrast ratio is not entirely satisfactory. C.I. Pigment Red 177 usually results in marked lowering of the brightness (Y value in the CIE 1931 Yxy colour system).

JP 2007/031 539 A discloses pigment compositions comprising C.I. Pigment Red 254 and phthalimidomethylquinacridone. The contrast ratio is said to be high but the hue is not satisfactory.

WO 01/04 215 discloses a process which results in a C.I. Pigment Red 254 having better colouristic properties in colour filters.

U.S. Pat. No. 4,451,398 and EP 0 321 919 disclose dispersants containing pyrazolylmethyl groups.

U.S. Pat. No. 5,334,727 discloses further dispersants which also contain pyrazolylmethyl groups and which may optionally be sulfonated.

U.S. Pat. No. 6,361,594 discloses a process for direct preparation of pyrrolo[3,4-c]pyrroles using particle growth inhibitors, including imidazol-1-ylmethylquinacridone and pyrazol-1-ylmethylquinacridone.

EP 0 704 497, EP 0 764 696 and EP 0 765 919 disclose binary mixed crystals and solid solutions of 1,4-diketopyrrolopyrroles which may contain chlorine or bromine substituents and also processes for the preparation thereof.

Despite the many proposals, success has not been achieved hitherto in developing colourant compositions for colour filters that meet all requirements, such as precise hue, high transmittance, high contrast ratio, high brightness, high dispersibility, high dispersion stability, high compatibility with various binder systems, high cross-linking speed and a high degree of curing in photo-crosslinking systems, high fastness to light and high thermal stability, especially in the production of colour filters. This applies especially to use in colour display screens which have to meet EBU and/or NTSC standards (x=0.64/y=0.33 and x=0.67/y=0.33, respectively), preferably using an F10 or similar light source.

Although red pigments that are thermally stable per se and that can be converted into a desired, very finely divided form using methods known per se such as, for example, wet grinding or kneading are known, as are dispersants that are suitable therefor per se, success has not hitherto been achieved therewith in producing red colour filters that, after being subjected to a high degree of thermal stress, have sufficiently high contrast ratio. For reasons that are not known, diketopyrrolopyrrole-pigment-containing systems that are actinically hardenable, in particular, unlike conventional systems such as mass-colouring of plastics or surface-coating composition applications, result in a very substantial deterioration of transparency and contrast ratio during the processing phase (from application of the dispersion to complete hardening).

Colourant compositions have now been found, surprisingly, which meet the desired criteria to an astonishingly better degree.

The invention accordingly relates to a composition for the production of colour filters which comprises
(a) a colourant of formula

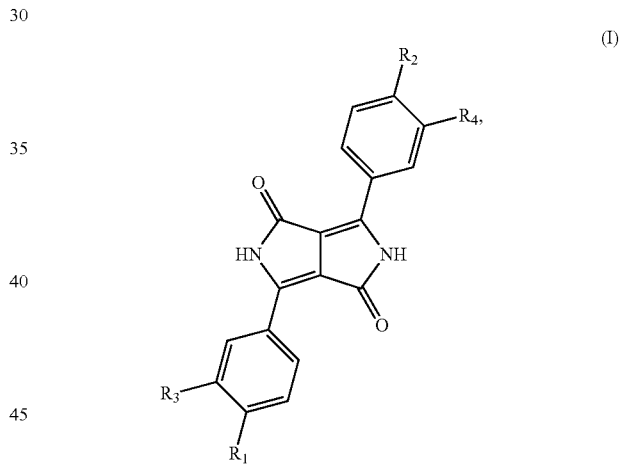

(I)

wherein $R_1$, $R_2$, $R_3$ and $R_4$ are, each independently of the others, H, Cl, Br, CN, $CF_3$, $R_5$, $OR_5$, $SR_5$, $SOR_5$, $SO_2R_5$, $NR_6COR_5$, $COOR_6$, $CONR_5R_6$, $CONH_2$ or $CON(R_7)$, preferably Cl, Br, CN or $R_5$, $R_5$, in each case independently of any other $R_5$, is $C_1$-$C_5$alkyl, $C_2$-$C_5$alkylene, phenyl or 2-naphthyl, preferably methyl or phenyl, $R_6$, in each case independently of any other $R_6$, is H, $C_2$-$C_5$alkyl or $C_2$-$C_5$alkylene, preferably H or $CH_3$, and $R_7$, in each case independently of any other $R_7$, is $C_4$-$C_8$alkylene which is uninterrupted or interrupted one or more times by $NR_6$, $NOR_6$, O, S, SO and/or by $SO_2$, $R_7$ in $N(R_7)$ forming with N a preferably 5- or 6-membered heterocyclic ring, or a mixture, mixed crystal or solid solution thereof, with the proviso that, based on the total colourant of formula (I) or a mixture, mixed crystal or solid solution thereof, from 20 to 100 mol % $R_1$ are Br and from 80 to 100 mol % $R_3$ are H, preferably from 20 to 100 mol % of formula (Ia)
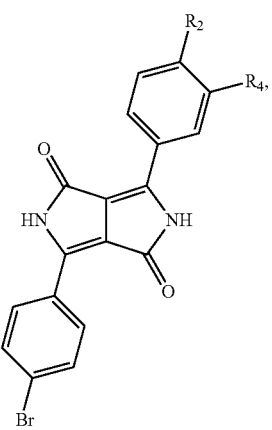
especially of formula
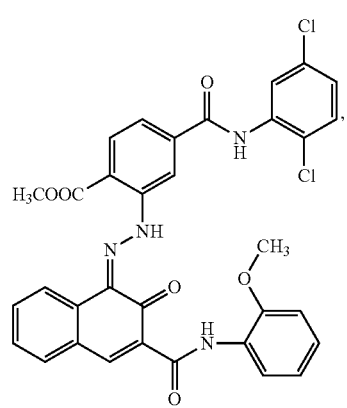
(Ib)
and/or
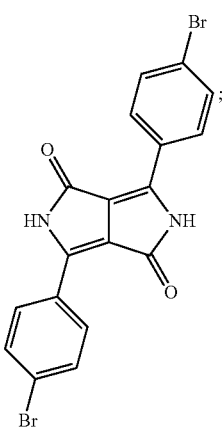
(Ic)
(b) from 0 to 150% by weight, preferably from 3 to 120% by weight, especially from 10 to 100% by weight, based on (a), of a colourant of formula
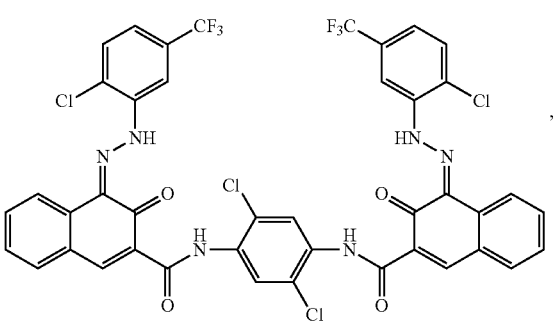
(IIa) (IIb)

-continued
(IIc)
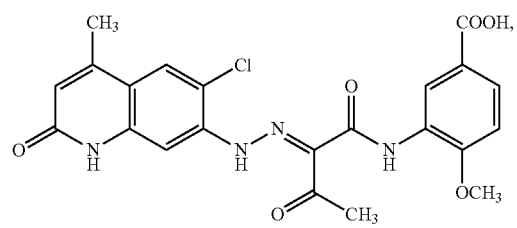
(IId)
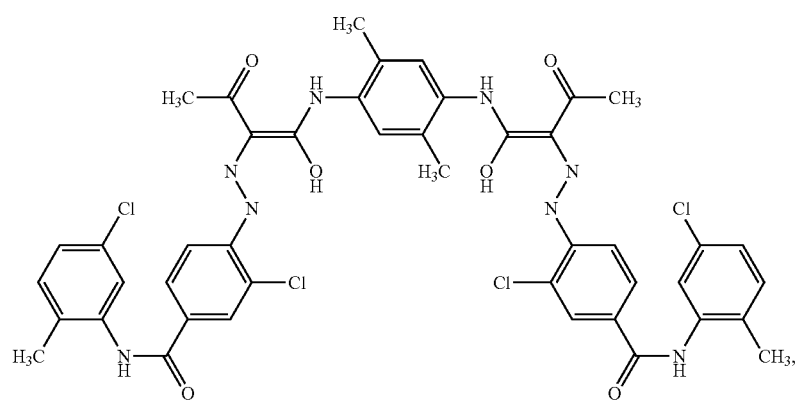
(IIe)
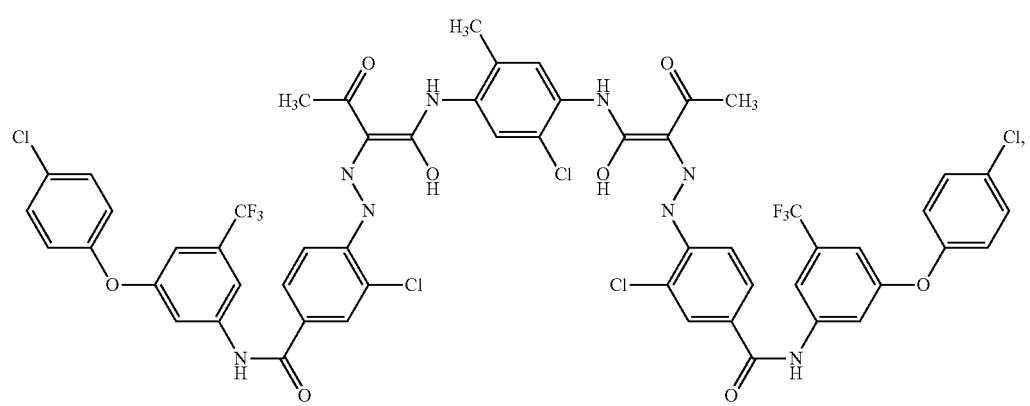
(IIf)
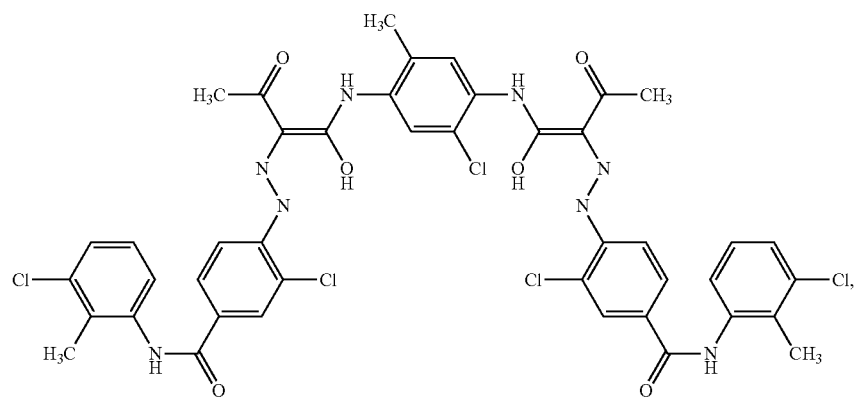

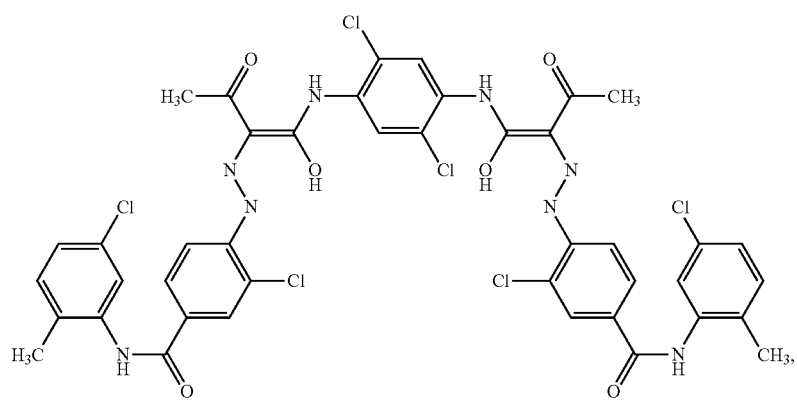
(IIg)
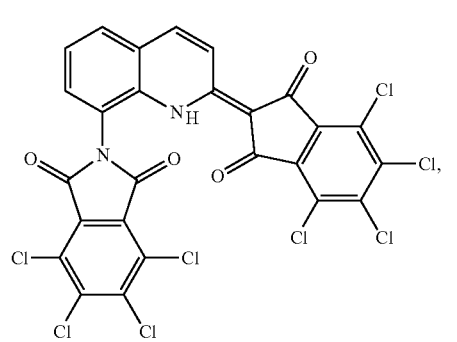
(IIh)
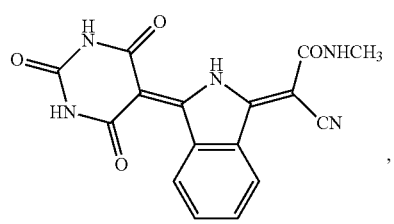
(IIi)
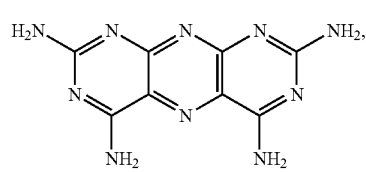
(IIj)
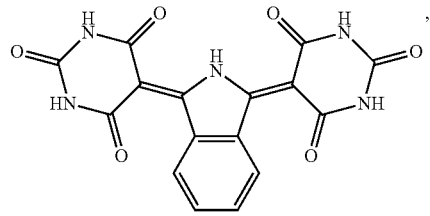
(IIk)
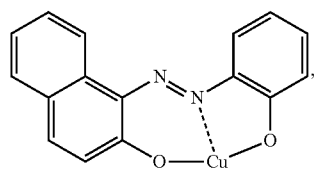
(IIl)
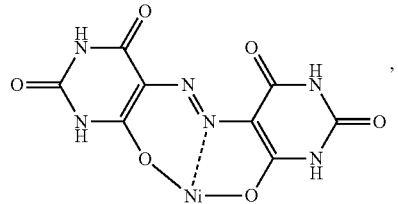
(IIm)
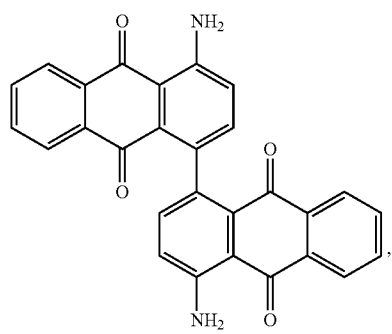
(IIn)
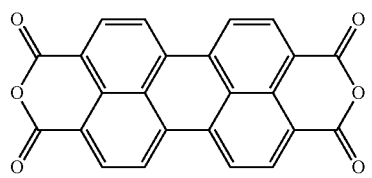
(IIo)

-continued

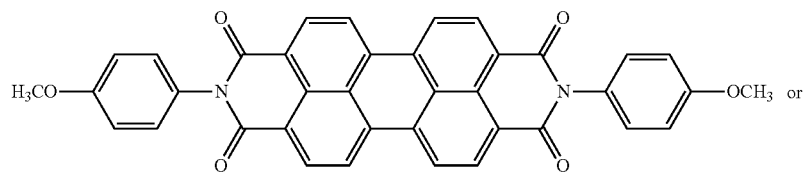 (IIp)

or

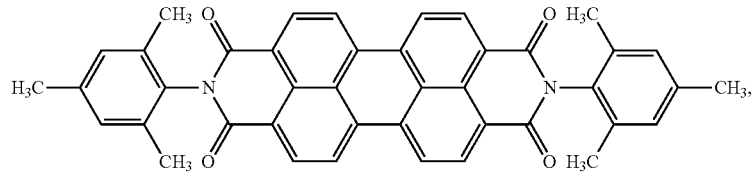 (IIq)

or of a mixture of two or more thereof;

(c) from 1 to 25% by weight, preferably from 3 to 20% by weight, especially from 3 to 15% by weight, based on (a), of a colourant of formula

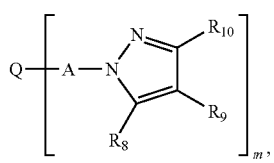 (IIIa)

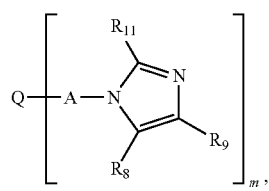 (IIIb)

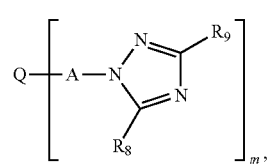 (IIIc)

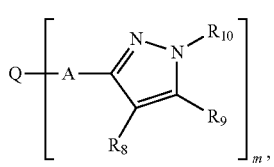 (IIId)

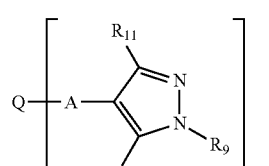 (IIIe)

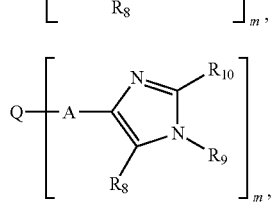 (IIIf)

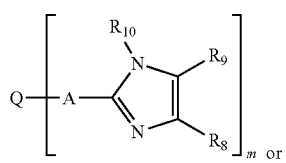 (IIIg)

or

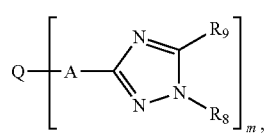 (IIIh)

or of a mixture of colourants of formula (IIIa), (IIIb), (IIIc), (IIId), (IIIe), (IIIf), (IIIg) and/or (IIIh), wherein Q is a chromophore radical selected from unsubstituted or substituted 3,6-diphenyl-2,5-dihydropyrrolo[3,4-c]pyrrole-1,4-dione, 4,4'-diamino-1,1'-bisanthraquinone, perylenetetracarboxylic acid dianhydride, perylenetetracarboxylic acid diimide, quinacridone, 6,13-dihydroquinacridone and quinacridonequinone radicals, A is $C_1$-$C_6$alkylene, preferably methylene, m is the number 1 or 2, and $R_8$, $R_9$, $R_{10}$ and $R_{11}$ are, each independently of the others, H, halogen, $C_1$-$C_{18}$alkyl which is unsubstituted or substituted one or more times by halogen, $C_1$-$C_6$alkoxy and/or by di($C_1$-$C_6$alkyl)amino, or $C_6$-$C_{12}$aryl which is unsubstituted or substituted one or more times by halogen, $NO_2$, $C_1$-$C_{12}$alkyl, $C_1$-$C_6$alkoxy and/or by di($C_1$-$C_6$alkyl)amino, it being optionally possible for $R_8$ and $R_9$ and/or $R_9$ and $R_{10}$ to be connected by a bond so that further alicyclic, aromatic or heterocyclic rings are formed;

(d) from 0 to 10% by weight, preferably from 0.01 to 8% by weight, based on the sum of (a) and (b), of a colourant of formula $$Q'\!-\!\!\left[SO_3M\right]_n,$$ (IV)

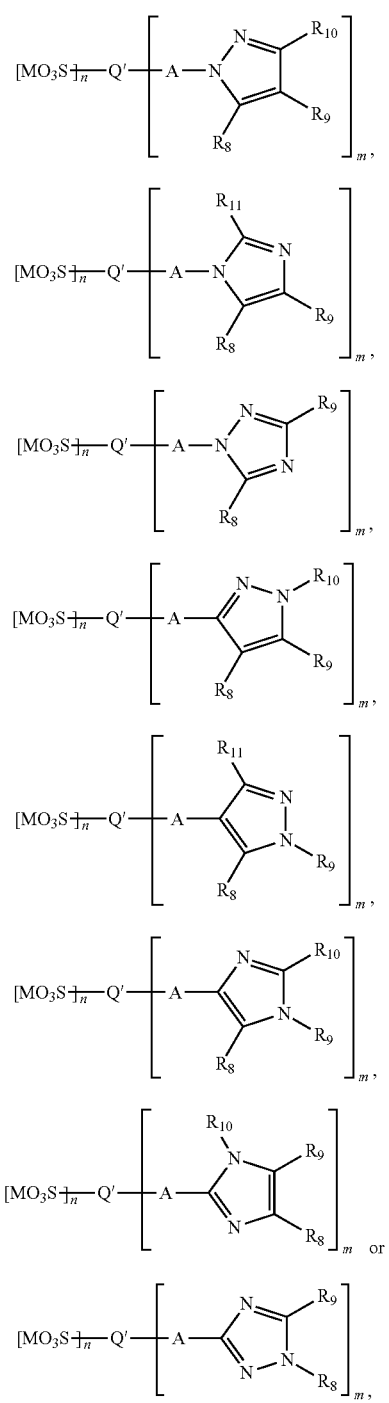

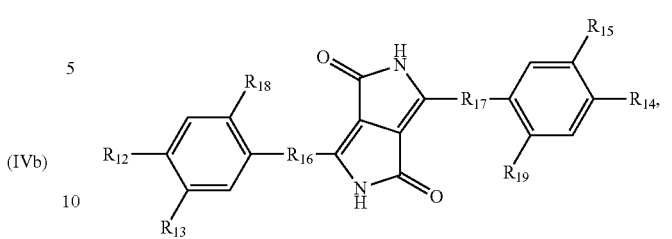

wherein $R_{12}$ is $R_1$ or $A_a$-[—NH—]$_n$—$X_x$—[—CH$_2$—]$_c$[—Y—Z—]$_z$-G and $R_{13}$ is $R_3$ or $A_a$-[—NH—]$_n$—$X_x$-[—CH$_2$-]$_c$[—Y—Z—]$_z$-G, but $R_{12}$ and $R_{13}$ are not both $A_a$-[—NH—]$_n$—$X_x$—[—CH$_2$—]$_c$[—Y—Z—]$_z$-G, either $R_{14}$ is $R_2$ and at the same time $R_{15}$ is $A_a$-[—NH—]$_n$—$X_x$—[—CH$_2$—]$_c$[—Y—Z—]$_z$-G, or $R_{14}$ is $A_a$-[—NH—]$_n$—$X_x$—[—CH$_2$—]$_c$[—Y—Z—]$_z$-G and at the same time $R_{15}$ is $R_4$, $R_{12}$, $R_{13}$, $R_{14}$ and $R_{15}$ preferably being H, Cl, Br, CH$_3$, OCH$_3$, tert-butyl or $A_a$-[—NH—]$_n$—$X_x$—[—CH$_2$—]$_c$[—Y—Z—]$_z$-G, $R_{16}$ and $R_{17}$ are, each independently of the other, a direct bond, 1,3-phenylene or 1,4-phenylene, preferably both a direct bond, both 1,3-phenylene or both 1,4-phenylene, especially both a direct bond, $R_{18}$ and $R_{19}$ are H or, when $R_{16}$ is 1,3-phenylene or 1,4-phenylene, $R_{18}$ is H or $A_a$-[—NH—]$_n$—$X_x$—[—CH$_2$—]$_c$[—Y—Z—]$_z$-G, and, when $R_{17}$ is 1,3-phenylene or 1,4-phenylene, $R_{19}$ is H or $A_a$-[—NH—]$_n$—$X_x$—[—CH$_2$—]$_c$[—Y—Z—]$_z$-G, A is $C_1$-$C_4$alkylene, preferably CH$_2$, and a is 0 or 1, preferably 0, c is a whole number from 0 to 6, especially 0, 1 or 2, G is NR$_5$R$_6$, N(R$_7$), NR$_6$—NR$_5$R$_6$ or NR$_6$—N(R$_7$), n is 0, 1 or 2, preferably 0, X is carbonyl or sulfonyl and x is 0 or 1, with preference being given to X being carbonyl and x being 1, Y, in each case independently of any other Y, is O, S or NR$_6$, preferably NR$_6$, Z, in each case independently of any other Z, is $C_2$-$C_8$alkylene, preferably 1,2-ethylene, 1,2-propylene, 1,3-propylene, 1,4-butylene or 1,6-hexylene, especially 1,3-propylene, z is 0 or a number from 1 to 3, preferably 1 or 2, especially 1, with the proviso that the sum of a, n, x and z, especially a, x and z, is at least 1, preferably at least 2, and $R_1$, $R_2$, $R_5$, $R_6$ and $R_7$ are as defined for formula (I) but independent of formula (I);

or of a mixture of colourants of formula (V).

Component (a) consists of preferably from 20 to 100 mol %, especially from 40 to 100 mol %, of colourants of formula (Ia), especially (Ib) and/or (Ic). As additives to the colourant of formula (Ia) special preference is given to the colourants of formula (I) wherein $R_1$=$R_2$=Cl/$R_3$=$R_4$=H (C. I. Pigment Red 254) and/or $R_1$=$R_2$=H/$R_3$=$R_4$=CN (C. I. Pigment Orange 71).

Component (b) preferably consists of from 50 to 100% by weight of colourants of formulae (IIh), (IIj), (IIk), (IIm) and/or (IIn). Special preference is given to components (b) of formulae (IIm) or (IIn), especially (IIm).

or of a mixture of colourants of formula (IV), (IVa), (IVb), (IVc), (IVd), (IVe), (IVf), (IVg) and/or (IVh), wherein A, m, $R_8$, $R_9$, $R_{10}$ and $R_{11}$ are as defined in the case of (c), Q' is as defined for Q in the case of (c) but is independent of the meaning of Q, n is a number 1 or 2, and M is H, an alkali metal, ½ alkaline earth metal, ammonium or primary, secondary, tertiary or quaternary ammonium; and (e) from 0 to 30% by weight, preferably from 3 to 25% by weight, especially from 5 to 20% by weight, based on (a), of a colourant of formula Preference is given to components (c) of formula (IIIa), (IIIb), (IIId), (IIIe), (IIIf), (IIIg) and/or (IIIh). Special preference is given to components (c) of formula (IIIa), (IIId) and/or (IIIe).

Preference is given to components (d) of formula (IV), (IVa), (IVd) and/or (IVe). Special preference is given to component (d) of formula (IVe).

Alkyl and alkylene groups may of course be linear or, if they contain 3 or more carbon atoms, they may be branched once or more than once or also, optionally, they may be monocyclic or, in the case of 4 or more carbon atoms, polycyclic.

The substituents of Q are customary substituents of pigment chromophores, for example, halogen, $C_1$-$C_4$alkyl, $C_1$-$C_4$alkoxy or phenyl, especially chlorine or methyl. Q is preferably a 3,6-diphenyl-2,5-dihydropyrrolo[3,4-c]pyrrole-1,4-dione or quinacridone (that is, 5,12-dihydroquino[2,3-b]acridine-7,14-dione) radical unsubstituted or substituted by halogen, $C_1$-$C_4$alkyl, $C_1$-$C_4$alkoxy or by phenyl. Special preference is given to Q being an unsubstituted 3,6-diphenyl-2,5-dihydropyrrolo[3,4-c]pyrrole-1,4-dione or quinacridone radical.

The groups $A_a$-[—NH—]$_n$—$X_x$—[—$CH_2$—]$_c$[—Y—Z—]$_z$-G in component (e) of formula (V) advantageously contain at least two non-adjacent nitrogen atoms. These $A_a$-[—NH—]$_n$—$X_x$—[—$CH_2$—]$_c$[—Y—Z—]$_z$-G groups are preferably of formula $A_a$-$X_x$—[—Y—Z—]$_z$-G (that is, n=c=0). In component (e) of formula (V) special preference is given to $R_{12}$ being $R_1$, $R_{13}$ being $R_3$, $R_{14}$ being $R_2$ and/or $R_{15}$ being $A_a$-[—NH—]$_n$—$X_x$—[—$CH_2$—]$_c$[—Y—Z—]$_z$-G, especially $A_a$-$X_x$—[—Y—Z—]$_z$-G, wherein a is 0, x is 1 and z is 1 or 2, very especially $R_{12}$ being H, Br or $C_1$, $R_{13}$ being H, Cl or methyl, $R_{14}$ being H and $R_{15}$ being $A_a$-[—NH—]$_n$—$X_x$—[—$CH_2$—]$_c$[—Y—Z—]$_z$-G, especially $A_a X_x$—[—Y—Z—]$_z$-G, wherein a is 0, x is 1 and z is 1 or 2.

It has been found, surprisingly, that synergies come about between the para-bromine-substituted pigment component (a) of formula (Ia), especially (Ib) and/or (Ic), and components (c) of formula (IIIa), (IIIb), (IIIc), (IIId), (IIIe), (IIIf), (IIIg) and/or (IIIh) and also, when present, (d) of formula (IV), (IVa), (IVb), (IVc), (IVd), (IVe), (IVf), (IVg) and/or (IVh). These synergies can be further substantially increased by the additional presence of one or more components (e) of formula (V) so that even especially extreme processing conditions result in virtually no undesirable reduction—or even no reduction at all—in transparency and contrast ratio.

These effects, which are entirely unexpected on the basis of the prior art, in actinically hardenable colour filter compositions occur even in the wide quantitative ranges mentioned hereinbefore, but increasingly so in the case of combination of the respectively preferred amounts of (a), (c) and (e), especially of all the components (a), (c), (d) and (e).

The invention accordingly relates also to a composition comprising (a) a colourant of formula (I) containing from 20 to 100 mol % of formula (Ia), optionally (b) from 0 to 150% by weight, based on (a), of one or more colourants of formula (IIa), (IIb), (IIc), (IId), (IIe), (IIf), (IIg), (IIh), (IIi), (IIj), (IIk), (III), (IIm), (IIn), (IIo), (IIp) and/or (IIq), (c) from 1 to 25% by weight, based on (a), of one or more colourants of formula (IIIa), (IIIb), (IIIc), (IIId), (IIIe), (IIIf), (IIIg) and/or (IIIh), (d) from 0 to 10% by weight, based on the sum of (a) and (b), of one or more colourants of formula (IV), (IVa), (IVb), (IVc), (IVd), (IVe), (IVf), (IVg) and/or (IVh), and (e) from 3 to 25% by weight, based on (a), of one or more colourants of formula (V); preferably (c) from 2 to 20% by weight, based on (a), of one or more colourants of formula (IIIa), (IIIb), (IIIc), (IIId), (IIIe), (IIIf), (IIIg) and/or (IIIh) and (e) from 5 to 20% by weight, based on (a), of one or more colourants of formula (V); especially (c) from 3 to 15% by weight, based on (a), of one or more colourants of formula (IIIc), (IIIb), (IIIc), (IIId), (IIIe), (IIIf), (IIIg) and/or (IIIh), (d) from 0.01 to 8% by weight, based on (a), of one or more colourants of formula (IV), (IVa), (IVb), (IVc), (IVd), (IVe), (IVf), (IVg) and/or (IVh), and (e) from 5 to 20% by weight, based on (a), of one or more colourants of formula (V). Special preference is given therein, in each case, to components (c) wherein Q is a quinacridone radical. Very good results are also obtained with components (c) wherein Q is a diketopyrrolopyrrole radical.

Preferably the components (a) or, when present, (b), especially all components (a) and, where applicable, (b) that are present, have an average particle size of from 10 to 100 nm, with ≦10% by weight of particles being ≧100 nm and ≦50% by weight of particles being ≧50 nm. Special preference is given to component (a) having an average particle size of from 10 to 30 nm, the average particle length being from 20 to 50 nm and the average particle height being from 2 to 10 nm, especially in combination with the aspect ratio disclosed hereinbelow. Very special preference is given to component (a) having an average particle height of from 2.5 to 7 nm, especially from 3 to 6 nm.

The particle size is understood to be the equivalent diameter of the particles, which can be determined, for example, by means of a Joyce-Löbl disc centrifuge or by dynamic laser radiation scattering. Simple evaluation of transmission electron microscopy (TEM) images is also often adequate. The averaging of the particle size should be carried out on the basis of weight (that is, plotting the total weight of particles of the same equivalent diameter versus this equivalent diameter for all sizeable particles, the average particle size is the arithmetic mean of the resulting weight distribution—see "basic principles of particle size analysis" by Dr. Alan Rawle, obtainable from Malvern Instruments).

The above-mentioned desired particle dimensions can especially advantageously be achieved directly during pigment synthesis. In the process, para-bromine-containing diketopyrrolopyrrole colourants of formula (I) in the presence of from 1 to 25% by weight, preferably from 2 to 20% by weight, especially from 3 to 15% by weight, based on the colourant of formula (I), of one or more colourants of formula (IIIc), (IIIb), (IIIc), (IIId), (IIIe), (IIIf), (IIIg) and/or (IIIh) entirely unexpectedly crystallise in platelet form. In the presence of a plurality of colourants of formula (IIIa), (IIIb), (IIIc), (IIId), (IIIe), (IIIf), (IIIg) and/or (IIIh), which have different chromophores Q, in the presence of a colourant of formula (IV), (IVa), (IVb), (IVc), (IVd), (IVe), (IVf), (IVg) and for (IVh) whose chromophore Q' differs from the chromophore Q of at least one colourant of formula (IIIa), (IIIb), (IIIc), (IIId), (IIIe), (IIIf), (IIIg) and/or (IIIh), and/or in the presence of a colourant of formula (V), this morphology is, surprisingly, retained in actinically hardenable compositions even in the case of high thermal stress. The amounts suitable for this effect are disclosed elsewhere herein. The platelets according to the invention are characterised by an average aspect ratio of at least 2.5, preferably at least 3.5, especially at least 5. The aspect ratio is the ratio of the length to the height of primary particles and can be determined by methods known per se, for example as mentioned in PCT/EP 2008/067 011 (page 2/line 19 to page 3/line 11), it also being possible, as an alternative to the customary shadowing technology, for the particle height to be precisely determined by atomic force microscopy (AFM).

The invention accordingly relates also to a process for the preparation of a colourant of the main formula (I), which consists of particles having an average aspect ratio of at least 2.5, preferably at least 3.5, especially at least 5, wherein an alkali metal salt of the colourant of main formula (I) is precipitated by protonation in the presence of from 1 to 25% by weight, preferably from 2 to 20% by weight, especially from 3 to 15% by weight, based on the colourant of formula (I), of one or more colourants of formula (IIIa), (IIIb), (IIIc), (IIId), (IIIe), (IIIf), (IIIg) and/or (IIIh). In the process, preference is given to adjusting the pH, by adding water, hydroxy compounds, acid salts and/or acid, to a final value of <10, especially <7, very especially <5. The alkali metal salt of the colourant of the main formula (I) is advantageously precipitated directly from the reaction mixture produced in the course of synthesis.

Of course it is also possible, alternatively, to deprotonate a crude or pigmentary colourant of the main formula (I) in an inert medium using strong bases and then to carry out the desired precipitation, as a result of which higher purity is achievable.

Diketopyrrolopyrroles, such as C. I. Pigment Red 254 and 3,6-di(4¹-bromo-phenyl)-2,5-dihydropyrrolo[3,4-c]pyrrole-1,4-dione, can in this context be synthesised, for example, in accordance with the reaction schemes and processes disclosed in Bull. Soc. Chim. Belg. 97/8-9, 615 [1988], EP 0 061 426 A1 or, preferably, those disclosed in EP 0 094 911, EP 0 098 808, EP 0 184 982, EP 0 232 222 A1 or EP 0 302 018.

"Main formula (I)" is understood to mean that at least 80% by weight of the particles consist of one or more compounds of formula (I), it being possible for the compounds of formula (IIIa), (IIb), (IIIc), (IIId), (IIIe), (IIIf), (IIIg) and/or (IIIh) to be distributed homogeneously or non-homogeneously in the particles (for example, as solid solutions or mixed crystals) or also to be present adsorbed on the surface of the particles or in a form separate therefrom (for example, as independent, optionally morphologically different particles).

Optionally, however, it is possible for the above-mentioned desired particle size not to be adjusted until after synthesis, for example by means of mechanical or chemical processes known per se, such as dry or wet grinding, kneading with a salt or treatment with acid (reprecipitation or "acid pasting"), base (for example, as described in EP 0 707 049) and/or polar solvents (Ostwald ripening or recrystallisation). A plurality of those processes can also be combined simultaneously or sequentially, for example as mentioned in EP 1 194 485.

Preference is given, both in component (c) and in component (d), to $R_8$, $R_9$ and $R_{10}$ being, each independently of the others, H or $C_1$-$C_4$alkyl, especially H or methyl.

Preferred components (e) are of formula

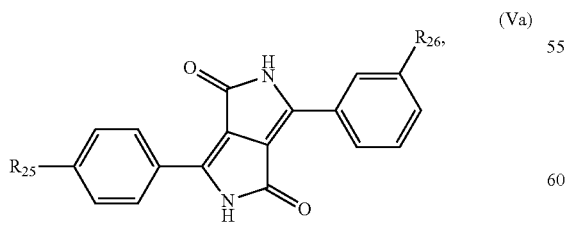

(Va)

wherein $R_{25}$ is H, Br, Cl, F or methyl and $R_{26}$ is CONR$_6$—Z-G or CO—[—NR$_6$—Z—]$_2$-G (that is to say, $R_{26}$=A$_0$-[—NH—]$_0$—[CO]$_1$—[—CH$_2$—]$_0$[—NR$_6$—Z—]$_{1-2}$-G), and $R_6$, Z and G are as defined for formula (V).

Especially preferred colourants of formula (V) are the novel colourants of formula

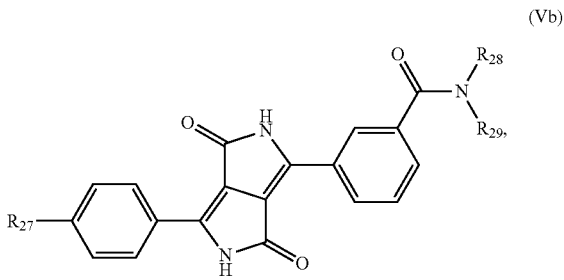

(Vb)

wherein $R_{27}$ is Br, Cl, F or methyl, $R_{28}$ is H, $C_1$-$C_6$alkyl, or $C_6$-$C_{12}$alkyl wherein a carbon atom has been replaced by a nitrogen atom, and $R_{29}$ is $C_6$-$C_{18}$alkyl wherein 1 or 2 carbon atom(s) has/have been replaced by nitrogen atom(s). Alkyl groups wherein 1 or 2 carbon atom(s) has/have been replaced by nitrogen atom(s) are, for example, 2-aza-2-methyl-pent-5-yl, 3-aza-3-ethyl-hex-6-yl or 3,7-diaza-3-ethyl-dec-10-yl.

It has been found, surprisingly, that, compared to other, known colourants of formula (V), colourants of formula (Va), especially colourants of formula (Vb), result in unexpected, significant improvements in the viscosity, thermal stability, colour point (position on the x,y-chromaticity diagram), transmittance (Y) and contrast ratio of the compositions according to the invention. There are advantageously used colourants of formula (V), (Va) or (Vb) having extremely fine primary particles, for example primary particles having an average particle size of from 0.1-50 nm and a high specific surface area, for example 80-500 m²/g.

The colourants of formula (Vb) can be used especially for improving the rheology and/or stability of pigment dispersions, preferably quinacridone or diketopyrrolopyrrole pigment dispersions, with respect to colour changes on thermal treatment, and also as crystal growth regulators in the preparation of diketopyrrolopyrrole pigments.

Also novel, and claimed, are
the compounds of formula

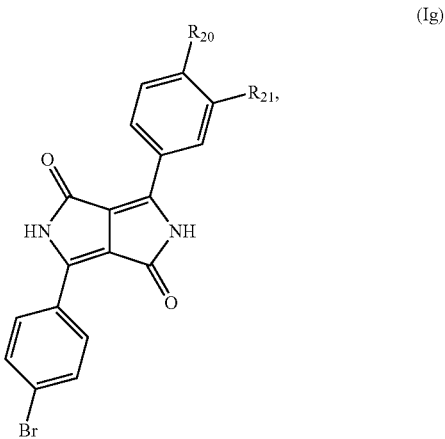

(Ig)

wherein $R_{20}$ and $R_{21}$ are, each independently of the other, H, Cl, Br, CN, CF$_3$, $R_{22}$, OR$_{22}$, SR$_{22}$, SOR$_{22}$, SO$_2$R$_{22}$, NR$_{23}$COR$_{22}$, COOR$_{23}$, CONR$_{22}$R$_{23}$, CONH$_2$, CON(R$_{22}$)$_2$ or CON(R$_{24}$), preferably Cl, Br, CN or R$_{22}$, wherein $R_{22}$, in each case independently of any other $R_{22}$, is $C_1$-$C_5$alkyl, $C_2$-$C_5$alkylene, phenyl or 2-naphthyl, preferably methyl or phenyl, $R_{23}$, in each case independently of any other $R_{23}$, is H, $C_1$-$C_5$alkyl or $C_2$-$C_5$alkylene, preferably H or $CH_3$, and $R_{24}$, in each case independently of any other $R_{24}$, is $C_4$-$C_8$alkylene which is uninterrupted or interrupted one or more times by $NR_{23}$, $NOR_{23}$, O, S, SO or by $SO_2$, $R_{24}$ in $N(R_{24})$ forming with N a preferably 5- or 6-membered heterocyclic ring, with the proviso that $R_{20}$ and $R_{21}$ are not simultaneously Br and H, respectively, and also 3,6-diphenyl-2,5-dihydropyrrolo[3,4-c]pyrrole-1,4-dione mixed crystals and solid solutions comprising a compound of formula (Ic) or (Ig). Preference is given to the compound of formula (Ib). Special preference is given to the mixed crystals or solid solutions according to the invention also comprising, additionally to the compound of formula (Ib), the compound of formula (Ic).

The compounds of formulae (Ia) to (Ig) can be obtained by methods known per se, for example in analogous manner to the methods which are disclosed in EP 0 094 911, EP 0 098 808, EP 0 184 982 or EP 0 302 018.

As constituents of component (a), besides the especially preferred constituents of formula (Ib) and/or (Ic), special preference is also given to pyrrolo[3,4-c]pyrroles of formula

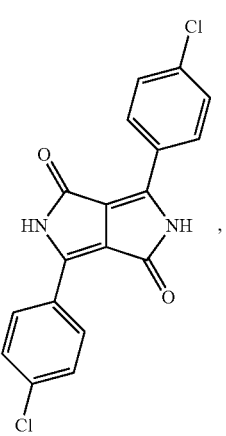

(Id)

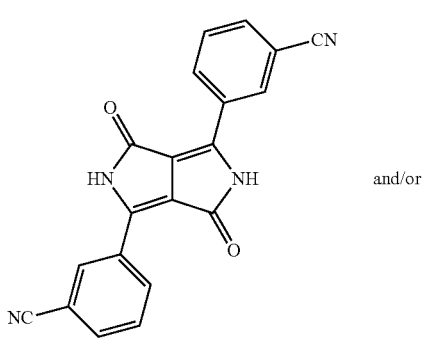

(Ie)

and/or

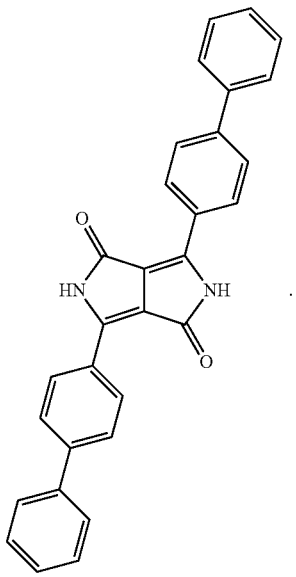

(If)

The invention accordingly relates also to a 3,6-diphenyl-2,5-dihydropyrrolo[3,4-c]pyrrole-1,4-dione mixed crystal or a 3,6-diphenyl-2,5-dihydropyrrolo[3,4-c]pyrrole-1,4-dione solid solution comprising a compound of formula (Ia), preferably a compound of formula (Ib) or (Ic) or both compounds of formula (Ib) and (Ic), and also a compound of formula (Id), (Ie) or (If), or two or three compounds of formulae (Id), (Ie) and (If). The compounds of formulae (Ia), (Id), (Ie) and (If) are preferably present in a total amount of from 80 to 100 mol %, based on the 3,6-diphenyl-2,5-dihydropyrrolo[3,4-c]pyrrole-1,4-dione mixed crystal or the 3,6-diphenyl-2,5-dihydropyrrolo[3,4-c]pyrrole-1,4-dione solid solution. Alternatively, physical mixtures of 3,6-diphenyl-2,5-dihydropyrrolo[3,4-c]pyrrole-1,4-dione mixed crystals or 3,6-diphenyl-2,5-dihydropyrrolo[3,4-c]pyrrole-1,4-dione solid solutions in accordance with the invention with further 3,6-diphenyl-2,5-dihydropyrrolo[3,4-c]pyrrole-1,4-dione colourants can also be used, in which case surprisingly good effects can then also be obtained.

In formula (I), in the case of Q or in $C_1$-$C_5$alkoxy, $C_1$-$C_5$alkyl is, for example, methyl, ethyl, n-propyl, isopropyl, n-butyl, isobutyl, sec-butyl, tert-butyl, n-pentyl or tert-amyl, preferably methyl, ethyl or tert-butyl, especially methyl or tert-butyl. Preference is given to one of $R_1$ and $R_3$ and also one of $R_2$ and $R_4$ in each case being H, in which case special preference is given to $R_1$ and $R_2$ being the same and $R_3$ and $R_4$ being the same.

$C_4$-$C_8$Alkylene which is uninterrupted or interrupted by N, O or by S is, for example, 1,4-butylene, 1,5-pentylene, 3-oxa-1,5-pentylene, 3,3-dioxo-3-thia-1,5-pentylene or 2,4,6-trimethyl-4-aza-2,6-heptylene.

The contrast ratio and the thermal stability can, surprisingly, be further increased if para-halogenated 3,6-diphenyl-2,5-dihydropyrrolo[3,4-c]pyrrole-1,4-dione pigments are used in combination with at least two components (c) and/or (d) wherein Q and Q', respectively, are chromophore radicals which are different from one another.

The invention accordingly relates also to a composition comprising (a') a colourant of formula

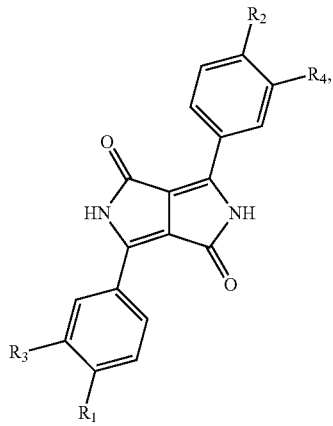
(I)

wherein

R$_1$ is Cl or Br, preferably Br,

R$_2$, R$_3$ and R$_4$ are, each independently of the others, H, Cl, Br, CN, CF$_3$, R$_5$, OR$_5$, SR$_5$, SOR$_5$, SO$_2$R$_5$, NR$_6$COR$_5$, COOR$_6$, CONR$_5$R$_6$, CONH$_2$ or CON(R$_7$), preferably Cl, Br, CN or R$_5$, R$_5$, in each case independently of any other R$_5$, is C$_1$-C$_5$alkyl, C$_2$-C$_5$alkylene, phenyl or 2-naphthyl, preferably methyl or phenyl, R$_6$, in each case independently of any other R$_6$, is H, C$_1$-C$_5$alkyl or C$_2$-C$_5$alkylene, preferably H or CH$_3$, and R$_7$, in each case independently of any other R$_7$, is C$_4$-C$_8$alkylene which is uninterrupted or interrupted one or more times by NR$_6$, NOR$_6$, O, S, SO or by SO$_2$, R$_7$ in N(R$_7$) forming with N a preferably 5- or 6-membered heterocyclic ring, or a mixture, mixed crystal or solid solution thereof, preferably a colourant of formula

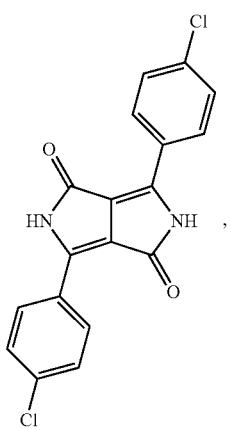
(Id)

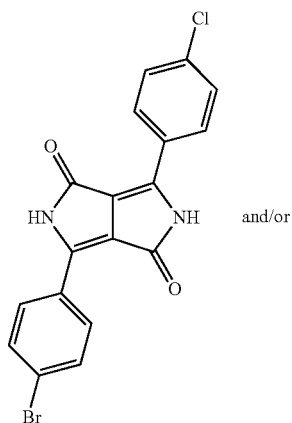
(Ib)

and/or

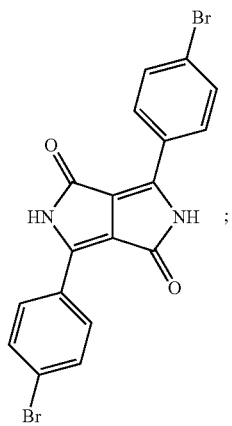
(Ic)

(b') a colourant of formula

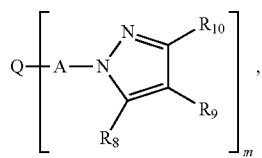
(IIIa)

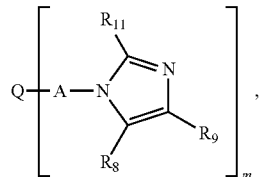
(IIIb)

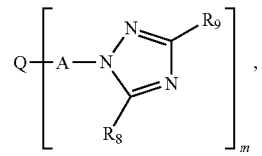
(IIIc)

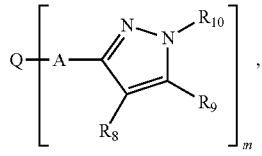
(IIId)

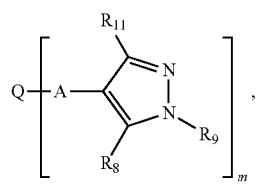 (IIIe)

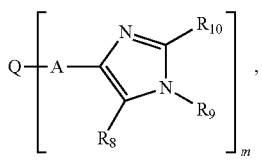 (IIIf)

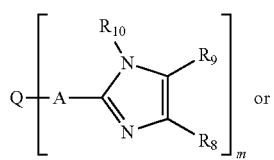 (IIIg) or

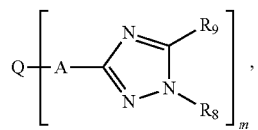 (IIIh)

or a mixture of colourants of formula (IIIa), (IIIb), (IIIc), (IIId), (IIIe), (IIIf), (IIIg) and/or (IIIh), wherein Q is a chromophore radical selected from unsubstituted or substituted 3,6-diphenyl-2,5-dihydropyrrolo[3,4-c]pyrrole-1,4-dione, 4,4'-diamino-1,1'-bisanthraquinone, perylenetetracarboxylic acid dianhydride, perylenetetracarboxylic acid diimide, quinacridone, 6,13-dihydroquinacridone and quinacridonequinone radicals, A is $C_1$-$C_6$alkylene, preferably methylene, m is the number 1 or 2, and $R_8$, $R_9$, $R_{10}$ and $R_{11}$ are, each independently of the others, H, halogen, $C_1$-$C_{18}$alkyl which is unsubstituted or substituted one or more times by halogen, $C_1$-$C_6$alkoxy and/or by di($C_1$-$C_6$alkyl)amino, or $C_6$-$C_{12}$aryl which is unsubstituted or substituted one or more times by halogen, $NO_2$, $C_1$-$C_{12}$alkyl, $C_1$-$C_6$alkoxy and/or by di($C_1$-$C_6$alkyl)amino, it being optionally possible for $R_8$ and $R_9$ and/or $R_9$ and $R_{10}$ to be connected by a bond so that further alicyclic, aromatic or heterocyclic rings are formed;

(c') a colourant of formula $$Q'\text{---}[SO_3M]_n,$$ (IV)

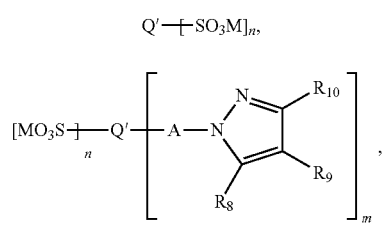 (IVa)

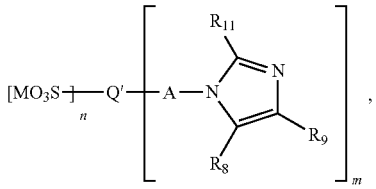 (IVb)

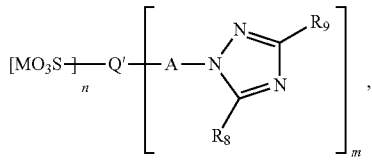 (IVc)

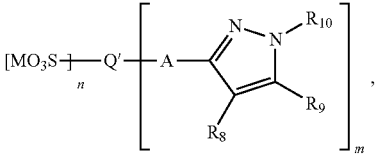 (IVd)

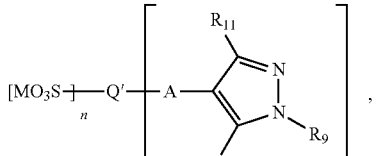 (IVe)

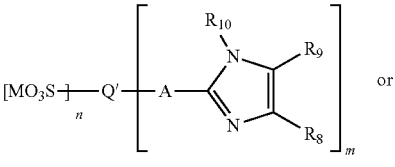 (IVf)

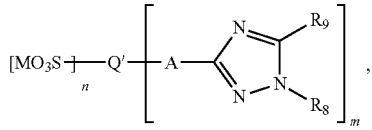 (IVg) or

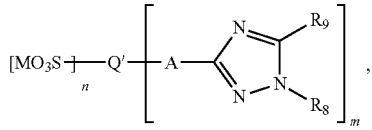 (IVh)

or a mixture of colourants of formula (IV), (IVa), (IVb), (IVc), (IVd), (IVe), (IVf), (IVg) and/or (IVh), wherein A, m, $R_8$, $R_9$, $R_{10}$ and $R_{11}$ are as defined for (c), Q' is as defined for Q in the case of (c) but is independent of the meaning of Q, n is a number 1 or 2, and M is H, an alkali metal, ½ alkaline earth metal, ammonium or primary, secondary, tertiary or quaternary ammonium;

with the proviso that the composition comprises at least two components (b'), at least two components (c'), or at least one each of component (b') and component (c'), which have different chromophore radicals Q, different chromophore radicals Q' or different chromophore radicals Q and Q'.

The composition according to the invention preferably comprises a component (b') or (c') wherein Q or Q', respectively, is a quinacridone radical and also a further component (b') or (c') wherein Q or Q', respectively, is a 3,6-diphenyl-2, 5-dihydropyrrolo[3,4-c]pyrrole-1,4-dione radical. The total amount of components (b') or (c') is advantageously from 0.1 to 70% by weight, based on the amount of component (a'). The weight ratio of the component (b') or (c') wherein Q or Q', respectively, is a quinacridone radical to the component (b') or (c') wherein Q or Q', respectively, is a 3,6-diphenyl-2,5-dihydropyrrolo[3,4-c]pyrrole-1,4-dione radical is advantageously from 1:99 to 99:1, preferably from 5:95 to 95:5, especially from 15:85 to 85:15.

In addition to the components (a') and (b') and/or (c'), this composition preferably also comprises a further component (d') of formula (V), especially formula (Va), with the same definitions and preferences as mentioned hereinbefore and also in the same amounts.

The colour filters and compositions according to the invention may also comprise other, further colourants, especially colourants the chromophore radicals of which are of formula Q", wherein Q" is as defined for Q in the case of (c) and Q' in the case of (d) but is independent of the meaning of Q and Q', but with the proviso that the other, further colourant is not a colourant of formula (I) (which means that Q" may possibly be a pyrrolo[3,4-c]pyrrole radical only if that radical is not included by formula (I)). Further colourants are added in a total amount of advantageously from 0 to 50% by weight, preferably from 0 to 30% by weight, based on (a). In particular embodiments, Q and Q', Q and Q", Q' and Q" or Q, Q' and Q" may be the same, in which case it is possible for Q, Q' and Q" in each case to be substituted in the same manner or differently. Preference is given to at least 2 of Q, Q' and Q" being identical.

All the afore-mentioned preferences, or special preferences, are valid both on their own and also, especially, in combinations of two or more preferences (or special preferences). The more preferences combined with one another, the greater the advantages usually achieved in colour filters. Very especially outstanding results are obtained when the preferred components (a), (c), (d) and (e) are combined with one another. The more of those components (very especially all four) that correspond to the respectively preferred selections, the better the results that are obtained. Component (b) is usually not necessary but can be used, if desired, for optimum adjustment of the colour point.

In addition to the components (a), (c) and also, optionally, (b), (d) and especially (e), and/or additional colourants, especially those of formula Q", the compositions according to the invention may also comprise further, preferably colourless components which are customary in colour filter formulations, such as solvents or, especially, additives, for example stabilisers, antioxidants, UV absorbers, photostabilisers, wetting agents, surfactants, antifoams, plasticisers, texture-improvers, binders, dispersants and also, preferably, polymerisable monomers or oligomers, depolymerisable polymers and/or photoinitiators. Further components of that kind are added in a total amount of advantageously from 0 to 2000%, based on the sum of (a) and (b).

In order to increase the dispersibility in the presence of actinically active components, especially polymerisable monomers or oligomers and/or photoinitiators, preference is given to adding one or more oligomeric dispersants to the composition according to the invention. It has now been found, surprisingly, that the oligomeric dispersant selection made plays a crucial part in influencing the contrast ratio. Unexpectedly, especially colourants of formula (Ic) with the novel combination of dispersants that is described hereinbelow produce in colour filters an especially good, improved contrast ratio even at high curing temperatures.

The invention accordingly relates also to a composition which is modifiable by radiation (actinically) and which comprises (a), (c) and also, optionally, (b), (d), (e) and/or additional colourants, and also (f) a statistical (for example, random), alternating, gradient, graft or block copolymer.

The copolymer (f) is added in an amount of advantageously from 1 to 100% by weight, based on the sum of (a) and (b). In the range 400-700 nm it is preferably at most weakly coloured (absorbance $\leqq 10 \, l \cdot cm^{-1} \cdot g^{-1}$), especially colourless.

Suitable copolymers (f) are, for example:
(f1) cationic copolymers;
(f2) anionic copolymers;
(f3) amphoteric copolymers; or
(f4) non-ionic copolymers.

Copolymers can have, for example, repeating units that are derived from polymerisable or polycondensatable acids, esters, glycols, nitriles, amides, imides, olefins, epoxides or aziridines, such as acrylic or methacrylic acid or their esters, amides or nitriles, terephthalic acid esters, caprolactam, ethylene, propylene, isobutylene, styrene, ethylene oxide or ethyleneimine. Preference is given to graft and block copolymers.

As cationic, anionic, amphoteric or non-ionic copolymer there may be used, for example, Disperbyk® 160, Disperbyk® 161, Disperbyk® 162, Disperbyk® 163, Disperbyk® 164, Disperbyk® 166, Disperbyk® 171, Disperbyk® 182, Disperbyk® 2000, Disperbyk® 2001, Disperbyk® 2070, Disperbyk® 2150 (Byk, D-46483 Wesel), EFKA® 44, EFKA® 46, EFKA® 47, EFKA® 48, EFKA® 4010, EFKA® 4015, EFKA® 4020, EFKA® 4044, EFKA® 4046, EFKA® 4047, EFKA® 4048, EFKA® 4050, EFKA® 4055, EFKA® 4060, EFKA® 4300, EFKA® 4330, EFKA® 4340, EFKA® 4400, EFKA® 4406, EFKA® 4510, EFKA® 4585, EFKA® 4800 (Ciba AG, CH-4002 Basel), Solsperse® 24000, Solsperse® 32550 (Lubrizol Corp., Wickliffe, Ohio 44092, USA), Ajispur® PB-821, Ajispur® PB-822 or Ajispur® PB-823 (Ajinomoto Europe S.A.S., F-75817 Paris).

The copolymer (f) selection made influences the viscosity of the pigment dispersion. Preference is therefore given to using copolymers which result in the pigment dispersion having a low viscosity, for example amphoteric or, especially, cationic copolymers. A pigment dispersion containing 16% by weight solids should preferably have a viscosity of 25 cP or less at 25° C.

In an especially preferred embodiment, the overall composition is a liquid dispersion modifiable by radiation, in which the components (a), when present (b) and, optionally, an additional colourant are present in the form of solid, homogeneously distributed particles. In another especially preferred embodiment, the overall composition is a thermoplastic mass in which the components (a), when present (b) and, optionally, an additional colourant are present in the form of solid, homogeneously distributed particles and which is obtained by radiation from a composition modifiable by radiation and is present preferably in the form of pixels.

Colour filters customarily have red, blue and green pixels and also, in some cases, a black matrix on a transparent carrier material. The composition according to the invention is usually present in the red and/or blue pixels, preferably in the red pixels. Special preference is given to the colourant of the red pixels consisting of a composition according to the invention.

The invention accordingly relates to a colour filter comprising image points (pixels) of at least three colours, wherein a fraction of the image points comprise a composition according to the invention.

Compositions modifiable by radiation are also known as resists (for example, as described in WO 2007/113 107). Radiation (for example, UV light) can, for example, be directed through a mask onto a coating of the composition, in the course of which the irradiated locations become either more insoluble or more soluble. Those parts of the layer which have remained soluble or become soluble are subsequently removed so that the desired image points remain behind. The latter are then usually thermally cured.

Any desired compositions modifiable by radiation can be used, for example—but not exclusively—those which are disclosed in WO 07/062 963 or WO 07/071 497. Preference is given to compositions modifiable by radiation which are subsequently hardened optionally at a temperature of from 40 to 320° C., especially from 180 to 300° C., very especially from 200 to 250° C.

Most of the components of the compositions according to the invention are known and all can be prepared in accordance with or analogously to known processes. With respect to the colourants of formula (V) reference is made here, for example, in entirety to JP-A-H03/26 767 or JP-A-2000/273 346. The compounds may also be, for example, the following compounds (or mixtures thereof):

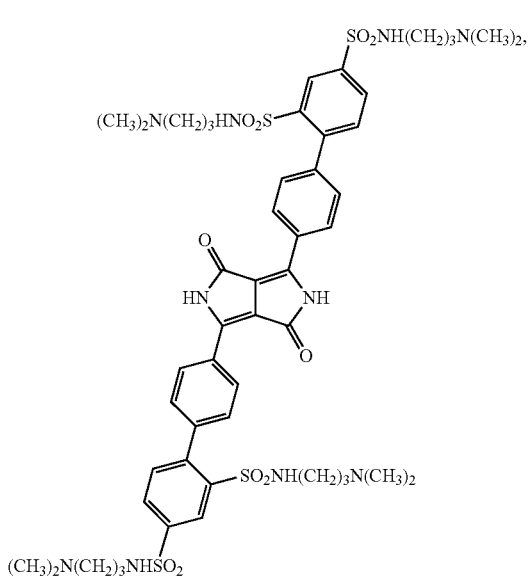
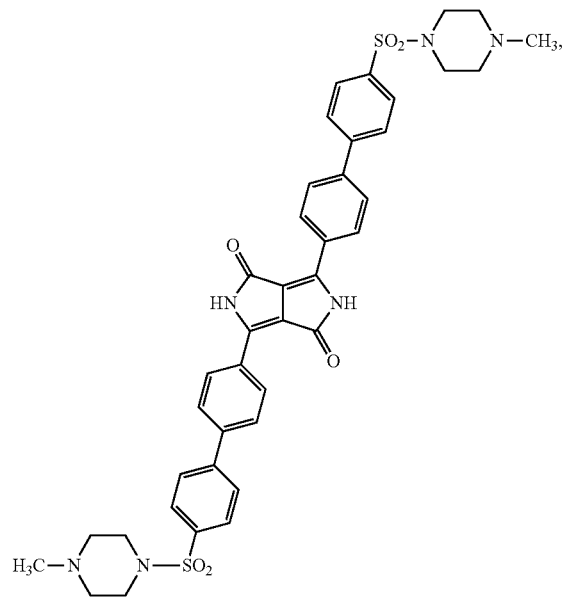
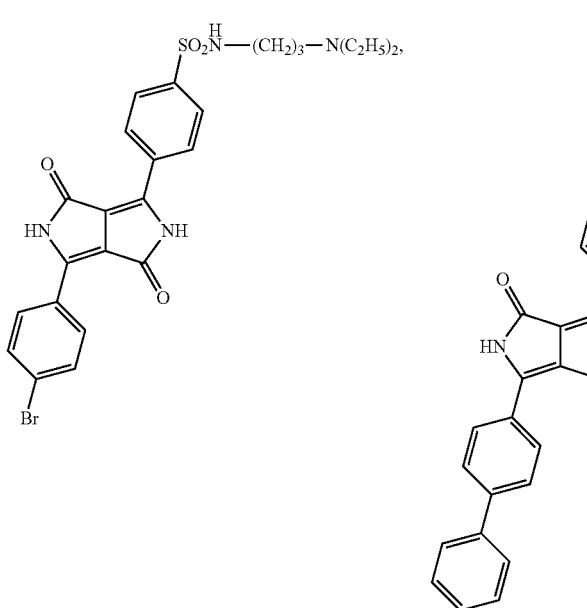
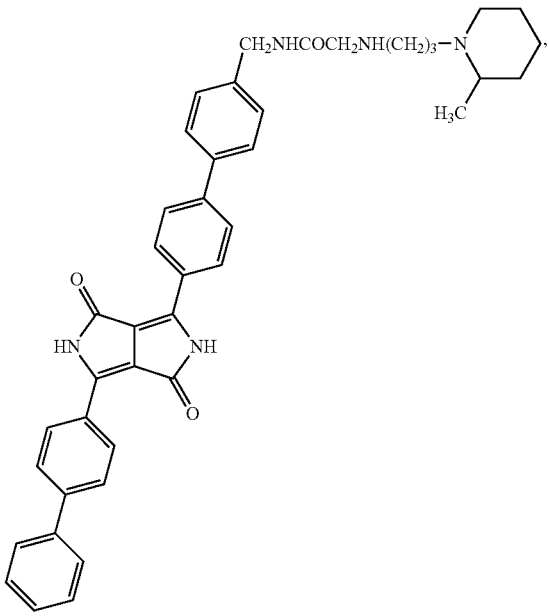

-continued
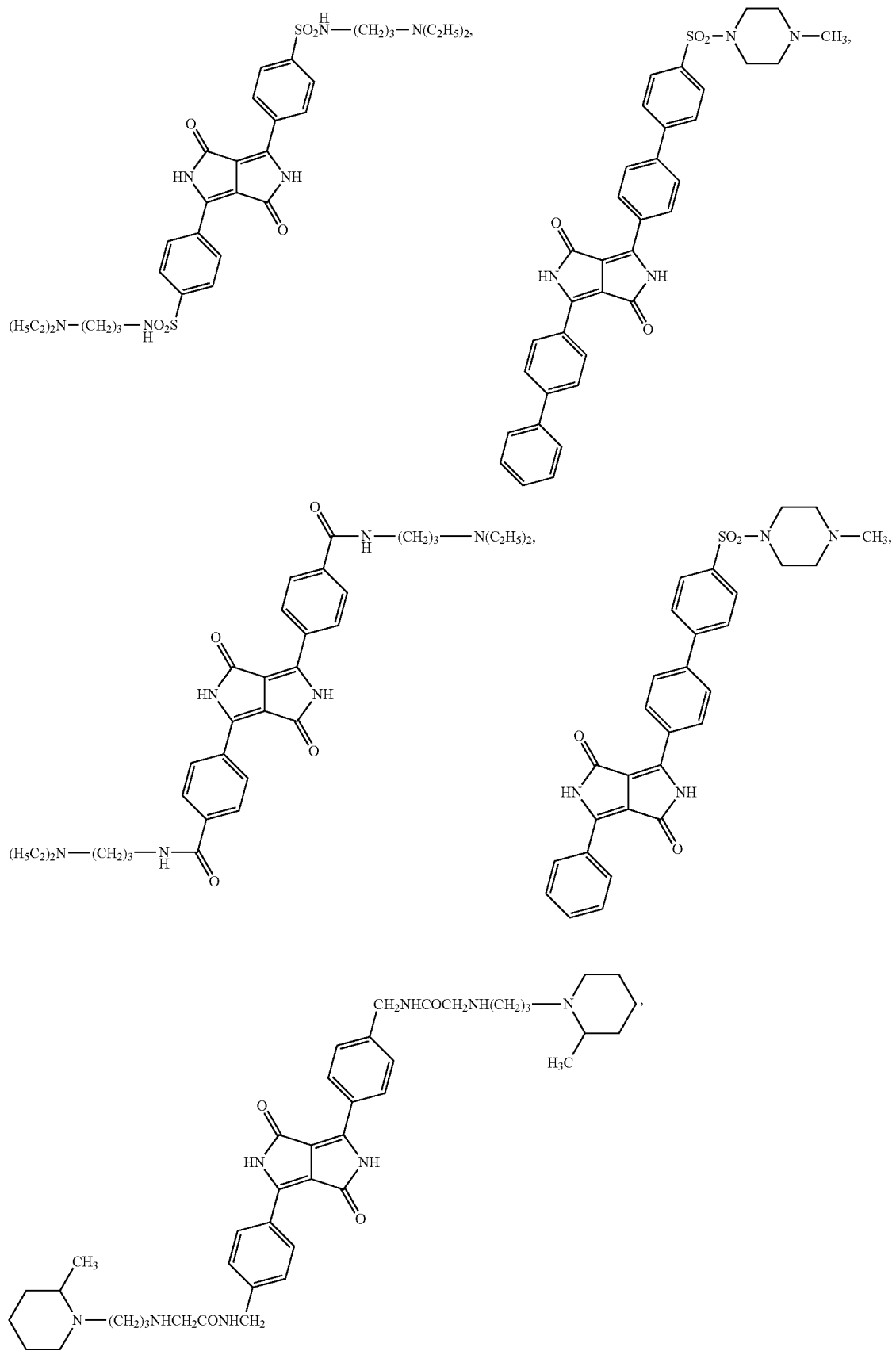

-continued
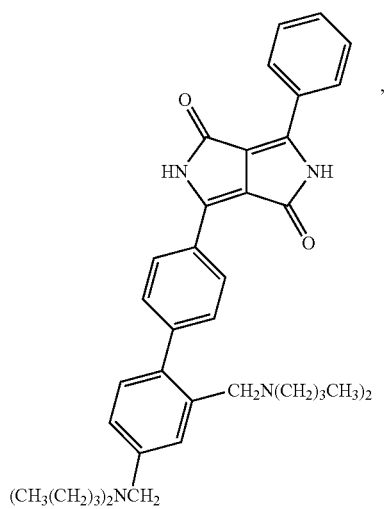
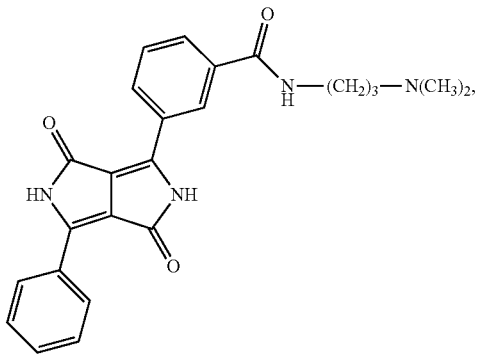
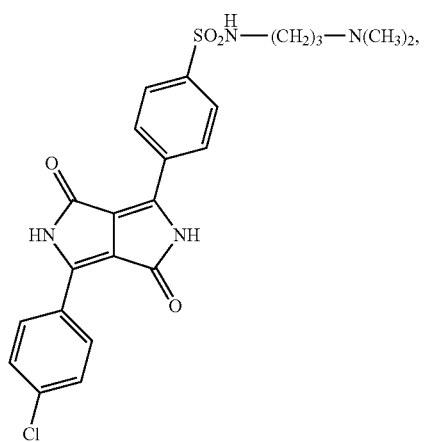
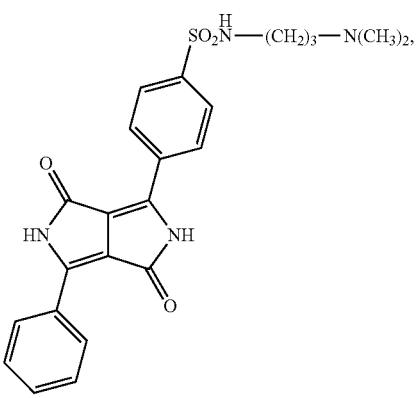
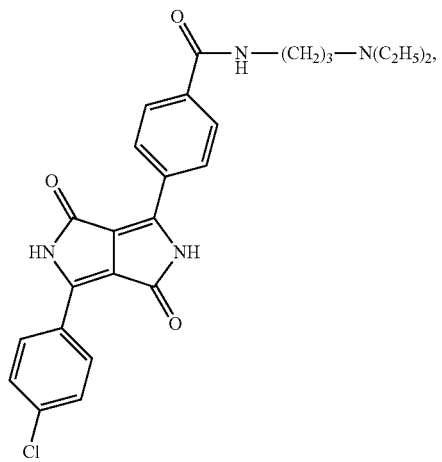
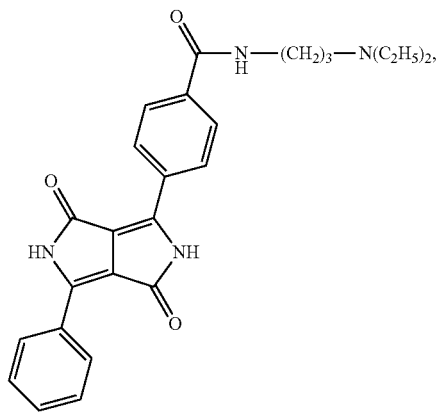

-continued
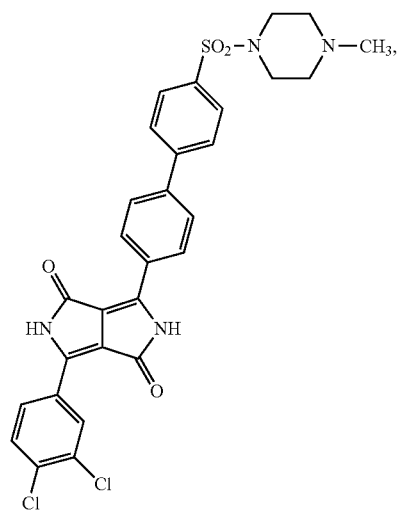
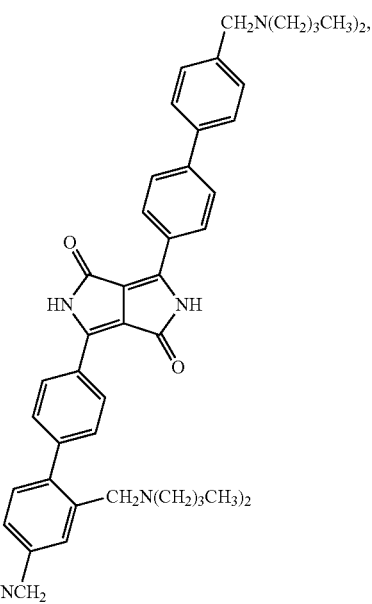
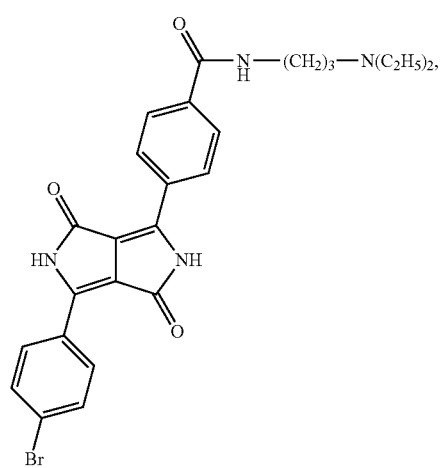
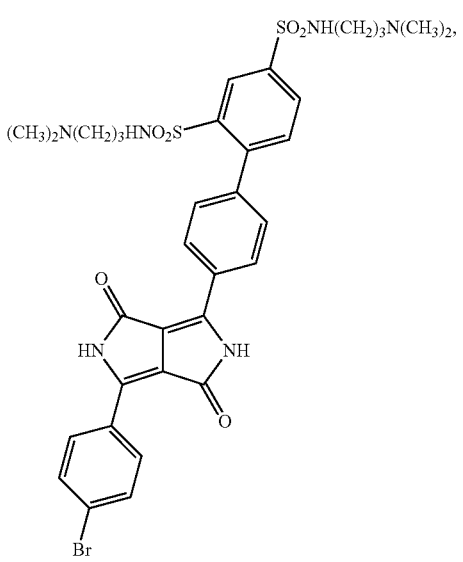
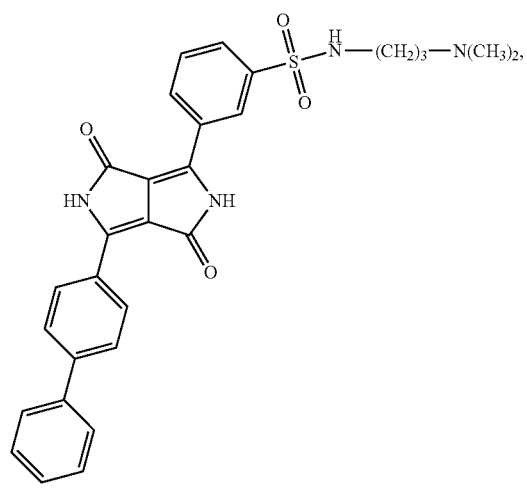
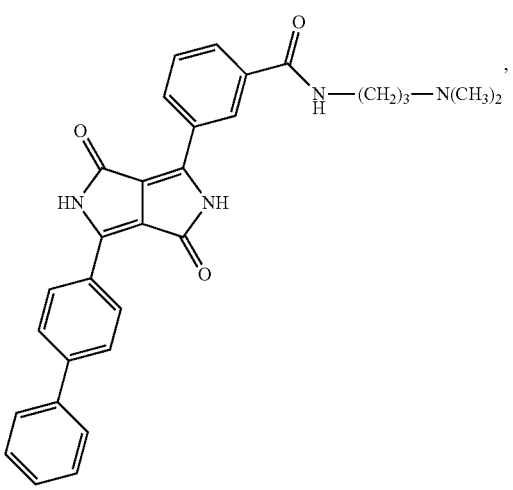

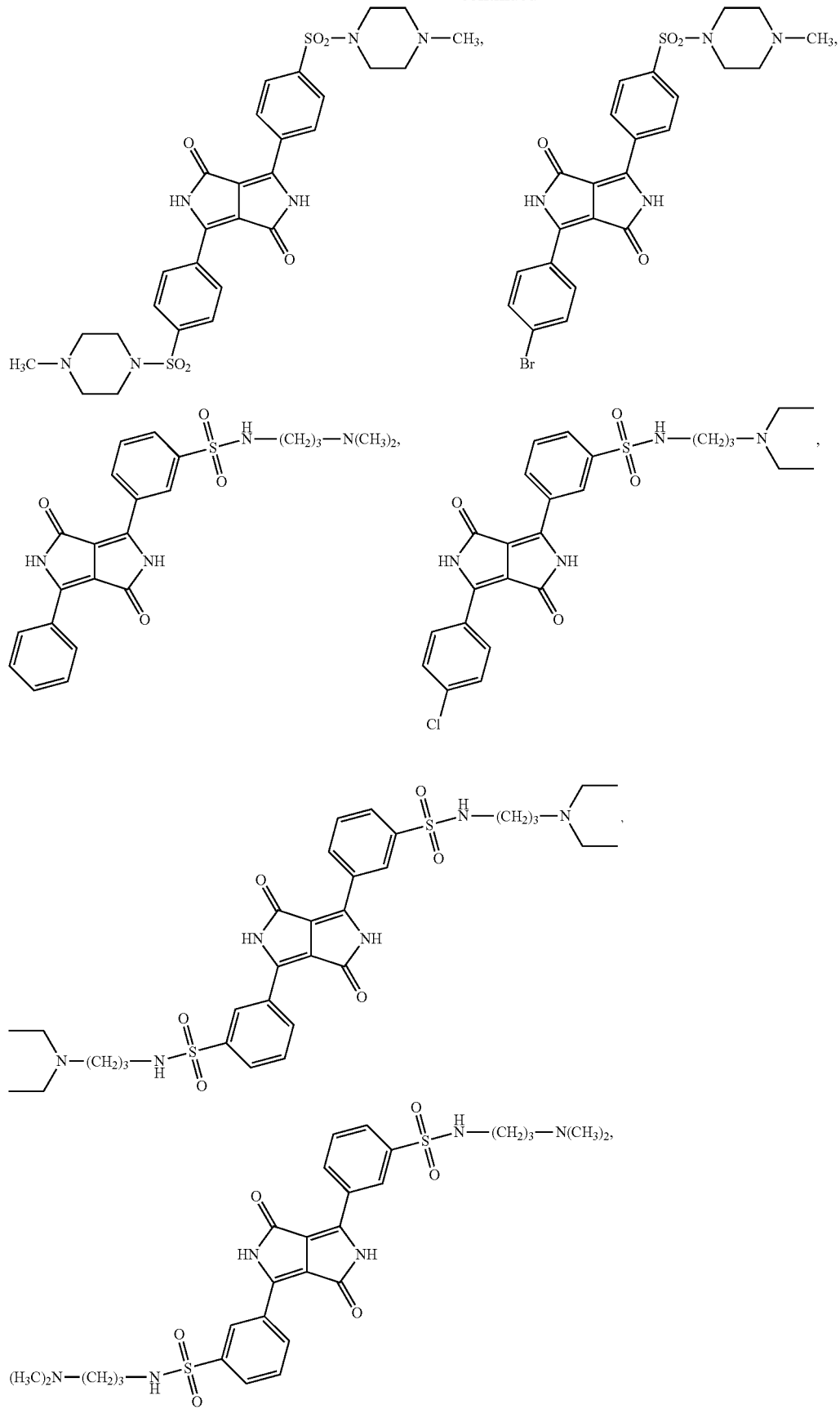

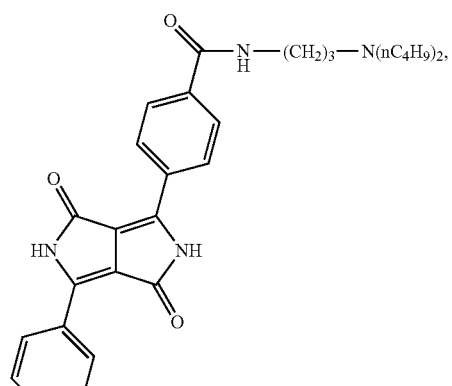
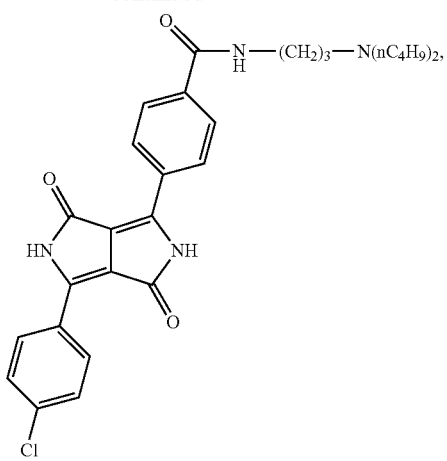
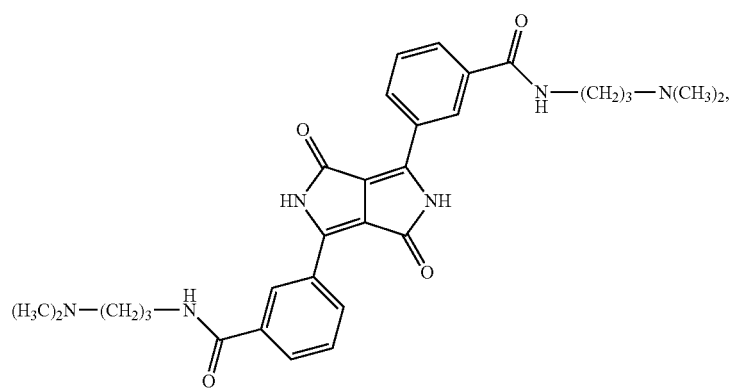
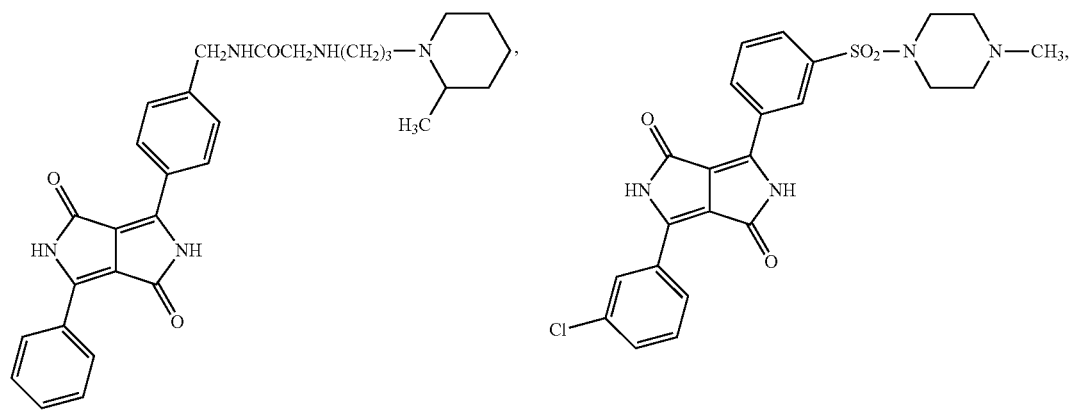

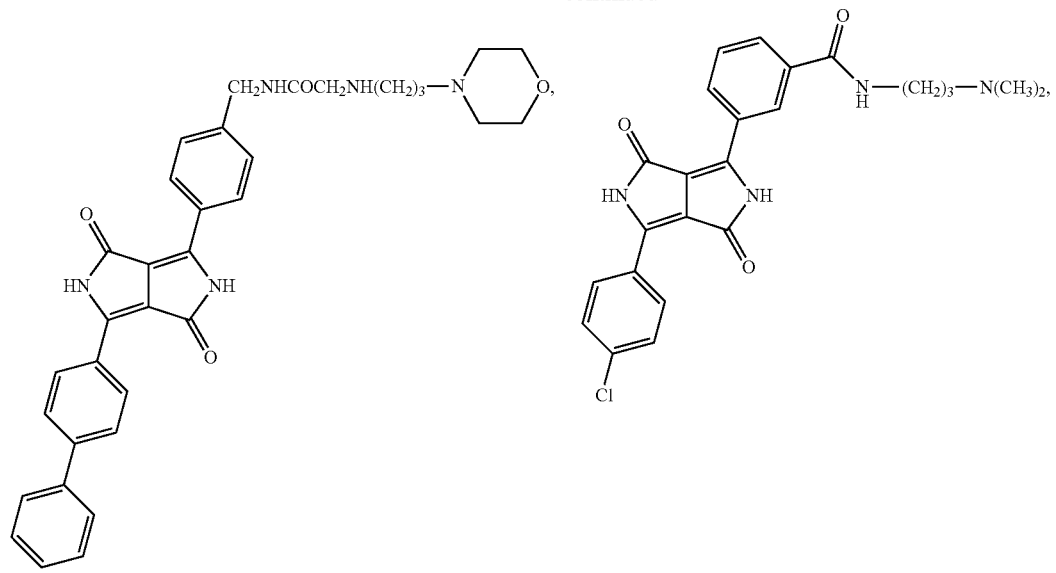
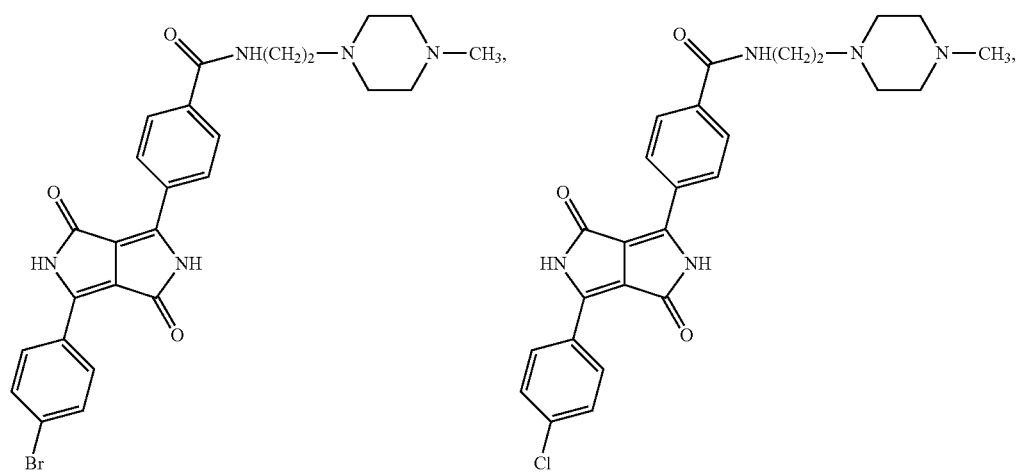
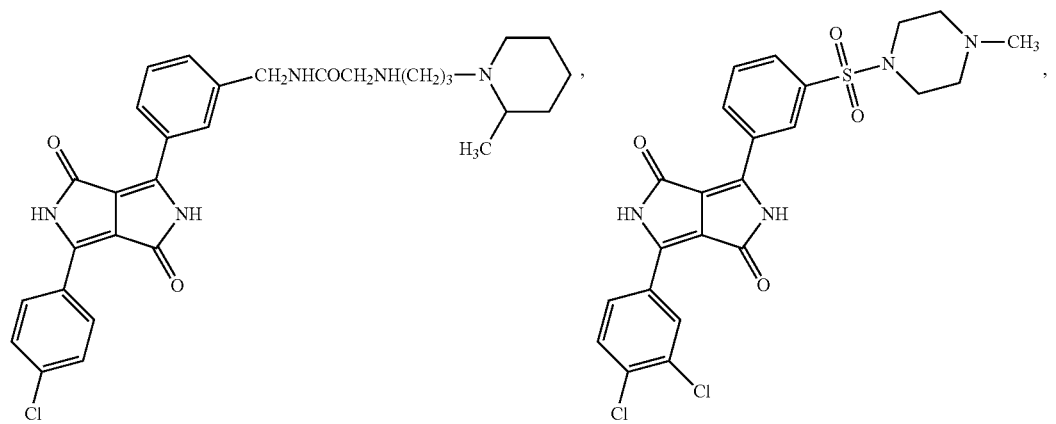

-continued
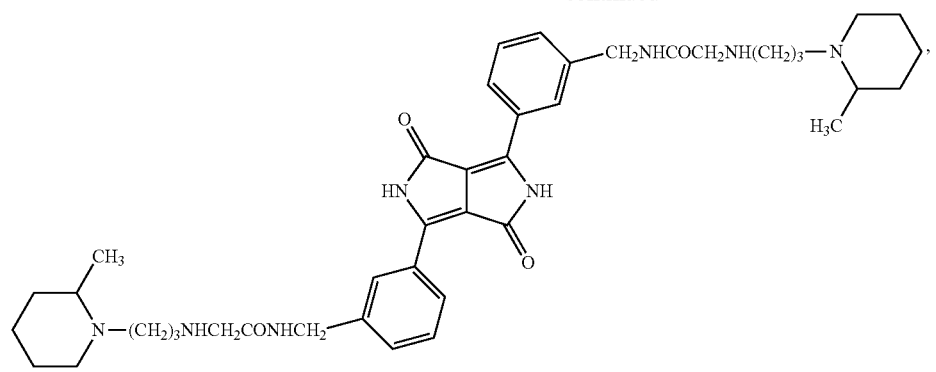
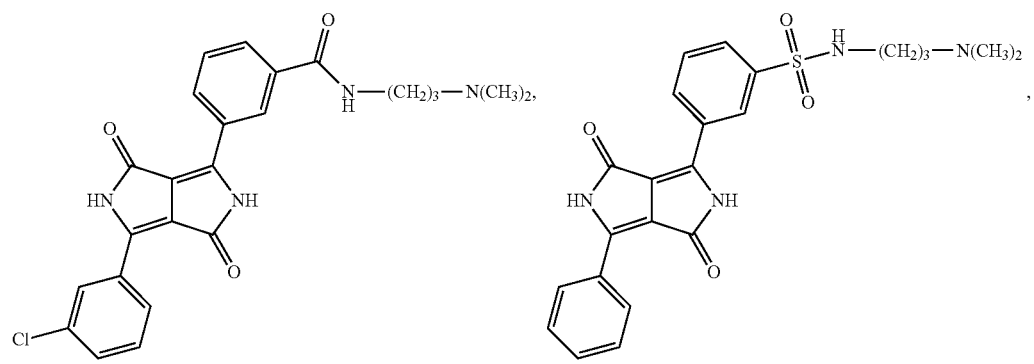
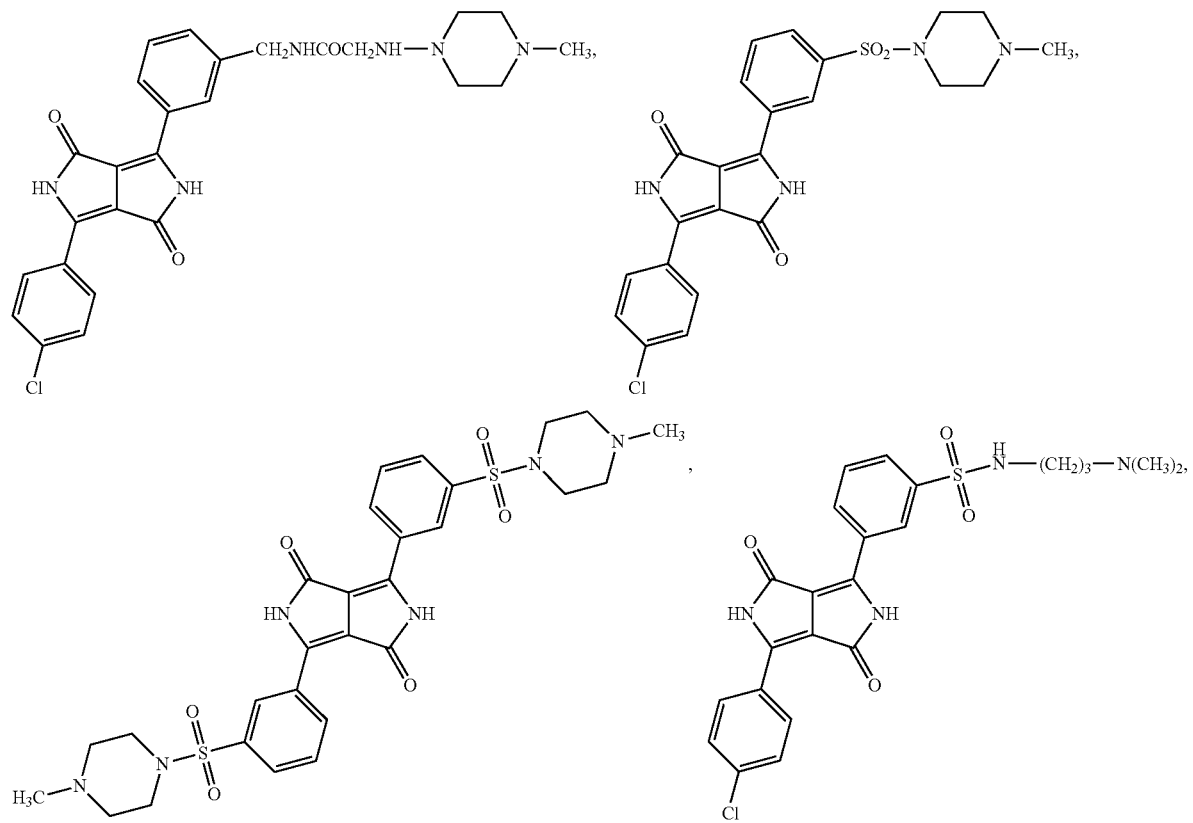

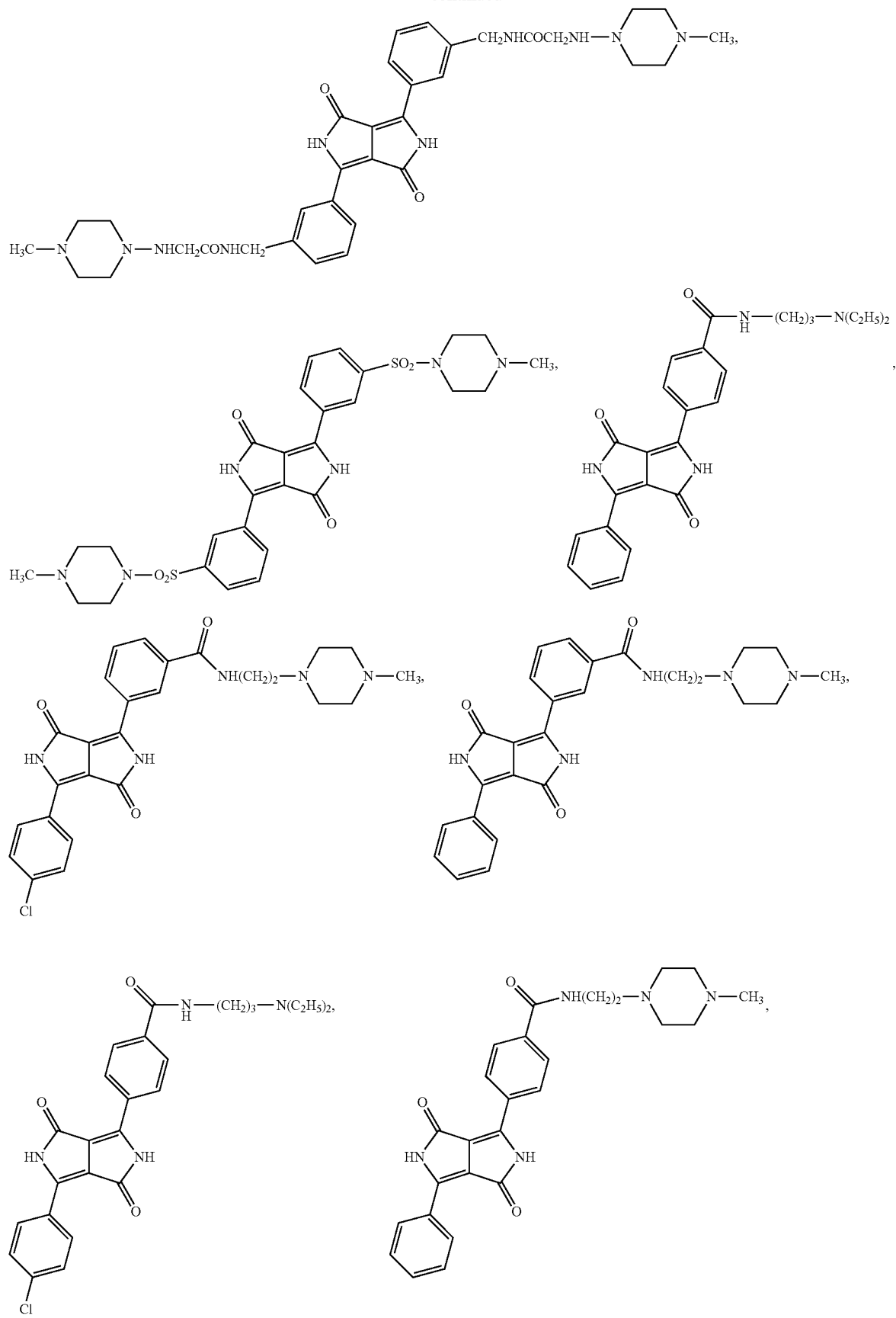

-continued
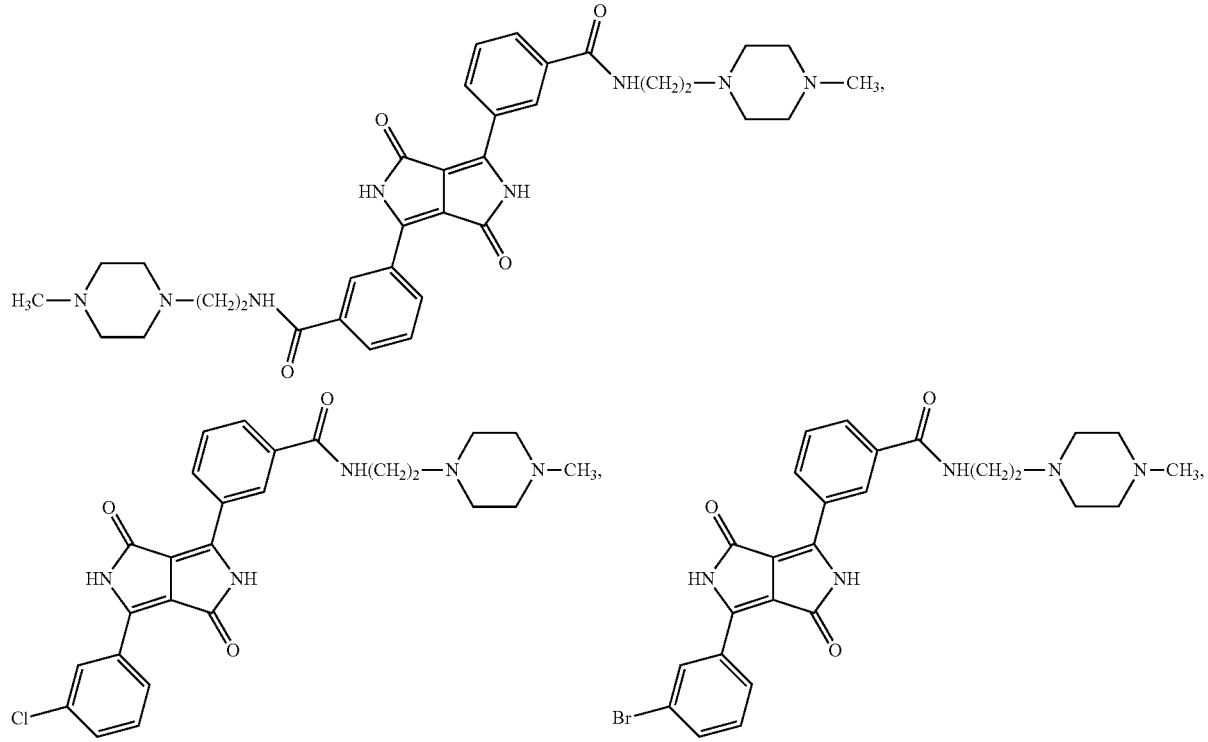
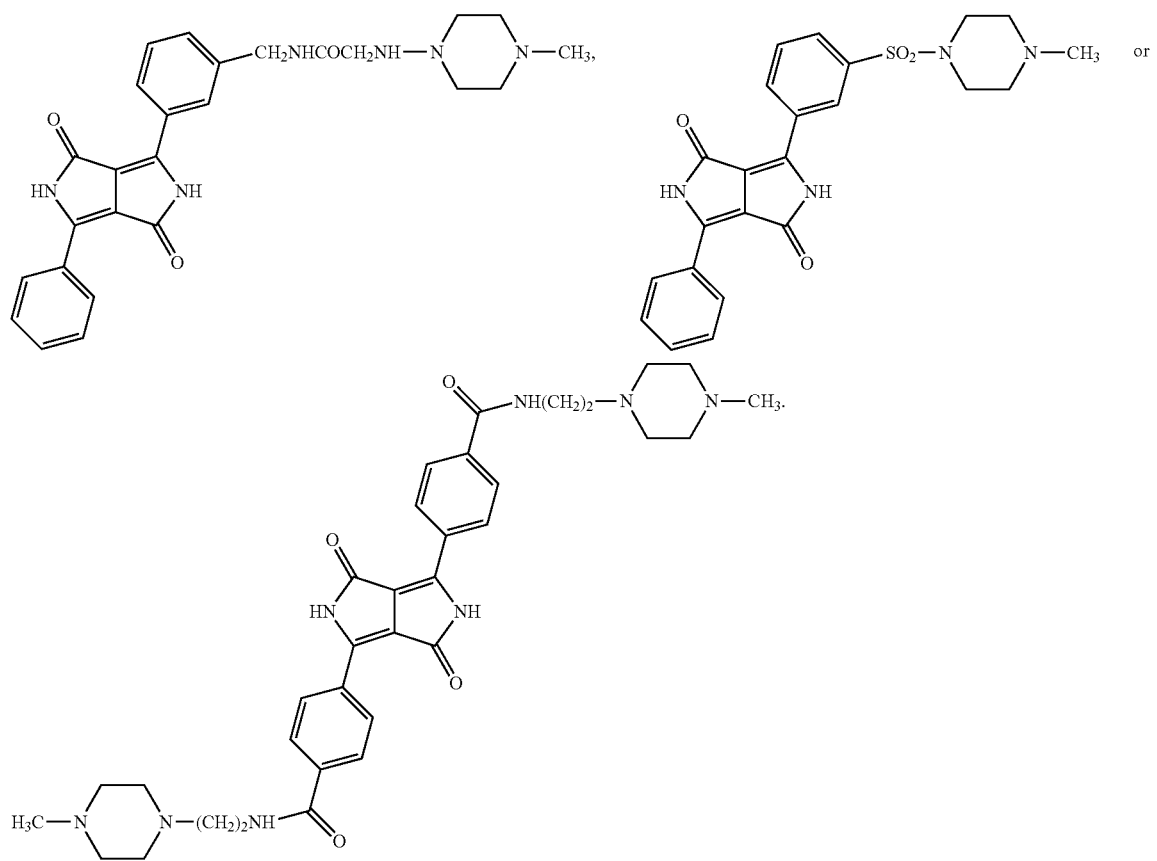

The components of radiation-hardenable compositions and the methods for the production of colour filters are known to the skilled person. Preferred methods are described in WO 08/101 841; the content of that application which is relevant to this use is accordingly incorporated in its entirety at this point into the present application by way of reference, especially page 19/line 1 to page 33/line 5.

The components of the compositions according to the invention, except components (a) and (c), can also be replaced in part by components of equivalent effect, although the properties of the compositions according to the invention are then markedly inferior in most cases.

FIG. 1 shows a TEM image of the pigment according to Example 3.

The Examples that follow illustrate the synergies between the individual components of the compositions according to the invention, without limiting the scope of the invention (unless otherwise stated, "%" is always "% by weight"):

Example 1

174 g of tert-amyl alcohol are reacted under inert gas (N₂) with 22.2 g of sodium at 130° C. (bath temperature) to form sodium tert-amylate. 5.2 g of the product according to Example 2 of EP 0 485 337 are then added and stirring is carried out for 30 minutes. A mixture, heated to 60° C., of 91.0 g of 4-bromo-benzonitrile, 71.05 g of succinic acid di-tert-amyl ester and 108.9 g of tert-amyl alcohol is then metered in over 2 hours, the internal temperature being lowered to 85° C. The resulting suspension is stirred for a further 18 hours and is then metered into a mixture, previously prepared and cooled to −10° C., of 200 g of methanol, 1000 g of water and 49.21 g of sulfuric acid over 105 minutes. After the addition is complete, the suspension is stirred for a further 5 hours at 0° C. to complete the reaction and is then filtered. The filter cake is washed with methanol and water until the washings are colourless and salt-free and it is then dried for 18 hours at 80° C./10⁴ Pa. There are obtained 107 g of a finely divided pigment of the main formula

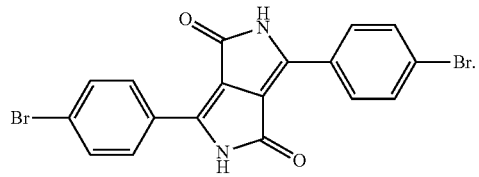

Elemental analysis: C 49.52%; H 2.50%; Br 33.7%; N 6.36%.

X-ray powder diagram [° 2θ (relative intensity)]: 7.3 (13%), 14.6 (27%), 17.2 (16%), 21.0 (30%), 24.7 (98%), 25.7 (32%), 26.9 (33%), 28.0 (100%), 30.7 (28%), 32.3 (30%), 35.7 (12%), 39.5 (15%).

MS (MALDI-ToF, neg. mode): m/z 442.8 (40%), 444.8 (100%), 446.8 (64%).

Example 2

The procedure is analogous to Example 1 but, instead of the sulfuric acid, 60.84 g of acetic acid are used. There are obtained 102 g of a finely divided pigment of the main formula

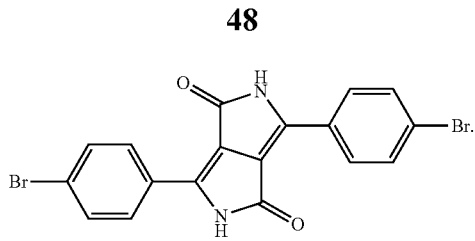

The analytical data correspond to those of Example 1.

Example 3

The procedure is analogous to Example 1, but with the difference that, instead of adding the solid product according to Example 2 of EP 0 485 337 to the amylate, 52 g of a 10% aqueous suspension of the same compound are added to the protolysis mixture consisting of methanol, water and sulfuric acid before the transfer of the pigment salt suspension. There are obtained 110 g of a finely divided pigment (cf. FIG. 1) of the main formula

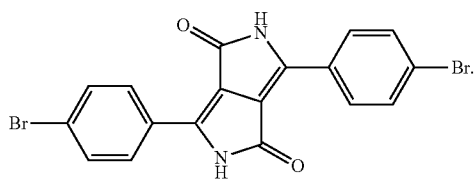

The analytical data correspond to those of Example 1.

Example 4

118 g of tert-amyl alcohol are reacted under inert gas with 18.4 g of sodium at 130° C. (bath temperature) to form sodium tert-amylate. A mixture, heated to 60° C., of 56.7 g of 4-chlorobenzonitrile, 67.5 g of succinic acid di-tert-amyl ester and 118 g of tert-amyl alcohol is then metered in over 2 hours, the internal temperature dropping to 105° C. The resulting suspension is stirred for a further 18 hours and is then cooled to 45° C. The suspension is then metered into a mixture, previously prepared and cooled to −10° C., of 177 g of methanol, 400 g of ice/water, 73 g of a 10% aqueous suspension of the product according to Example 2 of EP 0 485 337 and 49.5 g of sulfuric acid over 50 minutes, the temperature being maintained between −13° C. and −8° C. by jacket cooling and by adding, in portions, a further 700 g of ice. Stirring is then carried out for a further 2.5 hours at from −8° C. to −2° C. to complete the reaction, and filtration is then carried out. The filter cake is washed first with 500 g of water and then with 3000 g of methanol and finally with 6000 g of water again until the washings are colourless and salt-free and it is then dried for 18 hours at 80° C./10⁴ Pa. There are obtained 79 g of a finely divided pigment mainly of formula

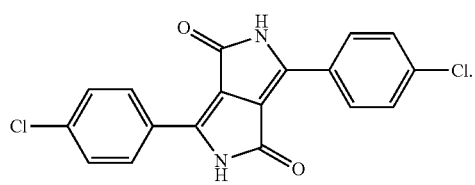

Elemental analysis: C 60.91%; H 3.11%; Cl 17.9%; N 8.08%.

X-ray powder diagram [°2θ (relative intensity)]: 7.0 (70%), 17.6 (54%), 20.9 (48%), 24.7 (77%), 26.3 (82%), 28.1 (100%), 30.8 (50%), 32.3 (43%).

MS (MALDI-ToF, neg. mode): m/z 355.2 (100%), 356.2 (64%).

Example 5

118 g of tert-amyl alcohol are reacted under inert gas with 18.4 g of sodium at 130° C. (bath temperature) to form sodium tert-amylate. A mixture, heated to 60° C., of 56.7 g of 4-chlorobenzonitrile, 37.3 g of succinic acid diisopropyl ester and 118 g of tert-amyl alcohol is then metered in over 2 hours, the internal temperature being lowered to 85° C. Then a further 12.4 g of succinic acid diisopropyl ester are subsequently metered in over 3 hours. The resulting suspension is stirred for a further 18 hours and is then cooled to 40° C. The suspension is then metered into a mixture, previously prepared and cooled to −10° C., of 177 g of methanol, 400 g of ice/water, 73 g of a 10% aqueous suspension of the product according to Example 2 of EP 0 485 337 and 49.5 g of sulfuric acid over 50 minutes, the temperature being maintained between −14° C. and −8° C. by jacket cooling and by adding, in portions, a further 800 g of ice. After the addition is complete, the reaction vessel is rinsed with 16 g of tert-amyl alcohol and this mixture is added to the protonation mixture. Stirring is then carried out for a further 2.5 hours at from −8° C. to +3° C. to complete the reaction, and filtration is then carried out. The filter cake is washed first with 1000 g of water and then with 3200 g of methanol and finally with 6000 g of water again until the washings are colourless and salt-free and it is then dried for 18 hours at 80° C./10⁴ Pa. There are obtained 73 g of a finely divided pigment mainly of formula

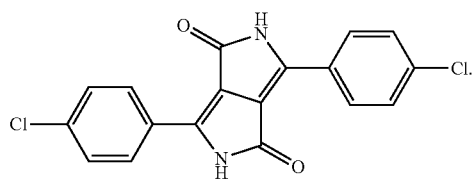

The analytical data correspond to those of Example 4.

Example 6

87 g of tert-amyl alcohol are reacted under inert gas with 11.1 g of sodium at 130° C. (bath temperature) to form sodium tert-amylate. A mixture, heated to 60° C., of 47.2 g of 4-bromobenzonitrile, 23.6 g of succinic acid diisopropyl ester and 54.5 g of tert-amyl alcohol is then metered in over 2 hours, the internal temperature being lowered to 85° C. Then a further 8.2 g of succinic acid diisopropyl ester are subsequently metered in over 3 hours. The resulting suspension is stirred for a further 18 hours and is then cooled to 45° C. The suspension is then metered into a mixture, previously prepared and cooled to −10° C., of 100 g of methanol, 200 g of ice/water, 23 g of a 10% aqueous suspension of the product according to Example 2 of EP 0 485 337 and 25.4 g of sulfuric acid over 30 minutes, the temperature being maintained between −9° C. and −2° C. by jacket cooling and by adding, in portions, a further 370 g of ice. After the addition is complete, the reaction vessel is rinsed with 15 g of tert-amyl alcohol and this mixture is added to the protonation mixture. Stirring is then carried out for a further 2.5 hours at −2° C. to complete the reaction, and the red suspension is divided into two portions of equal size.

Example 6A

The first half of the suspension according to Example 6 is filtered and the filter cake is washed first with 500 g of water and then with 1200 g of methanol and finally with 5000 g of water again until the washings are colourless and salt-free and it is then dried for 18 hours at 80° C./10⁴ Pa. There are obtained 25.5 g of a finely divided pigment of the main formula

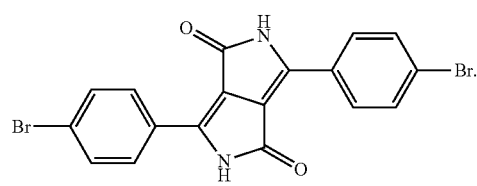

The analytical data correspond to those of Example 1.

Example 6B

The second half of the suspension according to Example 6 is filtered in analogous manner to Example 6A but is washed at 0° C., the respective wash solutions also having been previously cooled to 0° C. After drying there are obtained 25.5 g of a finely divided pigment of the main formula

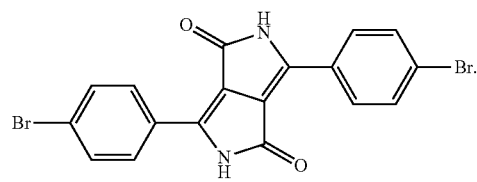

The analytical data correspond to those of Example 1.

Example 7

87 g of tert-amyl alcohol are reacted under inert gas with 11.0 g of sodium at 130° C. (bath temperature) to form sodium tert-amylate. A mixture, heated to 60° C., of 46.0 g of 4-bromobenzonitrile, 37.3 g of succinic acid di-tert-amyl ester and 54.5 g of tert-amyl alcohol is then metered in over 140 minutes, the internal temperature dropping to 105° C. The resulting suspension is stirred for a further 18 hours at 80° C. After adding 2.8 g of the product according to Example 2 of EP 0 485 337, cooling to 45° C. is carried out.

Example 7A

Over 30 minutes, a third of the suspension according to Example 7 is metered into a mixture, previously prepared and cooled to −10° C., of 50 g of methanol and 100 g of ice/water, with dry ice being added at the same time in order to maintain the temperature of the protonation mixture at from −15° C. to −25° C. and the pH at about 9. After the addition is complete, stirring is carried out for a further 3 hours at from −15° C. to −10° C. and pH 9 to complete the reaction and then filtration is carried out. The filter cake is washed first with 2000 g of water, then with 1500 g of methanol and finally with 2000 g of water again until the washings are colourless and salt-free and it is then dried for 18 hours at 80° C./10⁴ Pa. There are obtained 17 g of a finely divided pigment of the main formula

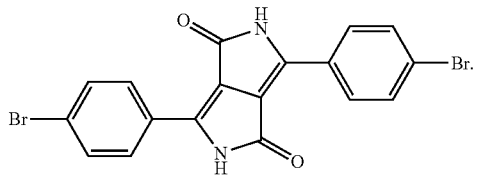

The analytical data correspond to those of Example 1.

Example 7B

The remaining two thirds of the suspension according to Example 7 are metered into a mixture, previously prepared and cooled to −55° C., of 800 g of methanol and 28 g of acetic acid, with dry ice being added at the same time in order to maintain the temperature of the protonation mixture at from −45° C. to −25° C. After the addition is complete, stirring is carried out for a further two hours at −25° C. to complete the reaction. One half of the mixture is then withdrawn, warmed up to −2° C. and filtered. The filter cake is washed first with 2000 g of methanol and then with 2000 g of water until the washings are colourless and salt-free and it is then dried for 18 hours at 80° C./10⁴ Pa. There are obtained 17 g of a finely divided pigment of the main formula

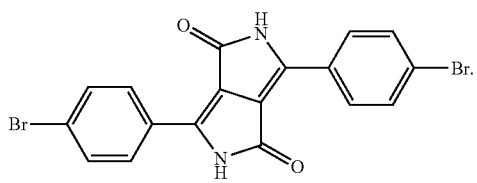

The analytical data correspond to those of Example 1.

Example 7C

The remainder of the suspension according to Example 7B is filtered. The filter cake is washed first with 2000 g of methanol and then with 3000 g of water until the washings are colourless and salt-free and it is then dried for 18 hours at 80° C./10⁴ Pa. There are obtained 17 g of a finely divided pigment of the main formula

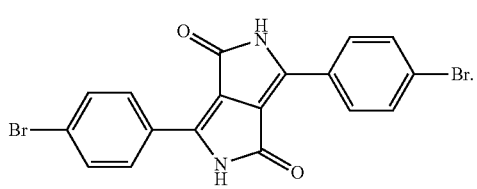

The analytical data correspond to those of Example 1.

Example 8

87 g of tert-amyl alcohol are reacted under inert gas with 11.0 g of sodium at 130° C. (bath temperature) to form sodium tert-amylate. A mixture, heated to 60° C., of 45.5 g of 4-bromobenzonitrile, 37.8 g of succinic acid di-tert-amyl ester and 54.5 g of tert-amyl alcohol is then metered in over 160 minutes, the internal temperature being gradually lowered to 95° C. The resulting suspension is stirred for a further 18 hours, is then cooled to 40° C. and, over 90 minutes, is metered into a mixture, previously prepared and cooled to −10° C., of 100 g of methanol, 500 g of water, 15.5 g of an 18% aqueous suspension of the product according to Example 2 of EP 0 485 337 and 43 g of sulfuric acid at from −8° C. to −11° C. After the addition is complete, the reaction vessel is rinsed with 16 g of tert-amyl alcohol and this mixture is added to the protonation mixture. Stirring is then carried out for a further 4 hours at −9° C. to complete the reaction, and filtration is then carried out. The filter cake is washed with 2400 g of methanol and 4000 g of water until the washings are colourless and salt-free and it is then dried for 18 hours at 80° C./10⁴ Pa. There are obtained 49.4 g of a finely divided pigment of the main formula

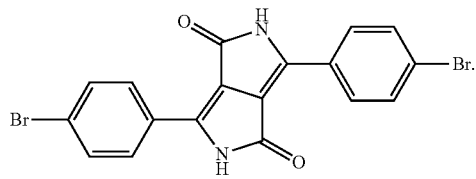

The analytical data correspond to those of Example 1.

Example 9

The procedure is analogous to Example 3, but instead of 91 g of p-bromo-benzonitrile there is used a mixture of 45.5 g of p-bromo-benzonitrile and 34.4 g of p-chloro-benzonitrile. There are obtained about 103 g of a very finely divided pigment mixture, the major component of which is of formula

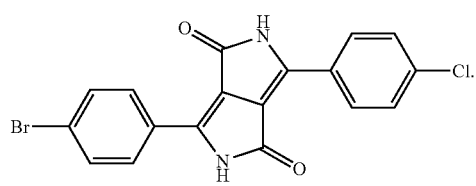

Example 10

100 g of 3-(4'-chloro-phenyl)-6-phenyl-2,5-dihydro-pyrrolo[3,4-c]pyrrole-1,4-dione, prepared in accordance with Example 6 of EP 0 184 982, are added, with stirring, over 20 minutes, to 483 g of 100% sulfuric acid previously cooled to 10° C., the temperature being controlled at max. 15° C. by means of external cooling using an ice bath. After the addition is complete, stirring is carried out for a further 2 hours without the ice bath. Then, over 30 minutes, 76 g of 65% oleum are added dropwise, the internal temperature being maintained at from 20 to 30° C. using ice bath cooling again. The resulting dark-red solution is stirred for a further 3¾ hours at 25° C. and is then, over 30 minutes, added, with stirring, to a mixture of 1961 g of water and 1225 g of ice at 0° C. The red suspension thereby obtained is stirred for 18 hours at 25° C. to complete the reaction, filtered and washed with 2000 g of 5% aqueous sodium chloride solution. There are obtained 870 g of a moist press cake with a solids content of 20.7% mainly of formula

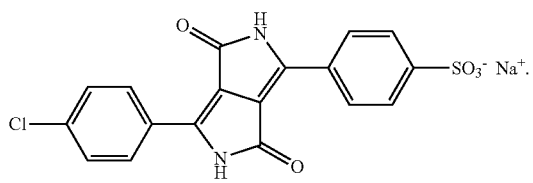

$^1$H NMR (300 MHz, d$_6$-DMSO): 11.21 (1H, s, N—H); 11.19 (1H, s, N—H); 8.32 (2H, d, H$_{ar}$); 8.26 (2H, d, H$_{ar}$); 7.55 (2H, d, H$_{ar}$); 7.49 (2H, d, H$_{ar}$).

MS (MALDI-ToF, neg. mode):
m/z 400.3 (100%), 402.3 (46%), 422.2 (61%), 424.2 (25%).

Examples 11-22

The procedures are analogous to Examples 1 to 5, 6A, 6B, 7A, 7B, 7C, 8 and 9, but without drying the filter cakes. In each case, an amount of moist filter cake (~35 g) containing 10.0 g of pigment (dry weight) is intensively dispersed, by means of a toothed disc stirrer (~1200 rpm), in 65 g of water for 4 hours at 25° C. in a cylindrical vessel with baffles. 1 g of the product according to Example 10 is slurried in 10 g of water at 80° C. and is then added dropwise over 5 minutes to the pigment suspension. The suspension is stirred for a further hour at 25° C., and then a solution of 1.3 g of Ethoquad® O/12 PG (Akzo Nobel) in 5 g of water is added over 5 minutes and stirring is carried out for a further hour. The mixture is then filtered, washed with 1000 g of water and dried at 80° C./10$^4$ Pa. In each case there are obtained about 12 g of a surface-treated pigment.

Example 23

1.0 g of the product according to Example 3, 0.1 g of the product according to Example 6 of EP 0 485 337, 0.7 g of EFKA® 4340 (containing about 0.3 g of solvent), 3.2 g of a methacrylate copolymer (copolymer of benzyl methacrylate and hydroxyethyl methacrylate 6:1, molecular weight M$_w$=~32 kDa, 25% in 1-methoxy-2-propyl acetate) and 7.1 g of 1-methoxy-2-propyl acetate are dispersed in a Skandex® apparatus with zirconium oxide beads (dia. 0.5 mm) for 15 hours. This dispersion is spin-coated onto glass (30 seconds at 1250 rpm). Afterwards, drying is carried out at 100° C. and then hardening is carried out for 5 minutes on a hot plate at 200° C. There is obtained a lustrous, intensely red-coloured colour filter having a transmittance of 22.7%, a contrast ratio of 3452 (the contrast ratio maximum of the pure glass substrate is 4300) and a colour point of x=0.652/y=0.335 (F10 light source; Yxy colour system, C.I.E. 1931). The thermal stability is excellent (after an additional hour of hardening at 270° C., the contrast ratio is still 78.3% of the original value).

Examples 24-28

The procedures are analogous to Example 23, but instead of EFKA® 4340 there is used 0.4 g of another dispersant (used in the form of a commercially available solution but the amount being based on pure, solvent-free dispersant). Colour filters having the following colour values are obtained:

| Example | Dispersant | x/y | Transmittance Y | Contrast ratio | Thermal stability |
|---|---|---|---|---|---|
| 24 | Ajisper ® PB 821 | 0.653/0.334 | 22.3% | 3421 | 74.4% |
| 25 | Disperbyk ® 163 | 0.652/0.334 | 22.4% | 3531 | 77.1% |
| 26 | Disperbyk ® 2163 | 0.651/0.334 | 22.3% | 3539 | 84.2% |
| 27 | EFKA ® 4047 | 0.652/0.335 | 22.3% | 3506 | 81.2% |
| 28 | EFKA ® 4300 | 0.648/0.334 | 23.0% | 3611 | 83.0% |

Examples 29-30

The procedures are analogous to Examples 23-28, but 0.1 g of the product according to Example 2 of EP 0 485 337 is used instead of the product according to Example 6 of EP 0 485 337. Colour filters having the following colour values are obtained:

| Example | Dispersant | x/y | Transmittance Y | Contrast ratio | Thermal stability |
|---|---|---|---|---|---|
| 29 | EFKA ® 4300 | 0.660/0.330 | 19.3% | 3400 | 78.8% |
| 30 | EFKA ® 4340 | 0.656/0.330 | 20.1% | 3354 | 74.4% |

Example 31

The procedure is analogous to Example 27 but, instead of the pigment according to Example 3, there is used the same amount of micronised C. I. Pigment Red 177 (Cromophtal® Red A2B, Ciba) surface-treated according to Example 1 of EP 0 273 866, and the resulting dispersions are used as described in Examples 32-37 before the spin coating step.

Examples 32-37

The procedures are analogous to Examples 24-28, but the resulting dispersions are mixed in each case before the spin coating with the same amount of dispersion according to the corresponding Example 31 using the same dispersant. Colour filters having the following colour values are obtained:

| Example | Dispersant | x/y | Transmittance Y | Contrast ratio | Thermal stability |
|---|---|---|---|---|---|
| 32 | Ajisper ® PB 821 | 0.669/0.325 | 17.5% | 2671 | 91.8% |
| 33 | Disperbyk ® 163 | 0.661/0.324 | 18.6% | 2987 | 88.1% |
| 34 | Disperbyk ® 2163 | 0.651/0.321 | 19.4% | 3312 | 84.7% |
| 35 | EFKA ® 4047 | 0.651/0.322 | 22.3% | 3163 | 89.1% |
| 36 | EFKA ® 4300 | 0.644/0.318 | 19.3% | 3151 | 88.8% |
| 37 | EFKA ® 4340 | 0.656/0.323 | 19.3% | 3122 | 85.5% |

Examples 38-51

The procedures are analogous to Examples 24-37 but, instead of C. I. Pigment Red 177, there is used micronised C. I. Pigment Red 242 (Novoperm® Scarlet 4RF, Clariant, wet-ground with inorganic salt and an organic liquid that does not dissolve that salt).

Examples 52-235

The procedures are analogous to Examples 23-30 but, instead of the product according to Example 3, there is used in each case the same amount of a product according to Examples 1, 2, 4, 5, 6A, 6B, 7A, 7B, 7C, 8, 9 or 11-22.

Examples 236-243

The procedures are analogous to Examples 23-30 but, instead of 0.9 g of the product according to Example 3, there is used a mixture of 0.7 g of the product according to Example 3 and 0.2 g of micronised C. I. Pigment Red 177.

Examples 244-251

The procedures are analogous to Examples 23-30 but, instead of 0.9 g of the product according to Example 3, there is used a mixture of 0.35 g of the product according to Example 3 and 0.55 g of micronised C. I. Pigment Red 177.

Examples 252-259

The procedures are analogous to Examples 23-30 but, instead of 0.9 g of the product according to Example 3, there is used a mixture of 0.75 g of the product according to Example 3 and 0.15 g of micronised C. I. Pigment Red 177.

Examples 260-267

The procedures are analogous to Examples 23-30 but, instead of 0.9 g of the product according to Example 3, there is used a mixture of 0.4 g of the product according to Example 3 and 0.5 g of micronised C. I. Pigment Red 177.

Examples 268-1003

The procedures are analogous to Examples 236-267 but, instead of the product according to Example 3, there is used in each case the same amount of a product according to Examples 1, 2, 4, 5, 6A, 6B, 7A, 7B, 7C, 8, 9 or 11-22.

Example 1004

150 g of 3-cyanobenzoic acid are first introduced into 1000 ml of dry toluene under inert gas and heated to 50° C., with stirring. To the resulting white suspension there are added, dropwise, 96 ml of thionyl chloride over a period of 150 minutes, the temperature being gradually increased to 95° C. Stirring is then carried out for a further 18 hours at 90° C. The resulting brown solution is heated to reflux, and about 200 ml of a clear solution are distilled off under a gentle current of nitrogen. Cooling to 90° C. again is then carried out, and 106 g of 3-dimethylamino-1-propylamine are then added dropwise over 75 minutes, with stirring. Stirring is subsequently carried out for a further 120 minutes whilst refluxing gently (about 100° C.). To the cooled reaction mixture there are added 500 ml of ethyl acetate and 500 ml of 2N sodium hydroxide solution and extraction is carried out. The aqueous phase is extracted a further three times using 300 ml of ethyl acetate each time; 60 ml of 30% sodium hydroxide solution are added and extraction is carried out a further three times using 300 ml of ethyl acetate each time. The combined organic extracts are washed with 500 ml of saturated NaCl solution, dried over sodium sulfate and activated carbon and concentrated at 50° C. using a rotary evaporator. Addition of 200 ml of methylene chloride to the residue and concentration are carried out a further three times. There are obtained 212.1 g of a clear brown oil of formula

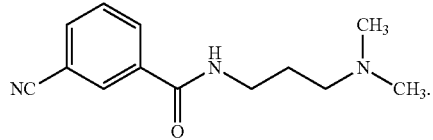

$^1$H NMR (300 MHz, CDCl$_3$): 9.03 (1H, broad m, N—H); 8.04 (1H, t, 1.4 Hz); 8.00 (1H, dt, 7.8 and 1.4 Hz); 7.74 (1H, dt, 7.8 and 1.4 Hz); 7.54 (1H, t, 7.8 Hz); 3.55 (2H, dt, 6.0 and 4.7 Hz); 2.53 (2H, t, 5.8 Hz); 2.31 (6H, s); 1.77 (2H, m).

Example 1005

The reaction is carried out analogously to Example 1004, with 4-cyanobenzoic acid being used as starting material instead of 3-cyanobenzoic acid. The compound of the following formula is obtained as a clear brown oil:

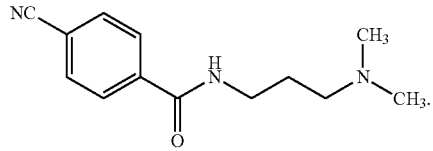

$^1$H NMR (300 MHz, CDCl$_3$): 9.06 (1H, broad m); 7.95 (2H, d, 8.4 Hz); 7.71 (2H, d, 8.5 Hz); 3.62 (2H, dd, 11.6 and 5.0 Hz); 2.71 (2H, t, 5.8 Hz); 2.45 (6H, s); 1.90 (2H, dt, 11.8 and 6.0 Hz).

Example 1006

100 ml of tert-amyl alcohol are reacted under inert gas with 10.35 g of sodium at 130° C. (bath temperature) to form the corresponding alcoholate. Then a mixture, heated to 50° C., of 13.8 g of 4-chlorobenzonitrile, 34.5 ml of succinic acid di-tert-amyl ester, 23.1 g of the nitrile of Example 1004 and 40 ml of tert-amyl alcohol is metered into the sodium tert-amylate over 4 hours, the temperature of the reaction mixture dropping to 105° C. The resulting suspension is stirred for a further 4 hours and is then cooled to 50° C. The suspension is then metered into a mixture, previously prepared and cooled to 0° C., of 100 ml of methanol and 500 g of ice/water over 10 minutes, with stirring. Stirring is then carried out for 18 hours at 0° C. to complete the reaction. Acetic acid is added to the reaction mixture until a spot test comes out colourless; the pH is about >10. Filtration is then carried out over a suction filter, and the filter cake is washed first with 1000 ml of water/methanol 1:1 and then with 1000 ml of water until the washings are colourless and salt-free and it is then dried for 18 hours at 80° C./$10^4$ Pa. There are obtained 34.9 g of a red solid comprising the following three main components:

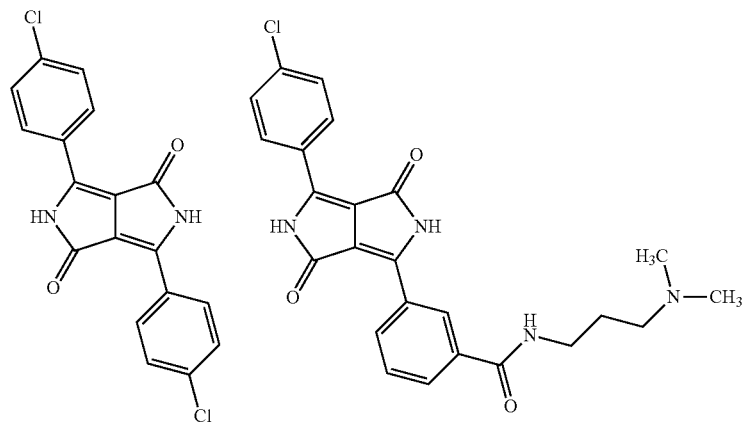

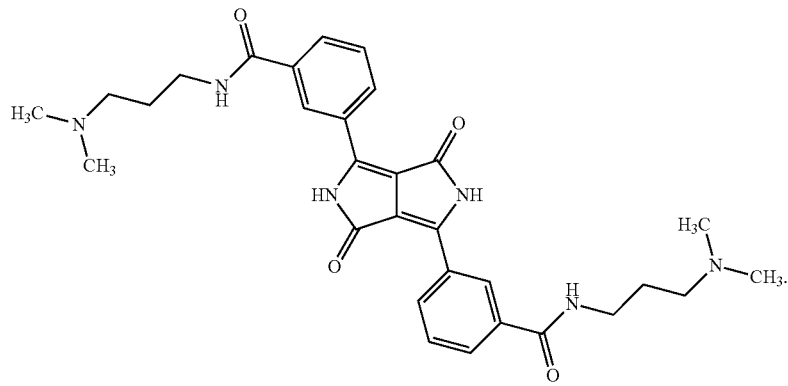

MS (MALDI-ToF, neg. mode): m/z 542.6 (15%), 448.7 (77%), 354.8 (100%).

MS (MALDI-ToF, pos. mode): m/z 589.0 (100%, 2×Na adduct), 567.0 (19%, Na adduct), 495.0 (62%, 2×Na adduct), 473.00 (40%, Na adduct).

Example 1007

Example 1006 is repeated with the modifications that, instead of the 4-chlorobenzonitrile, an equimolar amount of benzonitrile is used and the two nitriles are added to the sodium tert-amylate solution before the succinic acid di-tert-amyl ester is metered in. There are obtained 35.0 g of a red solid comprising the following three main components:

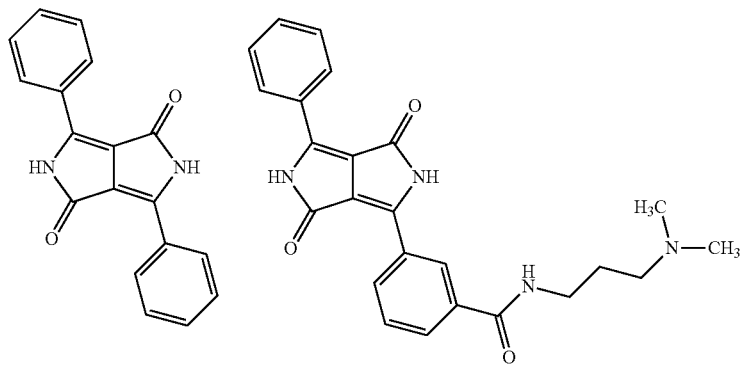
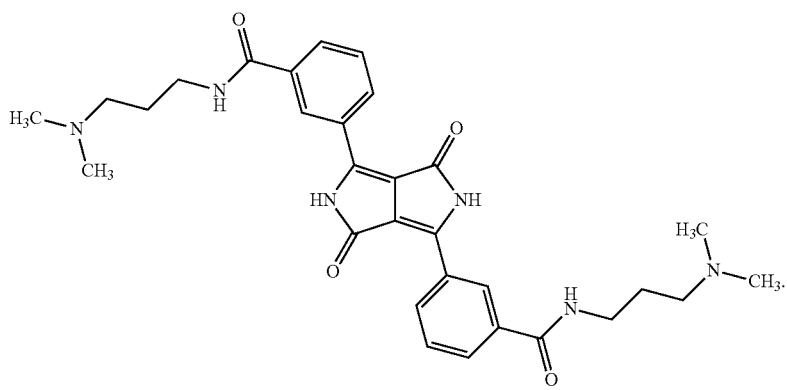
MS (MALDI-ToF, neg. mode): m/z 543.8 (100%), 416.0 (80%), 287.2 (73%).
MS (MALDI-ToF, pos. mode): m/z 567.3 (23%, Na adduct), 545.3 (40%), 439.3 (68%, Na adduct), 417.3 (100%), 289.4 (13%).
Example 1008
Example 1007 is repeated with the modifications that the batch size is reduced to ¼ and, instead of benzonitrile, an equimolar amount of 4-bromobenzonitrile is used. There are obtained 7.0 g of a red solid whose composition comprises the following three main components:
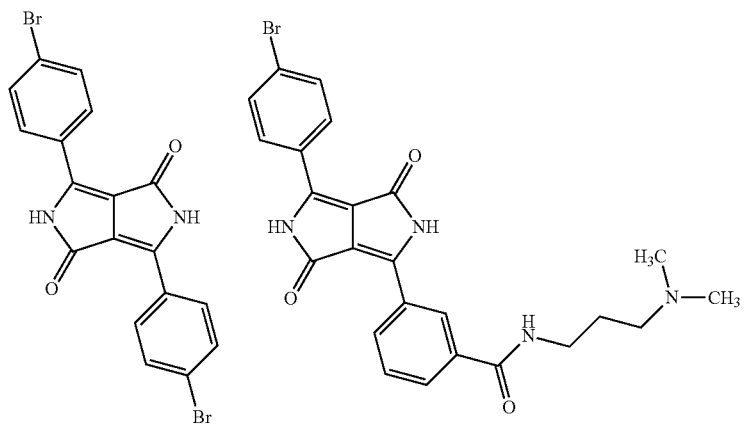

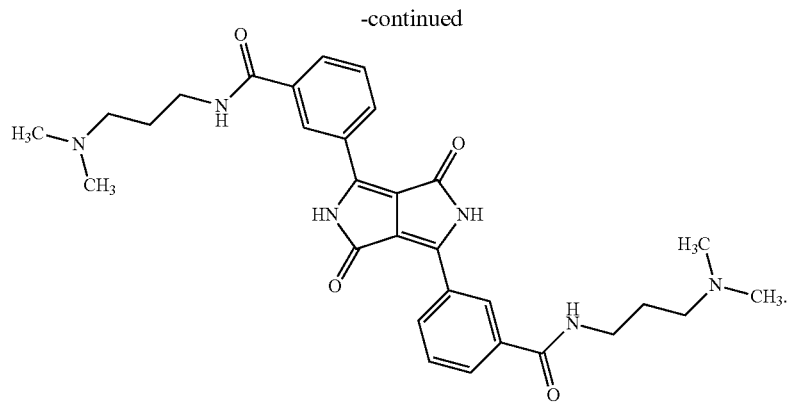

MS (MALDI-ToF, neg. mode): m/z 542.7 (60%), 494.6 (54%), 492.6 (47%), 446.6 (60%), 444.6 (100%), 442.6 (46%).

MS (MALDI-ToF, pos. mode): m/z 567.3 (39%, Na adduct), 545.4 (100%), 497.2 (43%), 495.2 (48%).

Example 1009

100 ml of tert-amyl alcohol are reacted under inert gas with 9.2 g of sodium at 130° C. (bath temperature) under reflux to form the corresponding alcoholate. Then 23.1 g of the nitrile from Example 1004 are added. There are then added, in portions, 23.1 g of 4-ethoxycarbonyl-5-phenylpyrrolid-2-one (which can be prepared in accordance with Tetrahedron 58, 5547-5565 [2002]) over a period of 200 minutes, with stirring. In the course thereof, the internal temperature drops gradually to 105° C. and a viscous red suspension is formed, which is diluted by adding 30 ml of tert-amyl alcohol. After the addition is complete, subsequent stirring under reflux is carried out for a further 150 minutes. The resulting suspension is cooled to 80° C. and is transferred over 10 minutes into a solution of 22 ml of acetic acid in 800 ml of water whilst stirring vigorously, the final temperature of the mixture reaching 40° C. Heating to reflux is then carried out and, at a bath temperature of 130° C., distillation is carried out under a weak current of nitrogen until only pure water passes over (duration: about 60 minutes). The finely granulated reaction mixture is allowed to cool to 70° C. and the precipitate is filtered off. After washing with 1000 ml of water, 1000 ml of water/methanol 1:1, 1000 ml of methanol and 500 ml of water there are obtained, after drying for 18 hours at 80° C./$10^4$ Pa, 28.7 g of a red solid whose main component has the following structure:

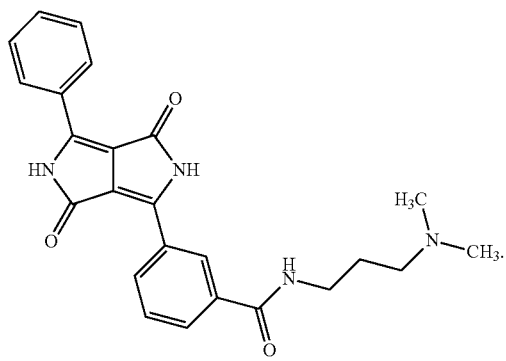

MS (MALDI-ToF, neg. mode): m/z 415.1 (100%, M–H).
MS (MALDI-ToF, pos. mode): m/z 439.4 (35%, M+Na), 417.4 (100%, M+H), 372.4 (81%, M–HNMe$_2$).

Example 1010

360 ml of tert-amyl alcohol are reacted under inert gas with 36.8 g of sodium at 130° C. (bath temperature) under reflux and whilst stirring vigorously. Then 97.3 g of the nitrile of Example 1004 are added. 106.3 g of 4-ethoxycarbonyl-5-(4-chlorophenyl)pyrrolid-2-one (which can be prepared in accordance with Tetrahedron 58, 5547-5565 [2002]) are slurried in 300 ml of tert-amyl alcohol and added by means of a peristaltic pump over a period of 120 minutes, with stirring. During metering-in, the slurry is continuously further diluted with a total of 200 ml of tert-amyl alcohol, with a subsequent final rinse using 100 ml of tert-amyl alcohol. In the course thereof, the internal temperature in the reaction vessel gradually drops to 103° C. and a very viscous, red suspension forms, which is further diluted by adding, in portions, a total of 500 ml of tert-amyl alcohol. The resulting dark-red suspension is subsequently stirred for 105 minutes at reflux, cooled to 90° C. and is then transferred into 3000 ml of water over 60 minutes whilst stirring vigorously, the final temperature of the mixture reaching 37° C. The reaction vessel is subsequently rinsed with a further 100 ml of tert-amyl alcohol. The protonation mixture is then diluted with 5000 ml of water and stirred for 18 hours at 23° C. to complete the reaction. The finely granulated reaction mixture is filtered over a suction filter, subsequently washing with 12 000 ml of water, 5 000 ml of methanol and finally with 5 000 ml of water. The suction filter material, moist with water, is dried for 18 hours at 80° C./$10^4$ Pa. There are obtained 134.9 g of a red solid whose main component has the following structure:

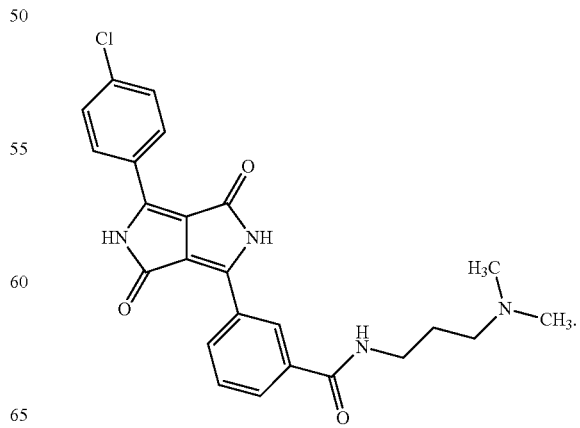

MS (MALDI-ToF, neg. mode): m/z 450.9 (63%, M), 448.9 (100%, M–H).

MS (MALDI-ToF, pos. mode): m/z 473.3 (28%, M+Na), 453.3 (43%), 451.3 (100%, M+1), 408.3 (33%), 406.3 (68%, M–HNMe$_2$).

Example 1011

100 ml of tert-amyl alcohol are reacted under inert gas with 9.2 g of sodium at 130° C. (bath temperature) under reflux to form the corresponding alcoholate. Then 17.3 g of the nitrile of Example 1004 are added and the temperature is lowered to 100° C. There are then added, in portions, 23.3 g of 4-ethoxy-carbonyl-5-(4-bromophenyl)pyrrolid-2-one (which can be prepared in accordance with Tetrahedron 58, 5547-5565 [2002]) over a period of 2 hours, with stirring. In the course thereof, the internal temperature is allowed to drop gradually to 95° C. A viscous red suspension forms, which is diluted by adding, in portions, a total of 100 ml of tert-amyl alcohol. After the addition is complete, subsequent stirring is carried out for a further 220 minutes at 90° C. The suspension is then transferred over 15 minutes into a mixture of 230 g of water/ice and 75 ml of methanol whilst stirring vigorously, and subsequent stirring is carried out at 0° C. for 2 hours. Then filtration is carried out, washing first with 500 ml of methanol and finally with 2000 ml of water. After drying for 18 hours at 80° C./10$^4$ Pa, there are obtained 21.0 g of a red solid whose main component has the following structure:

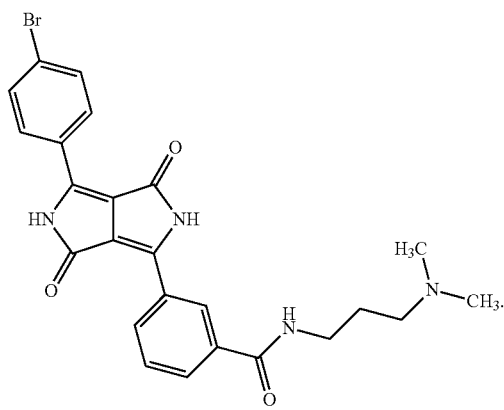

MS (MALDI-ToF, neg. mode): m/z 495.0 (100%, M–H/$^{81}$Br), m/z 493.0 (98%, M–H/$^{79}$Br).

MS (MALDI-ToF, pos. mode): m/z 519.3 (26%, M+Na/$^{81}$Br), 517.3 (25%, M+Na/$^{79}$Br), 497.3 (24%, M+H/$^{81}$ Br), 495.3 (33%, M+H/$^{79}$Br), 452.4 (100%, M–HNMe$_2$/$^{81}$Br), 452.4 (96%, M–HNMe$_2$/$^{79}$Br).

Example 1012

20 ml of tert-amyl alcohol are reacted under inert gas with 1.1 g of sodium at 130° C. (bath temperature) under reflux to form the corresponding alcoholate. Then 2.7 g of the nitrile of Example 1005 and 1.6 g of 4-chlorobenzonitrile are added and the temperature is lowered to 105° C. 9.7 ml of succinic acid di-tert-amyl ester are then metered in over a period of 3 hours, with stirring. A red suspension forms. After the addition is complete, subsequent stirring is carried out for a further 16 hours at 80° C. The suspension is then transferred over 15 minutes into a mixture of 45 g of ice, 5 g of water and 10 ml of methanol whilst stirring vigorously, and subsequent stirring is carried out at 0° C. for 3 hours. Then filtration is carried out, washing first with 100 ml of methanol and finally with 400 ml of water. After drying for 18 hours at 80° C./10$^4$ Pa, there are obtained 2.8 g of a red solid whose three main components have the following structures:

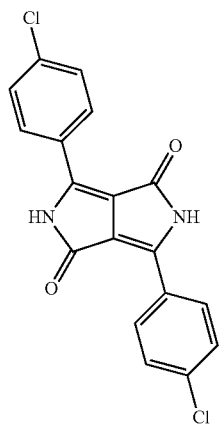

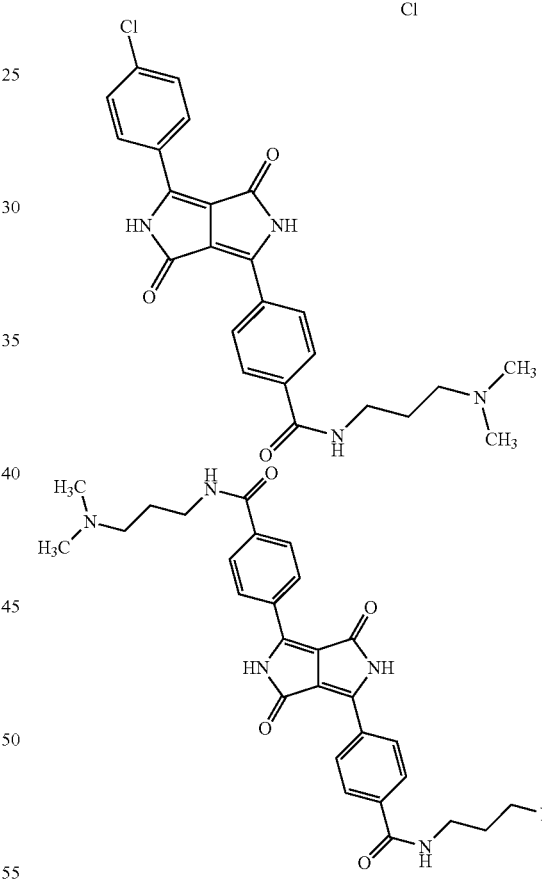

MS (MALDI-ToF, neg. mode): m/z 543.9 (44%), 449.0 (77%), 355.0 (100%).

MS (MALDI-ToF, pos. mode): m/z 567.2 (33%, Na adduct), 545.3 (49%), 451.2 (37%).

Example 1013

20 ml of tert-amyl alcohol are reacted under inert gas with 1.1 g of sodium at 130° C. (bath temperature) under reflux to form the corresponding alcoholate. Then 2.7 g of the nitrile of Example 1005 are added and the bath temperature is lowered to 110° C. There are then added, in portions, 3.1 g of 4-ethoxycarbonyl-5-(4-chlorophenyl)pyrrolid-2-one (which can be prepared in accordance with Tetrahedron 58, 5547-5565 [2002]) over a period of 135 minutes, with stirring. A viscous red suspension forms. After the addition is complete, a further 10 ml of tert-amyl alcohol are added and subsequent stirring is carried out for a further 16 hours at 80° C. The suspension is transferred over 15 minutes into a mixture of 45 g of ice, 5 g of water and 10 ml of methanol whilst stirring vigorously, and subsequent stirring is carried out at 0° C. for 3 hours. Then filtration is carried out, washing first with 100 ml of methanol and finally with 400 ml of water. After drying for 18 hours at 80° C./10⁴ Pa, there are obtained 2.7 g of a red solid whose main component has the following structure:

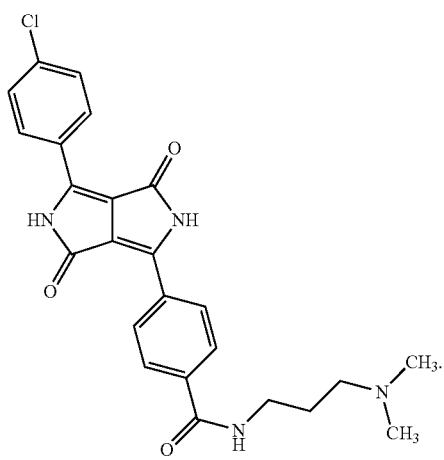

MS (MALDI-ToF, neg. mode): m/z 450.9 (68%, M), 449.9 (100%, M–H), 355.0 (100%).

MS (MALDI-ToF, pos. mode): m/z 473.2 (24%, M+Na), 451.2 (72%, M+H), 404.2 (100%, M–HNMe₂).

Example 1014

125 ml of chlorosulfonic acid are initially placed under N₂ and, over a period of 10 minutes, 16.9 g of 3-(4-chlorophenyl)-6-phenyl-2,5-dihydro-pyrrolo[3,4-c]pyrrole-1,4-dione are added in portions, the temperature of the mixture increasing to 40° C. The mixture is heated to 50° C. and, after 20 minutes, 18.6 g of thionyl chloride are added dropwise over a period of 20 minutes. After stirring for a further 100 minutes, the mixture is heated to 90° C. and subsequently stirred for 2 hours. The mixture is allowed to cool to 23° C. for 18 hours. The reaction mixture is then transferred dropwise, over 85 minutes, into a mixture of 750 g of ice and 250 g of water. Stirring is carried out at 0° C. for 3 hours to complete the reaction, filtration is carried out and the filter cake is subsequently washed with 2 litres of ice-water. 93.6 g of a press cake, moist with water and having a solids content of 22.5%, are obtained.

22.9 g of this moist press cake are transferred, in portions, over 20 minutes, to a mixture of 140 ml of ice-water and 4.1 g of 3-dimethylamino-1-propylamine at 0° C., with stirring. After subsequently stirring for one hour at 0° C., the reaction mixture is allowed to warm up to 23° C. over 30 minutes. Then heating to 70° C. is carried out and stirring is carried out for 3 hours at that temperature. After cooling to 40° C., the reaction mixture is filtered and washed with 400 ml of water. After drying for 18 hours at 80° C./10⁴ Pa, there are obtained 3.9 g of a solid whose main component has the following structure:

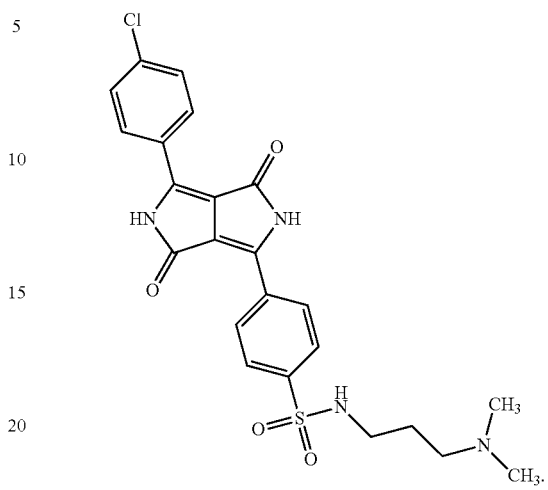

¹H NMR (300 MHz, D₂SO₄): 8.1-7.7 (8H, m); 3.1 (2H, m); 2.8 (2H, m); 2.5 (6H, s); 1.8 (2H, m).

Example 1015

105 g of tert-amyl alcohol are reacted under N₂ with 13.3 g of sodium at 130° C. (bath temperature) under reflux to form the corresponding alcoholate. A mixture, heated to 60° C., of 53.2 g of 4-bromobenzonitrile, 1.55 g of the nitrile of Example 1004, 43.0 g of succinic acid di-tert-amyl ester and 66 g of tert-amyl alcohol is then metered in over 3¾ hours, the internal temperature being lowered to 95° C. The resulting suspension is stirred for a further 18 hours at 95° C. 70 g of this suspension are then metered into a mixture, previously prepared and cooled to –5° C., of 30 g of methanol, 150 g of water/ice and 8.3 g of a 10% aqueous suspension of the product according to Example 2 of EP 0 485 337 over 30 minutes. After the addition is complete, subsequent rinsing with 6 g of tert-amyl alcohol is carried out, and stirring for a further 17 hours at –7° C. to complete the reaction and then filtration are carried out. The filter cake is washed with 350 ml of cold methanol and 2 litres of water and is then dried for 18 hours at 80° C./10⁴ Pa. There are obtained 15.5 g of a dark-red solid whose main component has the following structure:

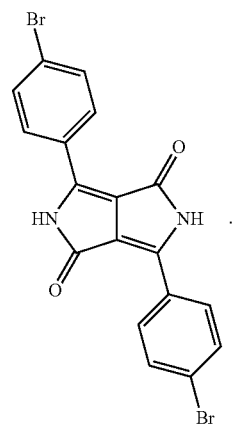

MS (MALDI-ToF, neg. mode): m/z 442.6 (64%), 444.6 (100%), 446.6 (69%).

Example 1016

56 g of tert-amyl alcohol are reacted under inert gas (N$_2$) with 7.1 g of sodium at 130° C. (bath temperature) under reflux to form the corresponding alcoholate. A mixture, heated to 60° C., of 26.6 g of 4-bromobenzonitrile, 3.3 g of the nitrile of Example 1004, 23.0 g of succinic acid di-tert-amyl ester and 35.0 g of tert-amyl alcohol is then metered in over 3% hours, the internal temperature being lowered to 95° C. halfway through the metering-in. The resulting suspension is stirred for a further 18 hours at 95° C. 75 g of this suspension are then metered into a mixture, previously prepared and cooled to –8° C., of 32 g of methanol and 160 g of ice-water over 30 minutes. After the addition is complete, subsequent rinsing is carried out with 10 g of tert-amyl alcohol, and then stirring for 17 hours at –7° C. to complete the reaction and then filtration are carried out. The filter cake is washed with 600 ml of cold (10° C.) methanol and 2 litres of water and is then dried for 18 hours at 80° C./10$^4$ Pa. There are obtained 14.6 g of a dark-red solid whose two main components have the following structures:

35.0 g of tert-amyl alcohol is then metered in over 3 hours, the internal temperature being lowered to 95° C. halfway through the metering-in period. The resulting suspension is stirred for a further 16% hours at 95° C. The suspension is then metered into a mixture, previously prepared and cooled to –10° C., of 65 g of methanol and 320 g of ice-water, over 20 minutes. After the addition is complete, subsequent rinsing is carried out with 15 g of tert-amyl alcohol, and then stirring for 5 hours at –6° C. to complete the reaction and then filtration are carried out. The filter cake is washed with 1 litre of methanol and 3 litres of water and is then dried for 18 hours at 80° C./10$^4$ Pa. There are obtained 26.0 g of a dark-red solid whose two main components have the following structures

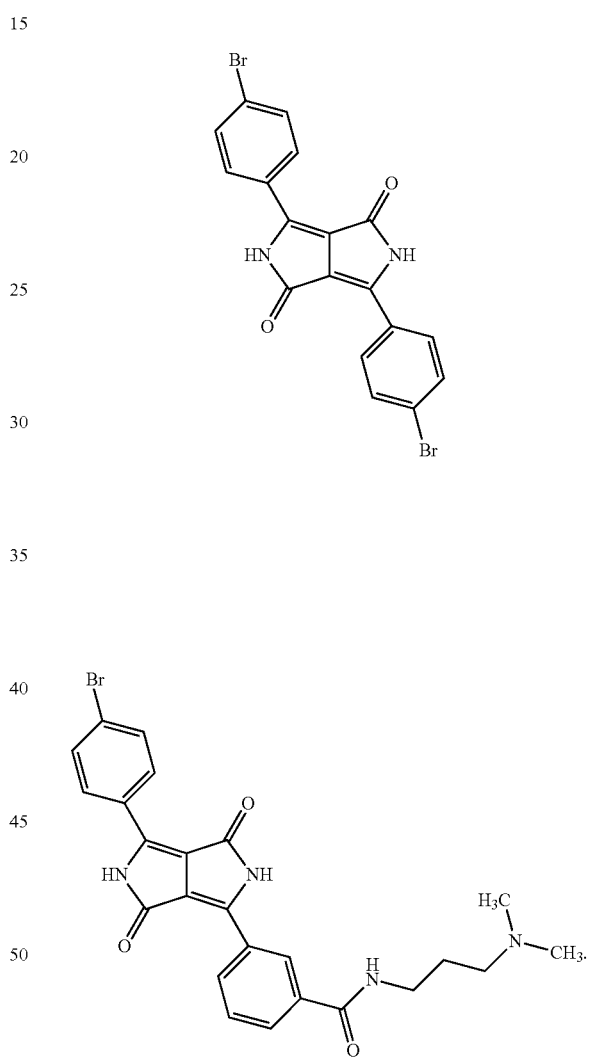

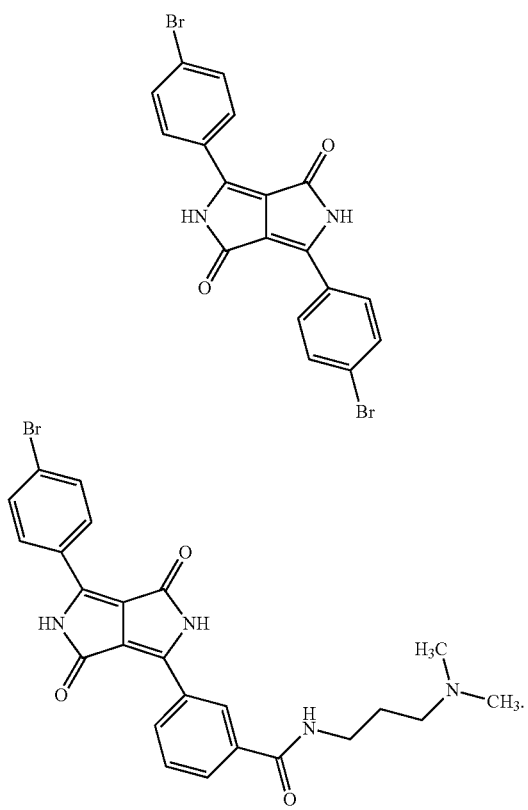

MS (MALDI-ToF, neg. mode): m/z 442.6 (48%), 444.5 (100%), 446.5 (54%)

MS (MALDI-ToF, pos. mode): m/z 497.0 (42%), 495.0 (47%), 452.1 (100), 452.4 (98%).

MS (MALDI-ToF, neg. mode): m/z 442.6 (50%), 444.5 (100%), 446.5 (62%), 492.7 (5%), 494.7 (6%). MS (MALDI-ToF, pos. mode): m/z 497.2 (81%), 495.0 (85%), 452.2 (85%), 452.4 (76%).

Example 1017

56 g of tert-amyl alcohol are reacted under inert gas with 7.1 g of sodium at 130° C. (bath temperature) under reflux to form the corresponding alcoholate. A mixture, heated to 60° C., of 24.7 g of 4-bromobenzonitrile, 0.78 g of the nitrile of Example 1004, 23.0 g of succinic acid di-tert-amyl ester and

Examples 1018-1026

The procedures are analogous to Example 23 but, instead of the product according to Example 6 of EP 0 485 337, there are used the products (synergists) mentioned below in the amounts mentioned below. Colour filters having the following colour values are obtained:

| Example | Synergist According to Example | Amount [g] | x/y/Y (with F10 light source) | Contrast ratio (max. = 5000) | Thermal stability [% at 270° C.] |
|---|---|---|---|---|---|
| 1018 | 1006 | 0.1 | 0.6531/0.3339/21.96% | 3369 | 91.8% |
| 1019 | 1007 | 0.15 | 0.6465/0.3334/23.26% | 3189 | 89.1% |
| 1020 | 1008 | 0.15 | 0.6539/0.3334/21.85% | 3333 | 88.4% |
| 1021 | 1009 | 0.1 | 0.6521/0.3355/22.39% | 3539 | 97.2% |
| 1022 | 1010 | 0.1 | 0.6508/0.3349/23.07% | 2930 | 114% |
| 1023 | 1011 | 0.1 | 0.6548/0.3333/21.22% | 3591 | 90.1% |
| 1024 | 1012 | 0.1 | 0.6499/0.3341/22.81% | 3087 | 68.5% |
| 1025 | 1013 | 0.1 | 0.6507/0.3342/22.46% | 2034 | 116% |
| 1026 | 1014 | 0.1 | 0.6535/0.3302/19.91% | 3251 | 69.3% |

Examples 1027-1031

The procedures are analogous to Example 23 but, instead of the product according to Example 3, there is used the same amount of the pigments mentioned below and, instead of the product according to Example 6 of EP 0 485 337, there is used the same amount of the synergists mentioned below. Colour filters having the following colour values are obtained:

| Example | Pigment according to Example | Synergist according to Example | x/y/Y (with F10 light source) | Contrast ratio (max. = 5000) | Thermal stability [% at 270° C] |
|---|---|---|---|---|---|
| 1027 | 1015 | 1011 | 0.6515/0.3337/22.26% | 3547 | 94.4% |
| 1028 | 1016 | EP 0 485 337/Ex. 2 | 0.6524/0.3312/20.59% | 3562 | 98.6% |
| 1029 | 1017 | 1010 | 0.6589/0.3344/20.65% | 2832 | 97.2% |
| 1030 | 1017 | 1011 | 0.6607/0.3340/19.54% | 2778 | 97.2% |
| 1031 | 1017 | 1009 | 0.6651/0.3323/19.17% | 3018 | 79.4% |

Example 1032

85 g of tert-amyl alcohol are reacted under inert gas with 11.2 g of sodium at 130° C. (bath temperature) under reflux to form the corresponding alcoholate. Then 23.4 g of 4-bromobenzonitrile are added. A suspension of 23.1 g of 4-ethoxycarbonyl-5-(4-chlorophenyl)-pyrrolid-2-one (which can be prepared in accordance with Tetrahedron 58, 5547-5565 [2002]) in 100 g of tert-amyl alcohol is then metered in over a period of 130 minutes, with stirring. In the course thereof, the internal temperature gradually drops to 105° C. and a viscous, red suspension forms. After the addition is complete, subsequent rinsing with 20 g of tert-amyl alcohol and subsequent stirring for a further 120 minutes under reflux are carried out. The resulting suspension is cooled to 90° C. and is then transferred into a mixture of 128 g of methanol, 640 g of ice/water and 29.8 g of sulfuric acid (97%) over 80 minutes whilst stirring vigorously, the temperature of the mixture being from −5° C. to −10° C. The condensation vessel is then subsequently rinsed with 20 g of tert-amyl alcohol and the reaction mixture is subsequently stirred at −8° C. for a further 150 minutes. The precipitate is then filtered off over a suction filter. After washing with 1000 ml of methanol and 2500 ml of water, there are obtained, after drying (18 hours at 80° C./$10^4$ Pa), 38.5 g of a red solid whose main component has the following structure:

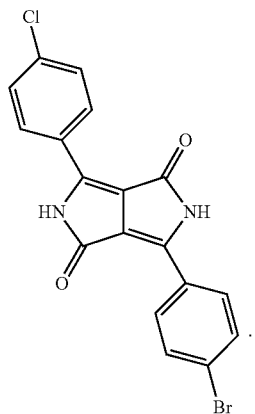

MS (MALDI-ToF, neg. mode): m/z 401.2 (100%, M−1 with $^{81}$Br isotope), 399.2 (81%, M−1 with $^{79}$Br isotope).

Example 1033

35 ml of tert-amyl alcohol are reacted under nitrogen with 2.5 g of sodium at 100° C. whilst stirring vigorously, to form the corresponding alcoholate. Then 2.6 g of benzonitrile are added at 90° C. 8.4 g of 4-ethoxycarbonyl-5-(4-bromophenyl)pyrrolid-2-one (which can be prepared in accordance with Tetrahedron 58, 5547-5565 [2002]) are then slurried in 35 ml of tert-amyl alcohol and metered in over a period of 30 minutes at 90° C., with stirring. A dark-red suspension forms, which is subsequently stirred for 18 hours at 90° C. and is then transferred, over 50 minutes, into a mixture, cooled beforehand to 0° C., of 136 g of ice/water, 27 g of methanol, 6.6 g of sulfuric acid (97%) and 5 g of a 10% aqueous suspension of the product obtained in accordance with Example 2 of EP 0 485 337, whilst stirring vigorously, the temperature not rising above 3° C. The reaction vessel is subsequently rinsed with a further 10 ml of tert-amyl alcohol and the mixture obtained is also transferred to the protonation mixture. Stirring is then carried out for 3 hours at 0° C. to complete the reaction. The reaction mixture is filtered over a suction filter and subsequently washed with 200 ml of methanol and 500 ml of water. The suction filter material, moist with water, is dried for 18 hours at 80° C./$10^4$ Pa. There are obtained 8.5 g of a red solid whose main component has the following structure:

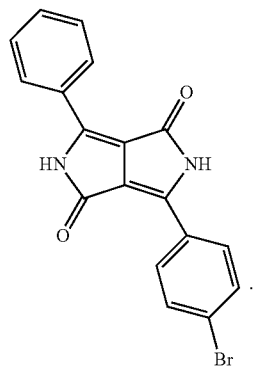

MS (MALDI-ToF, neg. mode): m/z 367.0 (100%, M–1 with $^{81}$Br isotope), 365.0 (94%, M–1 with $^{79}$Br isotope).

Examples 1034-1038

The procedures are in accordance with Example 1032 but, instead of benzonitrile, there are used the equimolar amounts of each of the nitriles listed in the following table. In addition (examples 1037 and 1038), isophthalodinitrile and 3,4-dichlorobenzonitrile are metered in at the same time as the 4-ethoxycarbonyl-5-(4-bromophenyl)pyrrolid-2-one rather than being added beforehand.

| Example | Nitrile used | Yield | Main component | MS (MALDI-ToF, neg. mode) [m/z] |
|---|---|---|---|---|
| 1034 | 4-Methyl-benzonitrile | 7.4 g | | 381.0 (100%), 379.0 (96%) |
| 1035 | 3-Methyl-benzonitrile | 6.3 g | | 381.1 (100%), 379.0 (95%) |

-continued

| Example | Nitrile used | Yield | Main component | MS (MALDI-ToF, neg. mode) [m/z] |
|---|---|---|---|---|
| 1036 | 4-Biphenyl-benzonitrile | 7.5 g | 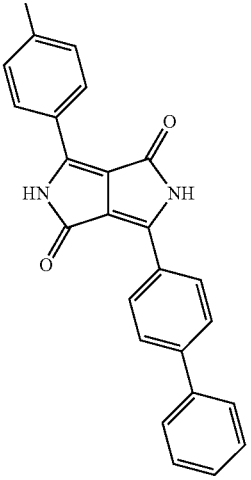 | 443.0 (100%), 440.9 (91%) |
| 1037 | Isophthalo-dinitrile | 8.7 g | 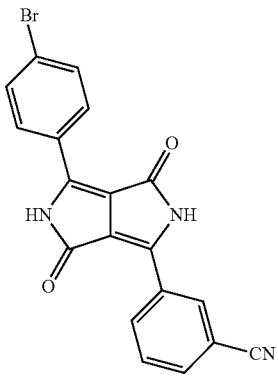 | 392.1 (97%), 390.0 (100%) |
| 1038 | 3,4-Dichloro-benzonitrile | 6.3 g | 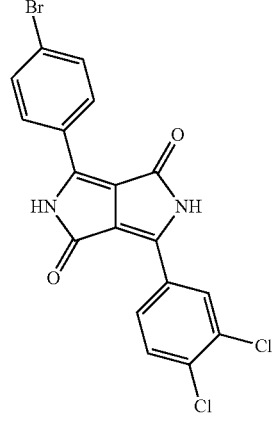 | 437.1 (56%), 436.1 (51%), 435.1 (100%), 434.0 (43%), 433.0 (67%) |

Example 1039

2.61 g of 85% potassium hydroxide, 2.3 ml of water and 30 ml of dimethyl sulfoxide are initially set out, and 5.0 g of the product according to Example 1032 and 1.0 g of 3,6-bis(4-bromophenyl)-2,5-dihydro-pyrrolo[3,4-c]pyrrole-1,4-dione are added, with stirring.

The mixture is heated to 55° C., a dark-violet solution being formed. After stirring for one hour at 55° C., the solution is transferred to a heated dropping funnel and, over one hour, is added dropwise to a mixture of 70 g of ice and 70 g of water at 0° C., with stirring. The resulting suspension is then stirred for 18 hours at 0° C. to complete the reaction and is then filtered and washed with 1700 ml of water. After drying for 18 hours at 80° C./$10^4$ Pa, there are obtained 5.3 g of a dark-red solid whose main components have the following structures:

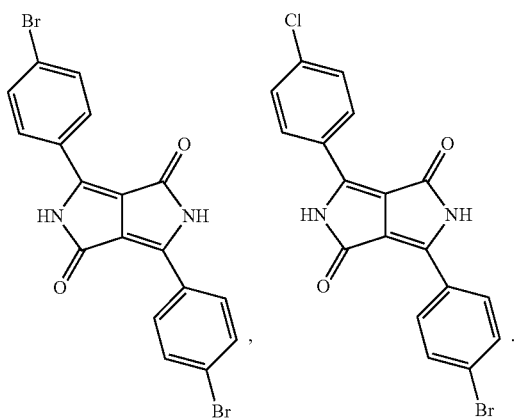

MS (MALDI-ToF, neg. mode): m/z 446.4 (11%), 444.4 (24%), 402.5 (30%), 401.5 (43%), 400.5 (100%), 399.5 (49%), 398.5 (76%).

Examples 1040-1041

The procedures are in accordance with Example 1038 but, instead of 3,6-bis(4-bromophenyl)-2,5-dihydro-pyrrolo[3,4-c]pyrrole-1,4-dione, 1.0 g of each of the pigments listed in the following table is used:

| Example | Pigment used | Yield | Main components | MS (MALDI-ToF, neg. mode) [m/z] |
|---|---|---|---|---|
| 1040 | 3,6-Bis-biphenyl-4-yl-2,5-dihydro-pyrrolo[3,4-c]-pyrrole-1,4-dione | 5.3g |  | 438.9 (10%), 402.5 (37%), 401.5 (46%), 400.5 (100%), 399.5 (43%), 398.5 (77%) |
| 1041 | 3,6-Bis-(4-chloro-phenyl)-2,5-dihydro-pyrrolo[3,4-c]-pyrrole-1,4-dione | 5.4g |  | 402.7 (31%), 401.7 (49%), 400.7 (100%), 399.7 (54%), 398.7 (72%), 357.9 (11%), 356.9 (20%), 355.9 (17%), 354.9 (28%) |

Examples 1042-1043

The procedures are in accordance with Examples 1039 and 1041 but, in addition to the pigments, 0.25 g of the product obtained in accordance with Example 2 of EP 0 485 337 is used in each case:

| Example | Pigment used | Yield | Main components | MS (MALDI-ToF, neg. mode) [m/z] |
|---------|--------------|-------|-----------------|----------------------------------|
| 1042 | 3,6-Bis-(4-chloro-phenyl)-2,5-dihydro-pyrrolo[3,4-c]-pyrrole-1,4-dione | 4.6g | (structures with Br and Cl substituents) | 446.5 (16%), 444.5 (27%), 402.7 (32%), 401.7 (42%), 400.7 (100%), 399.7 (44%), 398.7 (74%) |
| 1043 | 3,6-Bis-biphenyl-4-yl-2,5-dihydro-pyrrolo[3,4-c]-pyrrole-1,4-dione | 4.3g | (structures with Cl and Br substituents) | 403.0 (40%), 401.9 (54%), 400.9 (100%), 399.9 (53%), 398.9 (79%), 358.0 (13%), 357.0 (30%), 356.0 (22%), 355.1 (41%) |

Example 1044

35 ml of tert-amyl alcohol are reacted under inert gas with 2.6 g of sodium at 130° C. (bath temperature) under reflux to form the corresponding alcoholate. Then 4.5 g of 4-bromobenzonitrile are added at an internal temperature of 110° C. A suspension of 6.6 g of 4-ethoxycarbonyl-5-(4-chlorophenyl)pyrrolid-2-one (which can be prepared in accordance with Tetrahedron 58, 5547-5565 [2002]) in 35 ml of tert-amyl alcohol is then metered in over a period of 55 minutes, with stirring. In the course thereof, the internal temperature is allowed to drop gradually to 90° C. The resulting suspension is stirred for 18 hours at 85° C. to complete the reaction and is then transferred, over 25 minutes, into a mixture of 27 g of methanol, 136 g of ice/water, 5 g of a 10% aqueous suspension of the product obtained in accordance with Example 2 of EP 0 485 337 and 5 g of sulfuric acid (97%), whilst stirring vigorously, the final temperature of the mixture being about 3° C. Then the reaction mixture is subsequently stirred at from 0 to 5° C. for a further 240 minutes. The precipitate is then filtered off over a suction filter. After washing with 200 ml of methanol and 500 ml of water and drying (80° C./10⁴ Pa), there are obtained 7.4 g of a red solid whose main component has the following structure:

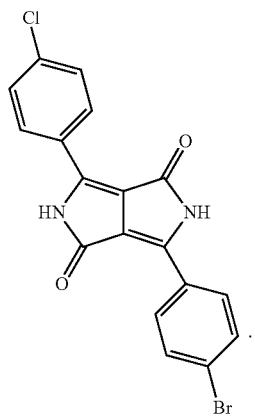

MS (MALDI-ToF, neg. mode): m/z 400.8 (100%, M−1 with ⁸¹Br isotope), 398.8 (79%, M−1 with ⁷⁹Br isotope).

Examples 1045-1054

The procedures are analogous to Example 23 but, instead of the product according to Example 3, there is used the same amount of the pigments mentioned below and in examples 1049-1054, instead of the product according to Example 6 of EP 0 485 337, there is used the same amount of the synergists mentioned below. Colour filters having the following colour values are obtained:

| Example | Pigment according to Example | Synergist according to | x/y/Y (with F10 light source) | Contrast ratio (max. = 10 000) | Thermal stability [% at 270° C.] |
|---|---|---|---|---|---|
| 1045 | 1033 | EP 0 485 337/Ex. 6 | 0.6497/0.3375/22.22% | 1791 | 47.2 |
| 1046 | 1035 | EP 0 485 337/Ex. 6 | 0.6500/0.3482/24.22% | 1112 | 49.7 |
| 1047 | 1037 | EP 0 485 337/Ex. 6 | 0.6314/0.3053/13.44% | 5179 | 21.5 |
| 1048 | 1038 | EP 0 485 337/Ex. 6 | 0.6461/0.3488/21.66% | 6261 | 49.9 |
| 1049 | 1039 | Ex. 1009 | 0.6631/0.3329/18.67% | 2406 | 61.0 |
| 1050 | 1040 | Ex. 1009 | 0.6553/0.3318/18.71% | 2151 | 72.0 |
| 1051 | 1041 | Ex. 1009 | 0.6664/0.3313/17.62% | 2182 | 58.2 |
| 1052 | 1042 | Ex. 1010 | 0.6589/0.3329/19.70% | 2450 | 83.2 |
| 1053 | 1043 | Ex. 1010 | 0.6464/0.3313/20.82% | 2582 | 83.8 |
| 1054 | 1044 | Ex. 1010 | 0.6493/0.3225/17.89% | 3338 | 82.7 |

Comparison Example 1

1.0 g of Irgaphor® Red B-CF, 0.1 g of the product according to Example 2 of EP 0 485 337, 0.7 g of EFKA® 4340, 7.1 g of 1-methoxy-2-propyl acetate and 3.7 g of methacrylate copolymer (in accordance with Example 23) are dispersed in a Skandex® apparatus with 30 g of zirconium oxide beads (dia. 5 mm) for 15 hours. This dispersion is spin-coated onto glass (30 seconds at 750 rpm). Afterwards, drying is carried out at 80° C. and then treatment is carried out for 5 minutes on a hot plate at 230° C. There is obtained a lustrous, intensely red-coloured colour filter having a transmittance of 22.2%, a contrast ratio of 820 and a colour point of x=0.651/y=0.337 (F10 light source; Yxy colour system, C.I.E. 1931). The thermal stability after a further hour at 270° C. is markedly poorer than according to Example 23 (the contrast ratio value is 30% lower than immediately after drying).

Comparison Example 2

The procedure is analogous to Comparison Example 1 but, instead of the product according to Example 2 of EP 0 485 337, the same amount of the product according to Example 6 of EP 0 485 337 is used. The dispersion is spin-coated onto glass (30 seconds at 750 rpm). Afterwards, drying is carried out at 80° C. and then treatment is carried out for 5 minutes on a hot plate at 230° C. There is obtained a lustrous, intensely red-coloured colour filter having a transmittance of 23.8%, a contrast ratio of 850 and a colour point of x=0.651/y=0.341 (F10 light source; Yxy colour system, C.I.E. 1931). The thermal stability after a further hour at 270° C. is markedly poorer than according to Example 23 (the contrast ratio value is 35% lower than immediately after drying).

What is claimed is:
1. A composition comprising
(a) a colourant of formula

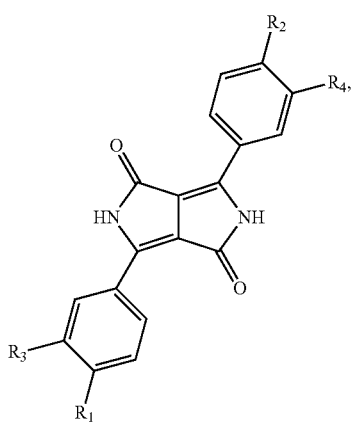

(I)

wherein $R_1$, $R_2$, $R_3$ and $R_4$ are, each independently of the others, H, Cl, Br, CN, $CF_3$, $R_5$, $OR_5$, $SR_5$, $SOR_5$, $SO_2R_5$, $NR_6COR_5$, $COOR_6$, $CONR_5R_6$, $CONH_2$ or $CON(R_7)$, $R_5$, in each case independently of any other $R_5$, is $C_1$-$C_6$alkyl, $C_2$-$C_5$alkylene, phenyl or 2-naphthyl, $R_6$, in each case independently of any other $R_6$, is H, $C_1$-$C_5$alkyl or $C_2$-$C_5$alkylene, and $R_7$, in each case independently of any other $R_7$, is $C_4$-$C_6$alkylene which is uninterrupted or interrupted one or more times by $NR_6$, $NOR_6$, O, S, SO and/or by $SO_2$ or $R_7$ in $N(R_7)$ forming with N a 5- or 6-membered heterocyclic ring, or a mixture, mixed crystal or solid solution thereof,
with the proviso that, based on the total colourant of formula (I) or mixture, mixed crystal or solid solution thereof, from 20 to 100 mol % $R_1$ are Br and from 80 to 100 mol % $R_3$ are H;

(b) from 3 to 150% by weight, based on (a), of a colourant of formula
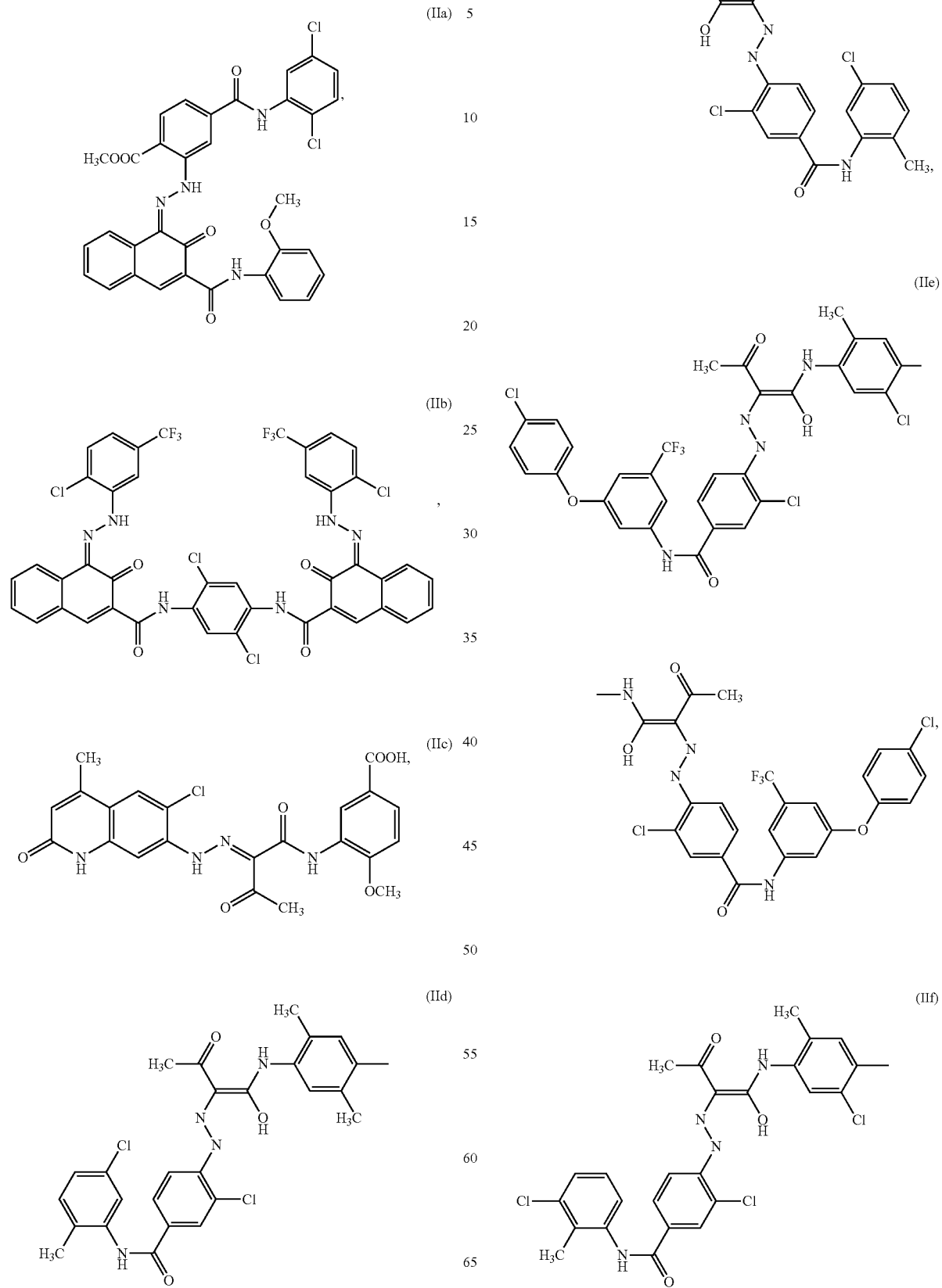

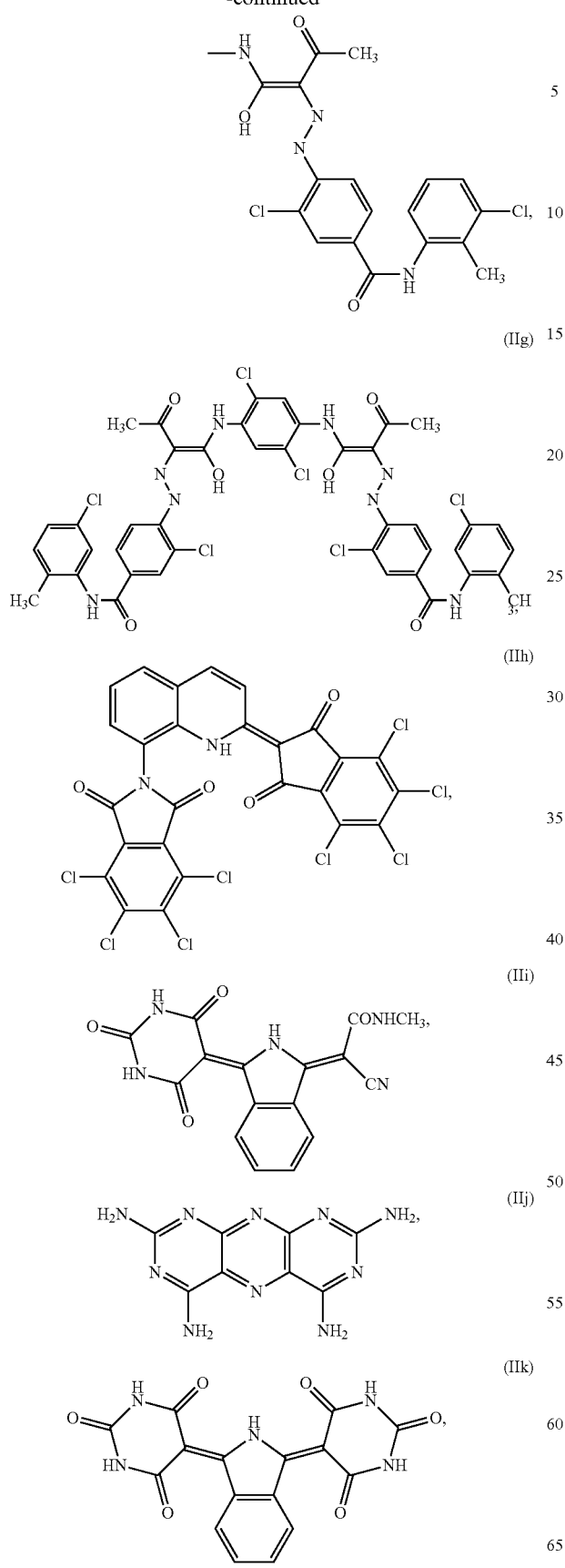
(IIg)
(IIh)
(IIi)
(IIj)
(IIk)
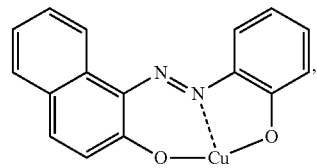
(III)
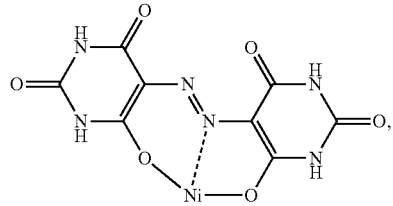
(IIm)
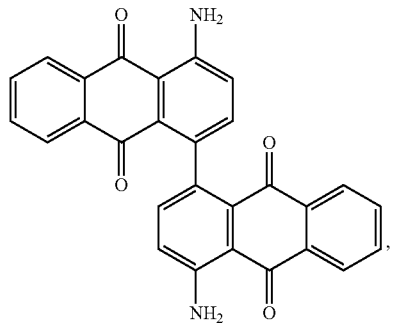
(IIn)
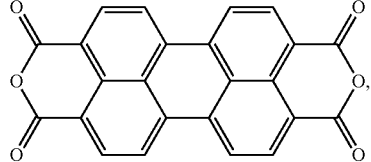
(IIo)
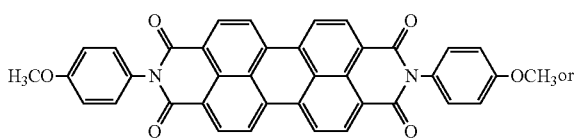
(IIp)
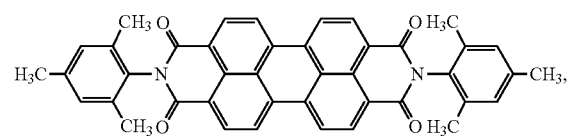
(IIq)
or of a mixture of two or more thereof;
(c) from 3 to 25% by weight, based on (a), of a colourant of formula
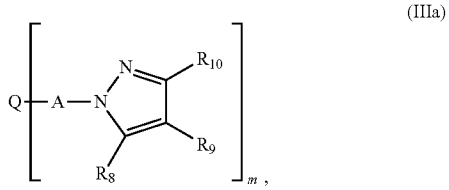
(IIIa)

-continued

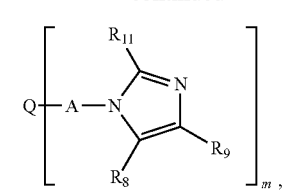
(IIIb)

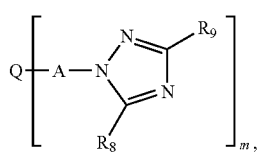
(IIIc)

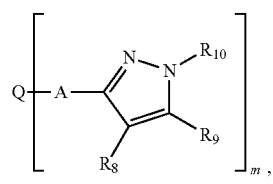
(IIId)

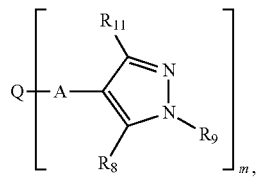
(IIIe)

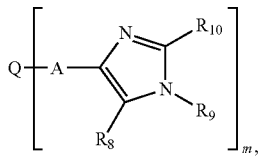
(IIIf)

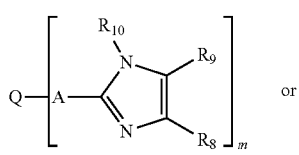
(IIIg)

or

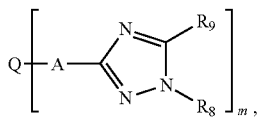
(IIIh)

or of a mixture of colourants of formula (IIIa), (IIIb), (IIIc), (IIId), (IIIe), (IIIf), (IIIg) and/or (IIIh), wherein Q is a chromophore radical selected from unsubstituted or substituted 3,6-diphenyl-2,5-dihydropyrrolo[3,4-c]pyrrole-1,4-dione, 4,4'-diamino-1,1'-bisanthraquinone, perylenetetracarboxylic acid dianhydride, perylenetetracarboxylic acid diimide, quinacridone, 6,13-dihydroquinacridone and quinacridonequinone radicals, A is $C_1$-$C_6$alkylene, m is the number 1 or 2, and $R_8$, $R_9$, $R_{10}$ and $R_{11}$ are, each independently of the others, H, halogen, $C_1$-$C_{18}$alkyl which is unsubstituted or substituted one or more times by halogen, $C_1$-$C_6$alkoxy and/or by di($C_1$-$C_6$alkyl)amino, or $C_6$-$C_{12}$aryl which is unsubstituted or substituted one or more times by halogen, $NO_2$, $C_1$-$C_{12}$alkyl, $C_1$-$C_6$alkoxy and/or by di($C_1$-$C_6$alkyl)amino, it being optionally possible for $R_8$ and $R_9$ and/or $R_9$ and $R_{10}$ to be connected by a bond so that further alicyclic, aromatic or heterocyclic rings are formed;

(d) from 0 to 10% by weight, based on the sum of (a) and (b), of a colourant of formula

(IV)

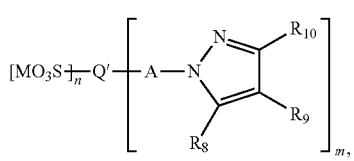
(IVa)

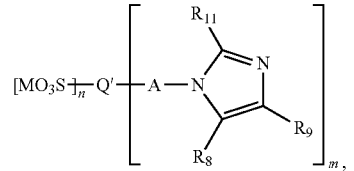
(IVb)

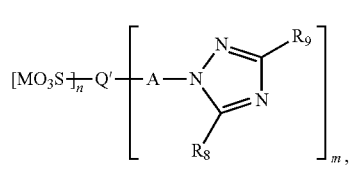
(IVc)

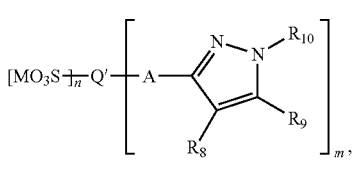
(IVd)

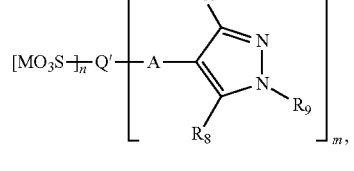
(IVe)

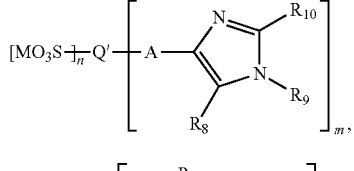
(IVf)

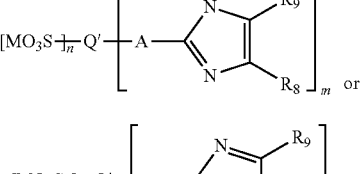
(IVg)

or

(IVh)

or of a mixture of colourants of formula (IV), (IVa), (IVb), (IVc), (IVd), (IVe), (IVf), (IVg) and/or (IVh), wherein A, m, $R_8$, $R_9$, $R_{10}$ and $R_{11}$ are as defined in the case of (c), Q' is as defined for Q in the case of (c) but is independent of the meaning of Q, n is a number 1 or 2, and M is H, an alkali metal, alkaline earth metal, ammonium or primary, secondary, tertiary or quaternary ammonium;

and (e) from 3 to 25% by weight, based on (a), of a colourant of formula

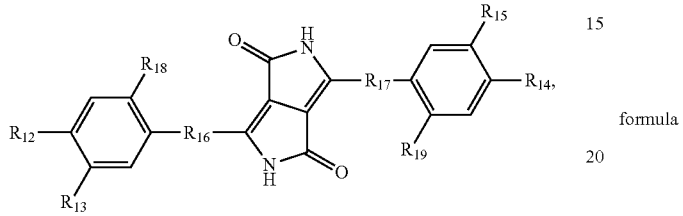

wherein

R$_{12}$ is R$_1$ or A$_a$-[-NH—]$_n$—X$_x$—[—CH$_2$—]$_c$[—Y—Z-]$_z$-G and

R$_{13}$ is R$_3$, A$_a$-[-NH—]$_n$—X$_x$—[—CH$_2$—]$_c$[—Y—Z-]$_z$-G, but R$_{12}$ and R$_{13}$ are not both A$_a$-[-NH—]$_n$—X$_x$—[—CH$_2$—]$_c$[—Y—Z-]$_z$-G, either R$_{14}$ is R$_2$ and at the same time R$_{15}$ is A$_a$-[-NH—]$_n$—X$_x$—[—CH$_2$—]$_c$[—Y—Z-]$_z$-G, or R$_{14}$ is A$_a$-[-NH—]$_n$—X$_x$—[—CH$_2$—]$_c$[—Y—Z-]$_z$-G and at the same time R$_{15}$ is R$_4$, R$_{16}$ and R$_{17}$ are, each independently of the other, a direct bond, 1,3-phenylene or 1,4-phenylene, R$_{18}$ and R$_{19}$ are H or, when R$_{16}$ is 1,3-phenylene or 1,4-phenylene, R$_{18}$ is H or A$_a$-[-NH—]$_n$—X$_x$—[—CH$_2$—]$_c$[—Y—Z-]$_z$-G, and, when R$_{17}$ is 1,3-phenylene or 1,4-phenylene, R$_{19}$ is H or A$_a$-[-NH—]$_n$—X$_x$—[—CH$_2$—]$_c$[—Y—Z-]$_z$-G, A is C$_1$-C$_4$alkylene, and a is 0 or 1, c is a whole number from 0 to 6, G is NR$_5$R$_6$, N(R$_7$), NR$_6$—NR$_5$R$_6$ or NR$_6$—N(R$_7$), n is 0, 1 or 2, X is carbonyl or sulfonyl and x is 0 or 1, Y, in each case independently of any other Y, is O, S or NR$_6$ Z, in each case independently of any other Z, is C$_2$-C$_8$alkylene, 1,2-propylene, 1,3-propylene, 1,4-butylene or 1,6-hexylene, z is 0 or a number from 1 to 3, with the proviso that the sum of a, n, x and z is at least 1, and R$_1$, R$_2$, R$_5$, R$_6$ and R$_7$ are as defined for formula (I) but independent of formula (I), or of a mixture of colourants of formula (V).

2. The composition according to claim 1, wherein component (a) consists of from 20 to 100 mol % of colourants of formula (Ia), (Ib) and/or (Ic) as defined below formula

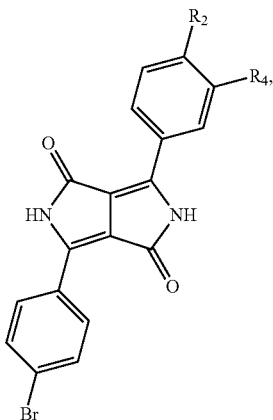

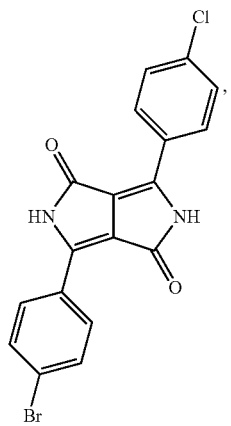

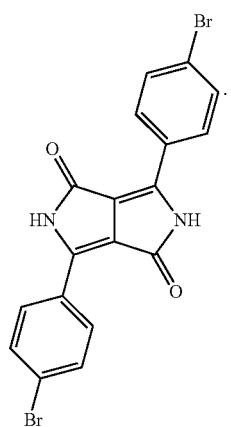

3. The composition according to claim 1, wherein Q is a 3,6-diphenyl-2,5-dihydropyrrolo[3,4-c]pyrrole-1,4-dione or quinacridone radical unsubstituted or substituted by halogen, C$_1$-C$_4$alkyl, C$_1$-C$_4$alkoxy or by phenyl.

4. The composition according to claim 1, wherein components (a) or (b), where applicable, (b) that are present, have an average particle size of from 10 to 100 nm, with ≦10% by weight of particles being ≧100 nm and ≦50% by weight of particles being ≧50 nm.

5. The composition according to claim 1, wherein R$_8$, R$_9$ and R$_{10}$ are, each independently of the others, H or C$_1$-C$_4$alkyl.

6. The composition according to claim 1, additionally comprising a colourless component and a colourant selected from unsubstituted or substituted 3,6-diphenyl-2,5-dihydropyrrolo[3,4-c]pyrrole-1,4-dione, 4,4'-diamino-1,1'-bisanthraquinone, perylenetetracarboxylic acid dianhydride, perylenetetracarboxylic acid diimide, quinacridone, 6,13-dihydroquinacridone and quinacridonequinone colourants.

7. The composition according to claim 6, wherein the colourless component is a cationic copolymer.

8. The composition according to claim 1 comprising (a) a colourant of formula (I)

containing from 20 to 100 mol % of formula (Ia)

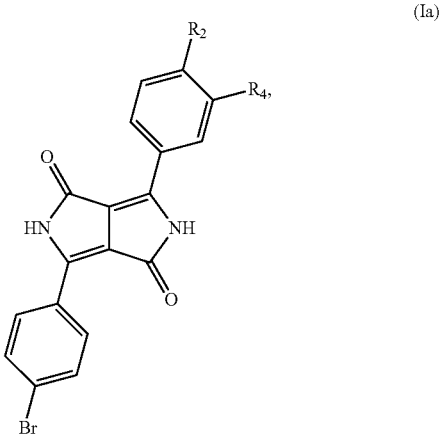

(c) from 3 to 25% by weight, based on (a), of one or more colourants of formula (IIIa), (IIIb), (IIIc), (IIId), (IIIe), (IIIf), (IIIg) and (IIIh), (d) from 0 to 10% by weight, based on the sum of (a) and (b), of one or more colourants of formula (IV), (IVa), (IVb), (IVc), (IVd), (IVe), (IVf), (IVg) and (IVh), and (e) from 3 to 25% by weight, based on (a), of one or more colourants of formula (V).

9. A liquid dispersion modifiable by radiation, comprising the composition according to claim 1, wherein the components (a), when present (b) and, optionally, an additional colourant are present in the form of solid, homogeneously distributed particles.

10. A method of producing a colour filter comprising image points or pixels, comprising the steps of irradiating the liquid dispersion according to claim 9 and producing the image points.

11. A thermoplastic mass comprising the composition according to claim 1, wherein the components (a), when present (b) and, optionally, an additional colourant are present in the form of solid, homogeneously distributed particles.

12. A colour filter comprising pixels of at least three colours, wherein a fraction of the pixels comprise the composition according to claim 1.

* * * * *